(12) United States Patent
Jin et al.

(10) Patent No.: US 9,639,252 B2
(45) Date of Patent: May 2, 2017

(54) DEVICE AND METHOD FOR DISPLAYING EXECUTION RESULT OF APPLICATION

(71) Applicant: SAMSUNG ELECTRONICS CO., LTD., Suwon-si (KR)

(72) Inventors: Young-kyu Jin, Seoul (KR); Nam-wook Kang, Seoul (KR); Yoon-su Kim, Seoul (KR); Yong-gook Park, Yongin-si (KR); Joo-yoon Bae, Seoul (KR); Jung-joo Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 14/227,865

(22) Filed: Mar. 27, 2014

(65) Prior Publication Data

US 2014/0298253 A1  Oct. 2, 2014

Related U.S. Application Data

(60) Provisional application No. 61/805,632, filed on Mar. 27, 2013.

(30) Foreign Application Priority Data

Jul. 12, 2013  (KR) .................. 10-2013-0082462
Feb. 7, 2014  (KR) .................. 10-2014-0014443
Mar. 13, 2014 (KR) .................. 10-2014-0029772

(51) Int. Cl.
*G06F 3/0484* (2013.01)
*G06F 3/0481* (2013.01)
(Continued)

(52) U.S. Cl.
CPC ........ *G06F 3/04842* (2013.01); *G06F 3/0481* (2013.01); *G06F 3/0482* (2013.01);
(Continued)

(58) Field of Classification Search
CPC .............................. G06F 3/0484; G06F 3/0481
See application file for complete search history.

(56) References Cited

U.S. PATENT DOCUMENTS 5,666,502 A  9/1997 Capps
6,008,809 A  12/1999 Brooks
(Continued)

FOREIGN PATENT DOCUMENTS

EP  2 112 583 A1  10/2009
EP  2230623 A1   9/2010
(Continued)

OTHER PUBLICATIONS

Samsung Touchwiz (Aug. 5, 2011).*
(Continued)

*Primary Examiner* — David Choi
(74) *Attorney, Agent, or Firm* — Sughrue Mion, PLLC

(57) ABSTRACT

Provided are a device and method for displaying an execution result of an application. A method of displaying an execution result of an application includes: in response to a user input, displaying execution results of a plurality of applications, which are being executed in the device, in a plurality of windows that are displayed in at least two display modes; arranging the plurality of windows, which show execution results of the plurality of windows, to be adjacent to each other and displaying the plurality of windows on a display; receiving a user input when the plurality of windows are displayed on the display; and scrolling the plurality of windows in response to the user input.

21 Claims, 52 Drawing Sheets

(51) Int. Cl.
  *G06F 3/0482* (2013.01)
  *G06F 3/0485* (2013.01)
  *G06F 3/0486* (2013.01)
  *G06F 3/0488* (2013.01)

(52) U.S. Cl.
  CPC .......... *G06F 3/0485* (2013.01); *G06F 3/0486* (2013.01); *G06F 3/04817* (2013.01); *G06F 3/04883* (2013.01); *G06F 2203/04803* (2013.01); *G06F 2203/04808* (2013.01)

(56) References Cited

U.S. PATENT DOCUMENTS

| | | | |
|---|---|---|---|
| 6,397,337 | B1 | 5/2002 | Garrett et al. |
| 7,512,400 | B2 | 3/2009 | Starbuck et al. |
| 7,657,849 | B2 | 2/2010 | Chaudhri et al. |
| 8,046,721 | B2 | 10/2011 | Chaudhri et al. |
| 8,351,897 | B2 | 1/2013 | Shin et al. |
| 8,411,046 | B2 | 4/2013 | Kruzeniski et al. |
| 8,700,618 | B2* | 4/2014 | Evans ............... G06F 17/30887 |
| | | | 707/726 |
| 2005/0149879 | A1 | 7/2005 | Jobs et al. |
| 2005/0243979 | A1 | 11/2005 | Starbuck et al. |
| 2006/0167861 | A1 | 7/2006 | Arrouye et al. |
| 2006/0229097 | A1 | 10/2006 | Flynt et al. |
| 2007/0099642 | A1 | 5/2007 | Jin et al. |
| 2007/0150842 | A1 | 6/2007 | Chaudhri et al. |
| 2008/0020803 | A1 | 1/2008 | Rios et al. |
| 2008/0052717 | A1 | 2/2008 | Lee |
| 2008/0166993 | A1 | 7/2008 | Gautier et al. |
| 2008/0168368 | A1* | 7/2008 | Louch ..................... G06F 3/048 |
| | | | 715/764 |
| 2008/0320033 | A1 | 12/2008 | Koistinen et al. |
| 2009/0013275 | A1 | 1/2009 | May et al. |
| 2009/0013282 | A1 | 1/2009 | Mercer |
| 2009/0019120 | A1 | 1/2009 | Muguda |
| 2009/0083847 | A1 | 3/2009 | Fadell et al. |
| 2009/0094339 | A1* | 4/2009 | Allen .................. H04L 67/1095 |
| | | | 709/206 |
| 2009/0240647 | A1 | 9/2009 | Green et al. |
| 2009/0241072 | A1 | 9/2009 | Chaudhri et al. |
| 2010/0023892 | A1 | 1/2010 | Rakesh et al. |
| 2010/0070898 | A1 | 3/2010 | Langlois et al. |
| 2010/0088634 | A1 | 4/2010 | Tsuruta et al. |
| 2010/0146451 | A1 | 6/2010 | Jun-Dong et al. |
| 2010/0211872 | A1 | 8/2010 | Rolston et al. |
| 2010/0229115 | A1 | 9/2010 | Augustine et al. |
| 2010/0269040 | A1 | 10/2010 | Lee |
| 2010/0306705 | A1 | 12/2010 | Nilsson |
| 2010/0313156 | A1 | 12/2010 | Louch et al. |
| 2011/0047134 | A1 | 2/2011 | Zhang et al. |
| 2011/0093812 | A1 | 4/2011 | Fong |
| 2011/0126156 | A1 | 5/2011 | Krishnaraj et al. |
| 2011/0154290 | A1 | 6/2011 | Kelly |
| 2011/0167387 | A1 | 7/2011 | Stallings et al. |
| 2011/0175930 | A1 | 7/2011 | Hwang et al. |
| 2011/0202872 | A1 | 8/2011 | Park |
| 2011/0258581 | A1 | 10/2011 | Hu |
| 2011/0300831 | A1 | 12/2011 | Chin |
| 2011/0316884 | A1 | 12/2011 | Giambalvo et al. |
| 2012/0005569 | A1 | 1/2012 | Roh |
| 2012/0005577 | A1 | 1/2012 | Chakra et al. |
| 2012/0023573 | A1 | 1/2012 | Shi |
| 2012/0084734 | A1 | 4/2012 | Wilairat |
| 2012/0117599 | A1 | 5/2012 | Jin et al. |
| 2012/0129496 | A1 | 5/2012 | Park et al. |
| 2012/0131471 | A1 | 5/2012 | Terlouw et al. |
| 2012/0164971 | A1 | 6/2012 | Choi et al. |
| 2012/0174042 | A1 | 7/2012 | Chang |
| 2012/0179969 | A1 | 7/2012 | Lee et al. |
| 2012/0210253 | A1 | 8/2012 | Luna et al. |
| 2012/0210266 | A1 | 8/2012 | Jiang et al. |
| 2012/0256863 | A1 | 10/2012 | Zhang et al. |
| 2012/0272338 | A1 | 10/2012 | Falkenburg et al. |
| 2012/0289287 | A1 | 11/2012 | Kokubo |
| 2012/0290972 | A1 | 11/2012 | Yook et al. |
| 2012/0297298 | A1 | 11/2012 | Dovey et al. |
| 2012/0297304 | A1 | 11/2012 | Maxwell |
| 2012/0309433 | A1 | 12/2012 | Jeong et al. |
| 2012/0324357 | A1 | 12/2012 | Viegers et al. |
| 2013/0042191 | A1 | 2/2013 | Kim et al. |
| 2013/0047119 | A1 | 2/2013 | Lee |
| 2013/0052993 | A1 | 2/2013 | Kwon et al. |
| 2013/0053105 | A1 | 2/2013 | Lee et al. |
| 2013/0054548 | A1 | 2/2013 | Fosback et al. |
| 2013/0063452 | A1 | 3/2013 | Ali et al. |
| 2013/0063479 | A1 | 3/2013 | Butlin et al. |
| 2013/0067376 | A1 | 3/2013 | Kim et al. |
| 2013/0083210 | A1 | 4/2013 | Beckham et al. |
| 2013/0091468 | A1 | 4/2013 | Xie |
| 2013/0232256 | A1 | 9/2013 | Lee et al. |
| 2014/0040797 | A1* | 2/2014 | Qian ..................... G06F 3/0481 |
| | | | 715/765 |
| 2014/0040812 | A1 | 2/2014 | Kurtz et al. |
| 2014/0108936 | A1* | 4/2014 | Khosropour .......... G06F 9/4443 |
| | | | 715/735 |
| 2014/0298253 | A1* | 10/2014 | Jin ....................... G06F 3/04842 |
| | | | 715/790 |

FOREIGN PATENT DOCUMENTS

| | | |
|---|---|---|
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-0683483 B1 | 2/2007 |
| KR | 10-2007-0115622 A | 12/2007 |
| KR | 10-2007-0120368 A | 12/2007 |
| KR | 10-2010-0027689 A | 3/2010 |
| KR | 10-2010-0114779 A | 10/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0126161 A | 11/2012 |
| KR | 10-2012-0131906 A | 12/2012 |
| KR | 10-2013-0024074 A | 3/2013 |
| KR | 10-2013-0024346 A | 3/2013 |
| RU | 2 347 258 C2 | 2/2009 |
| RU | 2 363 039 C2 | 7/2009 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 total pages; XP055135715.
"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.

(56) References Cited

OTHER PUBLICATIONS

Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Sep. 25, 2014, issued by the European Patent Office in counterpart European Application No. 14161980.9.
Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software website, Jul. 1, 2012, 2 pages total, XP055142907.
"Private Desktop, Screen Shots", Tropical Software website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP55143362.
Communication dated Oct. 6, 2016, issued by the Russian Patent Office in counterpart Russian Application No. 2015145945.
Communication dated Oct. 6, 2016, issued by the European Patent Office in counterpart European Application No. 14161980.9.
Gina Trapani: "Seven Easy Ways to Integrate Your Google Apps" Sep. 9, 2009, XP055305805, (6 pages total).
European Office Action dated Feb. 21, 2017 issued by European Patent Office in counterpart European Application No. 14 161 998.1.
Office Action dated Feb. 8, 2017 issued by Russian Intellectual Property Office in counterpart Russian Application No. 2015145969.

* cited by examiner

FIG. 4
(a)
(b)
(c)
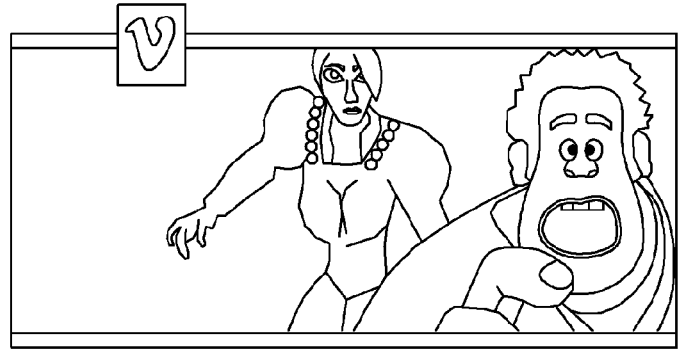

FIG. 19
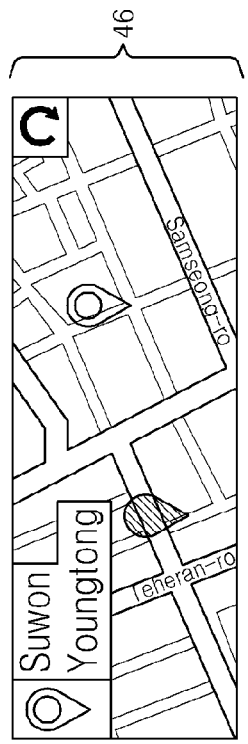
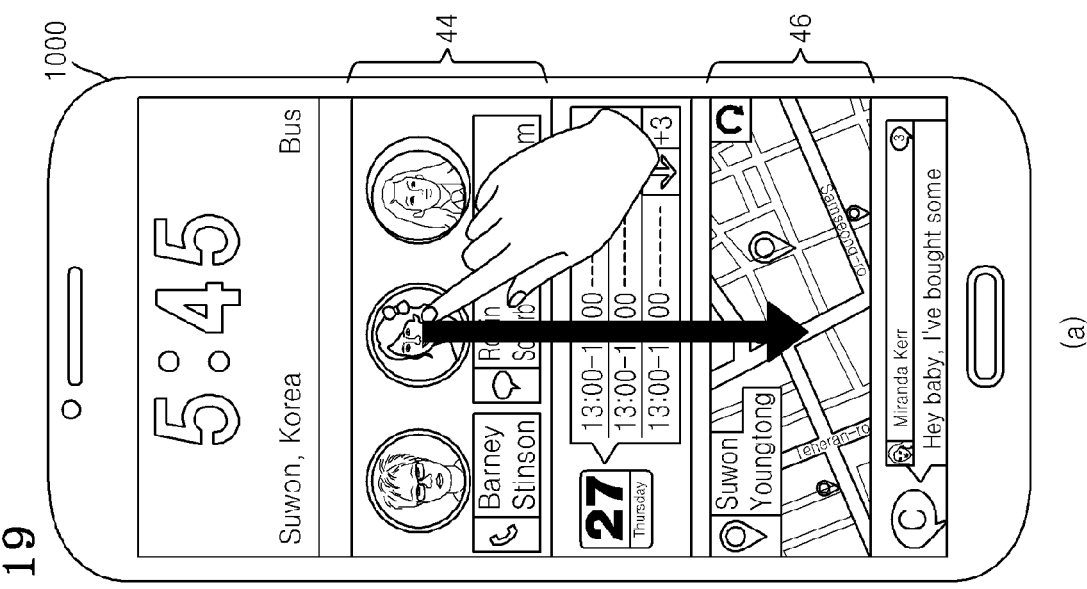

FIG. 26

FIG. 50
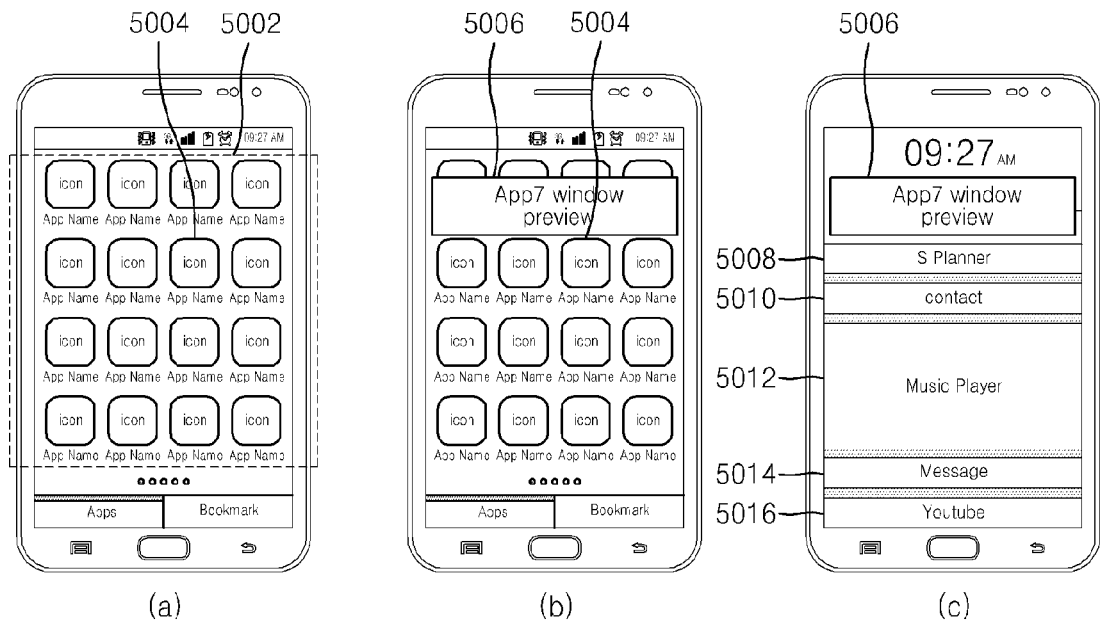
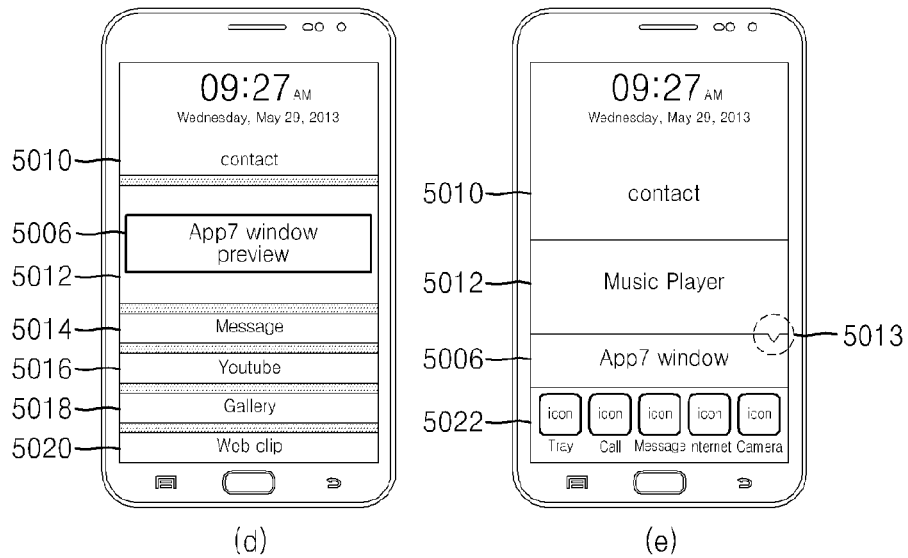

FIG. 51
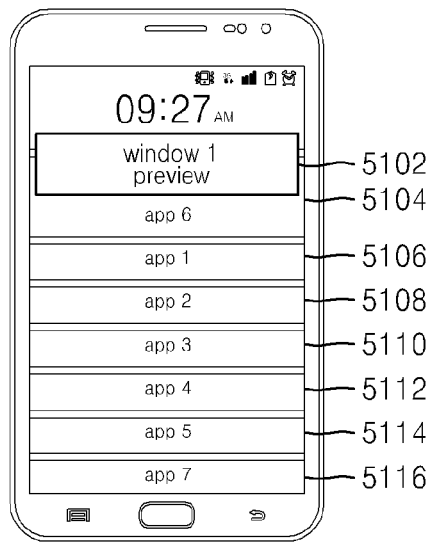
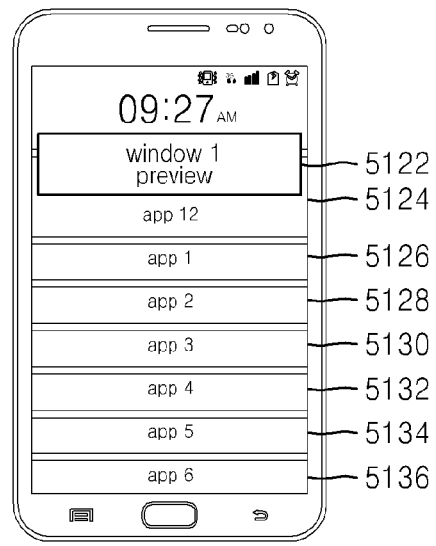
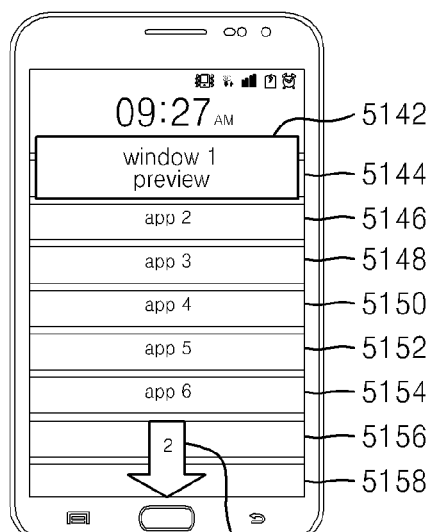
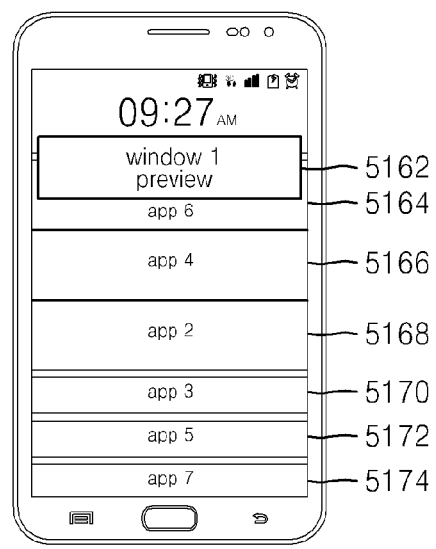

DEVICE AND METHOD FOR DISPLAYING EXECUTION RESULT OF APPLICATION

RELATED APPLICATIONS

This application claims the benefit of U.S. Provisional Application No. 61/805,632, filed on Mar. 27, 2013, in the US Patent Office and Korean Patent Application No. 10-2013-0082462, filed on Jul. 12, 2013, and Korean Patent Application No. 10-2014-0014443, filed on Feb. 7, 2014, and Korean Patent Application No. 10-2014-0029772, filed on Mar. 13, 2014, in the Korean Intellectual Property Office, the disclosures of which are incorporated herein in their entireties by reference.

BACKGROUND

1. Field

One or more exemplary embodiments relate to a device and method for displaying an execution result of an application, and more particularly, to a device and method for displaying a window band that includes windows which show an execution result of an application

2. Description of the Related Art

As multimedia technology and data processing technology have advanced, a device may execute numerous applications together and process various information. Additionally, as the device may process various types of applications together, it has become difficult for a user to easily select an application to be used, from among a lot of applications that are being executed, and also inconvenient for a user to select a function to be used, from among a lot of functions of a selected application.

Accordingly, there is a demand for a technology for displaying an execution result of an application, so that an execution result of an application executed in the device may be effectively checked and a particular function of the application may be effectively employed.

SUMMARY

One or more exemplary embodiments include effective checking and using of execution results of applications in a device, by displaying a window band that includes windows, which show an execution result of an application that is being executed.

Additional aspects will be set forth in part in the description which follows and, in part, will be apparent from the description, or may be learned by practice of exemplary embodiments.

According to one or more exemplary embodiments, a method of displaying an execution result of an application includes: selecting a plurality of applications that are being executed in a device; generating a window band by arranging a plurality of windows, which show execution results of the selected plurality of applications, to be adjacent to each other; and displaying the generated window band on a screen of the device.

The method may include displaying an application tray that includes a list of at least one application installed in the device; receiving a user input of selecting a certain application included in the list and moving the selected application to the window band; and, in response to the user input, generating a window that shows an execution result of the selected application, and displaying the generated window in the window band.

The user input of moving the selected application to the window band may be an input of moving the selected application to an area of a boundary between a plurality of windows included in the window band.

The execution result may be a part of the execution result from among the execution results of the application, which is selected by a user.

The execution result may be an execution result, with respect to a partial area of a whole execution result of the application, which is selected by a user.

The method may further include: receiving a user input of selecting one of the plurality of windows included in the window band, and expanding the selected window; and in response to the user input, expanding the selected window and showing an execution result of an application of the selected window in the expanded window in detail.

The method may further include displaying an application tray that includes a list of at least one application installed in the device; as a first application included in the list is selected, displaying a window of an application, which may be executed to work with the selected first application, to be distinguished from a plurality of windows in the window band.

The method may further include: as the selected first application is moved to a window of a second application from among the windows displayed to be distinguished, executing the second application to work with the first application; and displaying an execution result of the second application, which is executed to work with the first application, in the window of the second application.

The method may further include: as a window of a third application included in the window band is selected, displaying a window of an application, which may be executed to work with the selected window of the third application, to be distinguished from the plurality of windows in the window band.

The method may further include: as the selected window of the third application is moved to a window of a fourth application from among the windows displayed to be distinguished, executing the fourth application to work with the third application; and displaying an execution result of the fourth application, which is executed to work with the third application, in the window of the fourth application.

The method may further include: as a certain event is generated, generating a window that shows an execution result of an application related to the generated event; and inserting the generated window into the window band.

The method may further include: selecting one of the plurality of windows in the window band; receiving a user input of moving the selected window to a quick panel; and displaying the selected window in the quick panel.

The method may further include displaying an icon of an application associated with the selected window in the quick panel.

According to one or more exemplary embodiments, a device for displaying an execution result of an application includes: a control unit for determining a plurality of applications that are being executed in the device; generating a window band by arranging a plurality of windows, which show execution results of the plurality of applications that are being executed, to be adjacent to each other; and a display for displaying the generated window band on a screen of the device.

The display may further include a user input unit, which is controlled by the controller, for displaying an application tray that includes a list of at least one application installed in the device, and receiving a user input of selecting a certain application included in the list and moving the selected application to the window band, the controller may generate a window that shows an execution result of the selected application, in response to the user input, and the display may display the generated window in the window band.

The user input of moving the selected application to the window band may be an input of moving the selected application to an area of a boundary between a plurality of windows included in the window band.

The execution result may be a part of the execution result from among the execution result of the application, which is selected by a user.

The execution result may be an execution result, with respect to a partial area of a whole execution result of the application, which is selected by a user.

The user input unit may receive a user input of selecting one of the plurality of windows included in the window band and expanding the selected window, and the controller may expand the selected window and show an execution result of an application of the selected window in the expanded window in detail, in response to the user input.

The display may display an application tray that includes a list of at least one application installed in the device and, as a first application included in the list is selected, display a window of an application, which may be executed to work with the selected first application, to be distinguished from a plurality of windows in the window band.

The display may execute a second application to work with the first application, as the selected first application is moved to a window of the second application from among the windows displayed to be distinguished, and display an execution result of the second application, which is executed to work with the first application, in the window of the second application.

As a window of a third application included in the window band is selected, the display may display a window of an application, which may be executed to work with the selected window of the third application, to be distinguished from the plurality of windows in the window band.

As the selected window of the third application is moved to a window of a fourth application from among the windows displayed to be distinguished, the display may execute the fourth application to work with the third application, and display an execution result of the fourth application, which is executed to work with the third application, in the window of the fourth application.

As a certain event is generated, the controller may generate a window that shows an execution result of an application related to the generated event, and insert the generated window into the window band.

The display may select one of the plurality of windows in the window band, and as the selected window is moved to a quick panel, display the selected window in the quick panel.

The display may display an icon of an application associated with the selected window in the quick panel.

According to one or more exemplary embodiments, a method of displaying an execution result of an application includes: displaying an execution result of a plurality of applications, which are being executed in a device, in a plurality of windows displayed in at least two display modes in response to a user input; arranging a plurality of windows, which show execution results of the plurality of applications, to be adjacent to each other and displaying the arranged plurality of windows on a screen of the device; receiving a user input when the plurality of windows are displayed on the screen; and scrolling the plurality of windows in response to the user input.

The at least two modes may include a first mode and a second mode, first data may be displayed in the window in the first mode, the first data and second data may be displayed in the window in the second mode, and the window displayed in the first mode may be displayed to have a smaller size than the window displayed in the second mode.

The method may include receiving a pinch zoom-in gesture when the plurality of windows are displayed in the second mode in the screen; and displaying the plurality of windows in the first mode, in response to the pinch zoom-in gesture.

The method may include receiving a pinch zoom-out gesture when the plurality of windows are displayed in the first mode in the screen; and displaying the plurality of windows in the second mode, in response to the pinch zoom-out gesture.

The method may include receiving a gesture of performing a flick operation on one of the plurality of windows in a left or right direction; and, in response to the gesture of performing a flick operation in a left or right direction, changing an item of content displayed in the window to a previous item or a next item of the item of the content, and display the previous item or the next item.

The first data may include a name of an application, and the second data may include an execution result of an application and an icon that corresponds to the application.

If the icon is touched, the application may be displayed in a whole area of the screen.

When the plurality of windows are displayed in the first mode, one of the plurality of windows may receive a tap gesture and, in response to the tap gesture, the one of the plurality of windows may be displayed at an uppermost part of the plurality of windows.

While the plurality of windows are scrolled, a size of the plurality of windows may be changed.

If the plurality of windows are scrolled in an upward direction, a window placed at an uppermost part of the plurality of windows may be covered by a window adjacent to and below the window placed at the uppermost part, and disappear from the screen.

The method may include receiving a touch on one of the plurality of windows displayed on the screen; displaying an object for deleting the window at one side of the window if the touch is maintained for a predetermined period of time; receiving a touch on the object; and removing the window from the screen in response to the touch.

The method may include receiving a tap gesture with respect to one window from among the plurality of windows when the plurality of windows are displayed in the second mode; and expanding and displaying the one window in response to the tap gesture.

If a tap gesture is received when the one window from among the plurality of windows is placed above a center of the screen, the one window may be expanded and displayed in a lower direction. If a tap gesture is received when the one window from among the plurality of windows is placed below the center of the screen, the one window may be expanded and displayed in an upper direction.

According to one or more exemplary embodiments, a device includes: a display; and a controller for displaying an execution result of a plurality of applications, which are being executed in a device, in a plurality of windows displayed in at least two display modes in response to a user input, arranging a plurality of windows, which show execution results of the plurality of applications, to be adjacent to each other and displaying the arranged plurality of windows on a screen of the device, and scrolling the plurality of windows in response to the user input.

The display mode of the window may include a first mode and a second mode, first data may be displayed in the window in the first mode, the first data and second data may be displayed in the window in the second mode, and the window displayed in the first mode may be displayed to have a smaller size than the window displayed in the second mode.

The controller may receive a pinch zoom-in gesture when the plurality of windows are displayed in the second mode in the screen, and display the plurality of windows in the first mode, in response to the pinch zoom-in gesture.

The controller may receive a pinch zoom-out gesture when the plurality of windows are displayed in the first mode in the screen, and display the plurality of windows in the second mode, in response to the pinch zoom-out gesture.

The controller may receive a gesture of performing a flick operation on one of the plurality of windows in a left or right direction and, in response to the gesture of performing a flick operation in a left or right direction, change an item of content displayed in the window to a previous item or a next item of the item of the content, and display the previous item or the next item.

The controller may control to change a size of the plurality of windows while the plurality of windows are being scrolled.

According to one or more exemplary embodiments, a method of displaying an execution result of an application includes: providing an execution result of a plurality of applications, which are being executed by the device, to a plurality of windows that are displayed in at least two modes by a user input; arranging the plurality of windows, which show an execution result of the plurality of windows, to be adjacent to each other and displaying the arranged plurality of windows on a screen of the device; receiving a gesture input in an upward, downward, left, or right direction, when the plurality of windows are displayed on the screen; and scrolling the plurality of windows if a gesture in an upward or downward direction is received, and changing content displayed in one of the plurality of windows if a gesture in a left or right direction is received.

According to one or more exemplary embodiments, a method of displaying an execution result of an application includes: displaying a plurality of icons, which correspond to a plurality of applications, on a screen; receiving a first user input to a first icon from among the plurality of icons; displaying a first window, which corresponds to the first icon and shows an execution result of an application, in a nearby area of the first icon in response to the first user input; receiving a second user input to the first window; and displaying a plurality of windows that are arranged adjacent to each other on the screen, as the second user input is received wherein the first window is displayed to overlap with the other windows from among the plurality of windows.

A display mode of each window that constitutes the plurality of windows may include a first mode and a second mode, first data is displayed in the window in the first mode, the first data and second data are displayed in the window in the second mode, and the window displayed in the first mode may be displayed with a smaller size than the window displayed in the second mode.

The method may further include displaying a second window related to the first window to be visually distinguished from the other windows from among the plurality of windows.

The displaying of the second window to be visually distinguished from the plurality of windows may include displaying the second window in the second mode, and displaying a window from among the plurality of windows, other than the second window, in the first mode.

The first window may be displayed with a smaller size than the second window.

At least one of data of a first application executed in the first window and data of a second application executed in the second window may be shared by the first application and the second application.

The method may further include receiving a user input of dragging the first window; moving the first window in response to the user input; and displaying a preview of information, which is shown when the first application and the second application are executed to work with each other, in the first window, if the first window is moved to a location where the second window is displayed.

The method may further include: detecting release of a user input in the first window; arranging the first window to be adjacent to the second window, in correspondence with the release of the user input; and displaying at least one of the first window and the second window to be visually distinguished from the other window from among the plurality of windows.

The method may further include: detecting release of a user input in the first window; arranging the first window to be adjacent to the second window, in correspondence with the release of the user input; and displaying an object, which indicates that the first window and the second window are associated with each other, on at least one of the first window and the second window.

The method may further include: receiving a user input of moving the first window to a location where the second window is displayed; arranging the first window to be adjacent to the second window in response to the user input; displaying a result, in which the first application and the second application are executed to work with each other, in at least one of the first window and the second window.

According to one or more exemplary embodiments, a device includes: a display; and a controller for displaying a plurality of icons, which correspond to a plurality of applications, on the display, receiving a first user input to a first icon from among the plurality of icons, displaying a first window, which corresponds to the first icon and shows an execution result of a first application, in a nearby area of the first icon in response to the first user input, receiving a second user input to the first window, and displaying a plurality of windows that are arranged adjacent to each other in the display based on the second user input, wherein the first window is displayed to overlap with the other windows from among the plurality of windows.

A display mode of each window that constitutes the plurality of windows may include a first mode and a second mode, first data is displayed in the window in the first mode, the first data and second data are displayed in the window in the second mode, and the window displayed in the first mode is displayed with a smaller size than the window displayed in the second mode.

The device may display a second window related to the first window to be visually distinguished from the plurality of windows.

The displaying of the second window to be visually distinguished from the plurality of windows may include displaying the second window in the second mode, and displaying a window from among the plurality of windows, other than the second window, in the first mode.

The first window may be displayed with a smaller size than the second window.

At least one of data of a first application executed in the first window and data of a second application executed in the second window may be shared by the first application and the second application.

The device may receive a user input of dragging the first window, moves the first window in response to the user input, and display a preview of information, which is shown when the first application and the second application are executed to work with each other, in the first window, if the first window is moved to a location where the second window is displayed.

The device may detect a release of a user input in the first window, arranges the first window to be adjacent to the second window, in correspondence with the release of the user input, and display at least one of the first window and the second window to be visually distinguished from the other window from among the plurality of windows.

The device may receive a user input of moving the first window to a location where the second window is displayed, arrange the first window to be adjacent to the second window in response to the user input, and display a result, in which the first application and the second application are executed to work with each other, in at least one of the first window and the second window.

According to one or more exemplary embodiments, a non-transitory computer-readable storage medium having stored thereon a computer program, which when executed by a computer, performs the method.

According to one or more exemplary embodiments, a non-transitory computer-readable storage medium having stored thereon a computer program, which when executed by a computer, performs the method.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 illustrates examples of windows included in the window band, according to one or more exemplary embodiments;

FIG. 19 is a diagram illustrating an example in which a plurality of applications are executed to work with each other by dragging a window included in the window band, according to one or more exemplary embodiments;

FIG. 26 is a diagram illustrating an example of a home band according to one or more exemplary embodiments;

FIG. 50 is a diagram illustrating an example of executing an application that corresponds to an icon that is selected from among a plurality of icons and an application that corresponds to a certain window that is included in a plurality of windows to work with each other, according to one or more exemplary embodiments;

FIG. 51 is a diagram illustrating a second window that may work with a first window, according to one or more exemplary embodiments;

DETAILED DESCRIPTION

Figure 1:
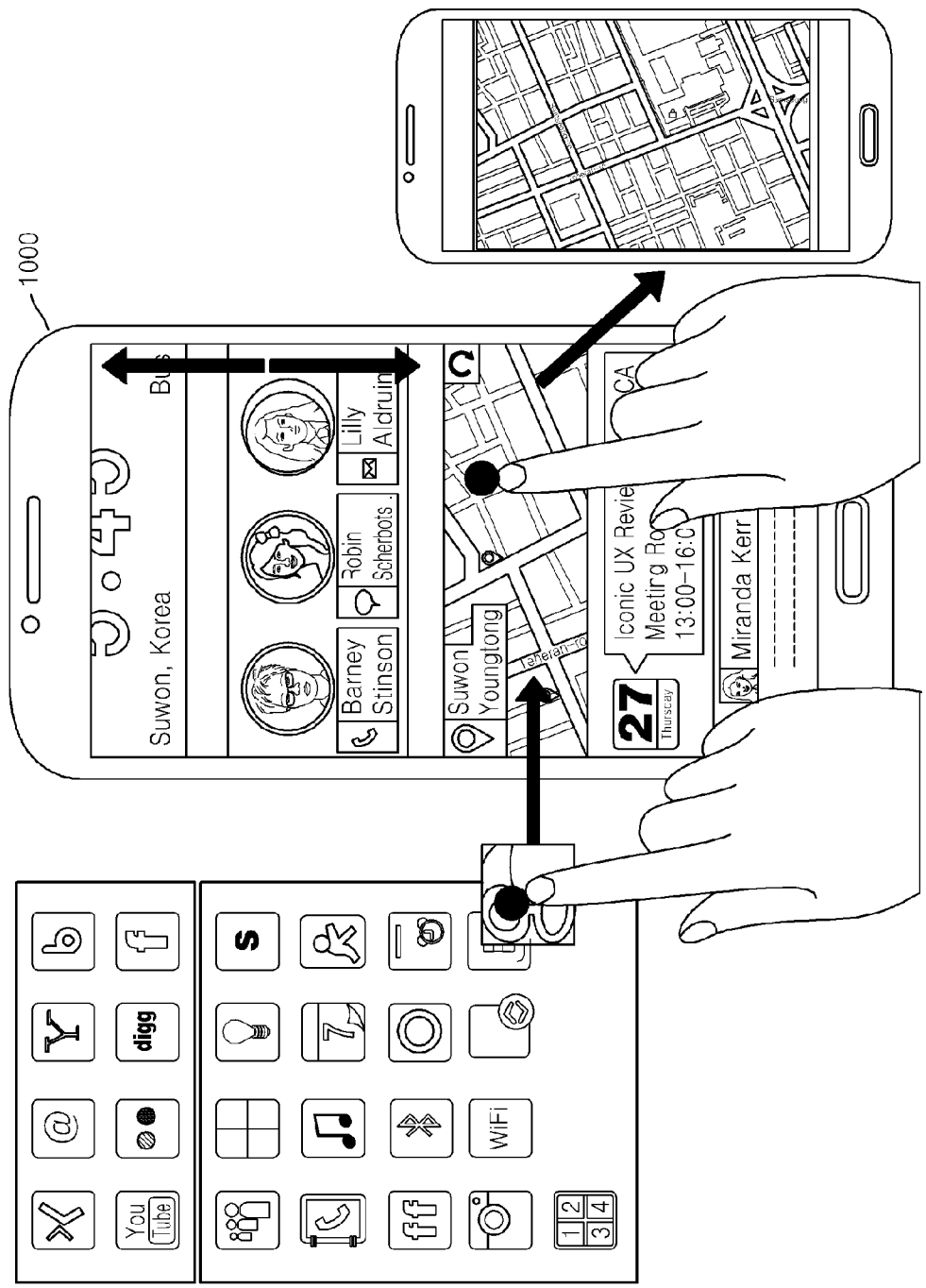
FIG. 1 is a diagram illustrating an example of displaying a window band and receiving a user input to the window band, which is performed by a device, according to one or more exemplary embodiments.

Reference will now be made in detail to one or more exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. Accordingly, the one or more exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

One or more exemplary embodiments will now be described more fully with reference to the accompanying drawings. One or more exemplary embodiments may, however, be embodied in many different forms and should not be construed as being limited to the exemplary embodiments set forth herein. In the description of one or more exemplary embodiments, certain detailed explanations of the related art are omitted when it is deemed that they may unnecessarily obscure the essence of the invention. Like numbers refer to like elements throughout the description of the figures.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

In the description of one or more exemplary embodiments, a window band refers to a user interface (UI) that is generated when a plurality of windows for displaying an execution result of an application are arranged to be adjacent to each other. A window arranged in the window band may correspond to at least one application and may display a preset result of executing at least one application.

In the description of one or more exemplary embodiments, the window band may be interpreted as a plurality of windows that are arranged to be adjacent to each other, but is not limited thereto.

In the description of one or more exemplary embodiments, a lock screen is a software screen for unlocking a device. As a predetermined user input is received by the lock screen, the device may be unlocked.

A lock band refers to a window band displayed on a lock screen.

A home screen refers to a main screen from among software screens of a device. The home screen refers to a software screen for controlling a preset operation of the device, or executing and controlling a preset application from among applications installed in the device.

A home band refers to an application band displayed on a home screen.

An application screen refers to a software screen on which a list of applications installed in the device is displayed. Icons of all applications installed in a device may be display on the application screen. By selecting an icon displayed on the application screen, a user may execute the application corresponding to the selected icon.

An application band refers to a window band displayed on an application screen.

In the description of one or more exemplary embodiments, a device provides a lock screen, a home screen, and an application screen, but is not limited thereto. A device may provide a lock screen and a home screen only.

Hereinafter, one or more exemplary embodiments will be described in detail with reference to the attached drawings.

FIG. 1 is a diagram illustrating an example of displaying a window band and receiving a user input to the window band, which is performed by a device 1000, according to one or more exemplary embodiments.

Referring to FIG. 1, the window band, in which a plurality of windows for displaying an execution result of an application are arranged to be adjacent to each other, may be displayed on a screen of the device 1000. The device 1000 may display a preset result of executing an application in real time on a window included in the window band. The device 1000 may control a function of an application that corresponds to each window, based on, as a non-limiting example, a user touch input to each window.

The device 1000 may scroll a window in the window band in an upward or downward direction, based on a user input of swiping the window band in an upward or downward direction. The device 1000 may also execute a predetermined function of an application that corresponds to an application icon, based on a user input of moving the application icon on the window band, and add a window that represents a result of execution to the window band.

Figure 2:
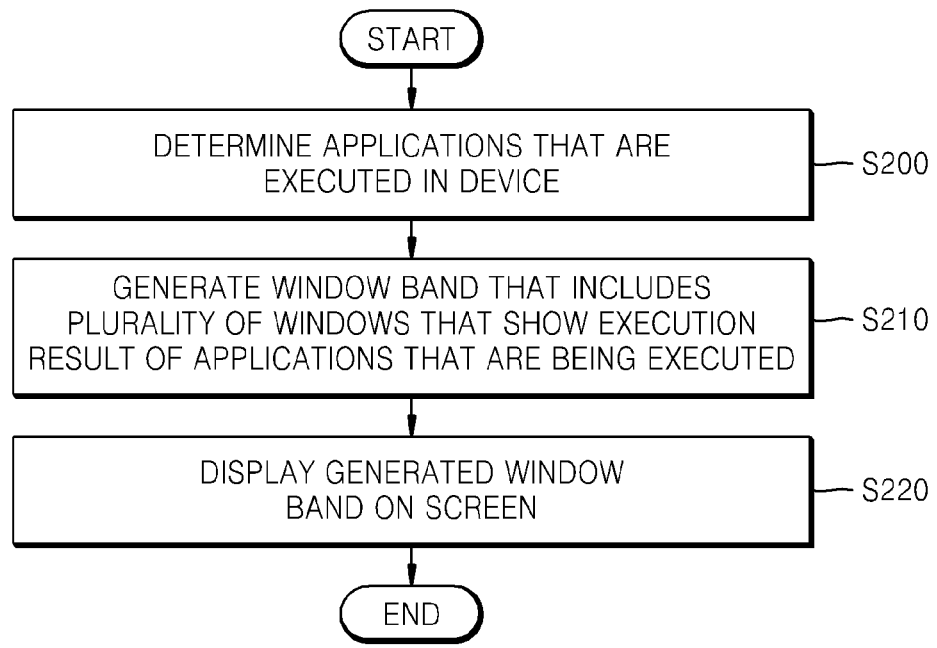
FIG. 2 is a flowchart of a method of generating and displaying the window band, which is performed by the device, according to one or more exemplary embodiments.

FIG. 2 is a flowchart of a method of generating and displaying the window band, which is performed by the device 1000, according to one or more exemplary embodiments.

In operation S200, the device 1000 determines an application that is executed in the device 1000. The device 1000 may identify an application that is executed in the device 1000 and check a function that is executed from among functions of the identified application.

In operation S210, the device 1000 generates the window band that includes a plurality of windows that show an execution result of an application that is being executed. The device 1000 may generate the window band by generating a plurality of windows that show an execution result of an application that is being executed and arranging the plurality of windows to be adjacent to each other.

The device 1000 may also generate a window that shows only a preset part of an execution result of an application that is being executed. The device 1000 may display only a part of a whole area of an execution screen of an application on the window. For example, if an application is a web browser, the device 1000 may generate a window that shows only an address input window of the web browser.

The device 1000 may select some applications from among applications that are being executed and generate windows that respectively show an execution result of the selected applications.

The device 1000 may arrange a plurality of generated windows according to preset criteria. For example, the device 1000 may locate a window of an application that is frequently used by a user on an upper part of the window band. Additionally, for example, the device 1000 may locate a window of an application that was recently used by a user on an upper part of the window band, but is not limited thereto.

In operation S220, the device 1000 displays the generated window band on a screen of the device 1000. The window band may include, for example, a lock band, a home band, and an application band. The device 1000 may display a lock band on a lock screen and display a home band on a home screen. The device 1000 may display an application band on an application screen.

The device 1000 may set situation information that matches a window. Situation information may include, for example, the time, the weather, a temperature, a day of the week, a type of an application that is executed by the device 1000, and a schedule of a user. Additionally, if the device 1000 determines that a current situation of the device 1000 corresponds to a preset situation, the device 1000 may display or remove a window that corresponds to the current situation in or from the window band. For example, if a current time is a time that is preset by a user, the device 1000 may display a window in the window band.

Figure 3:
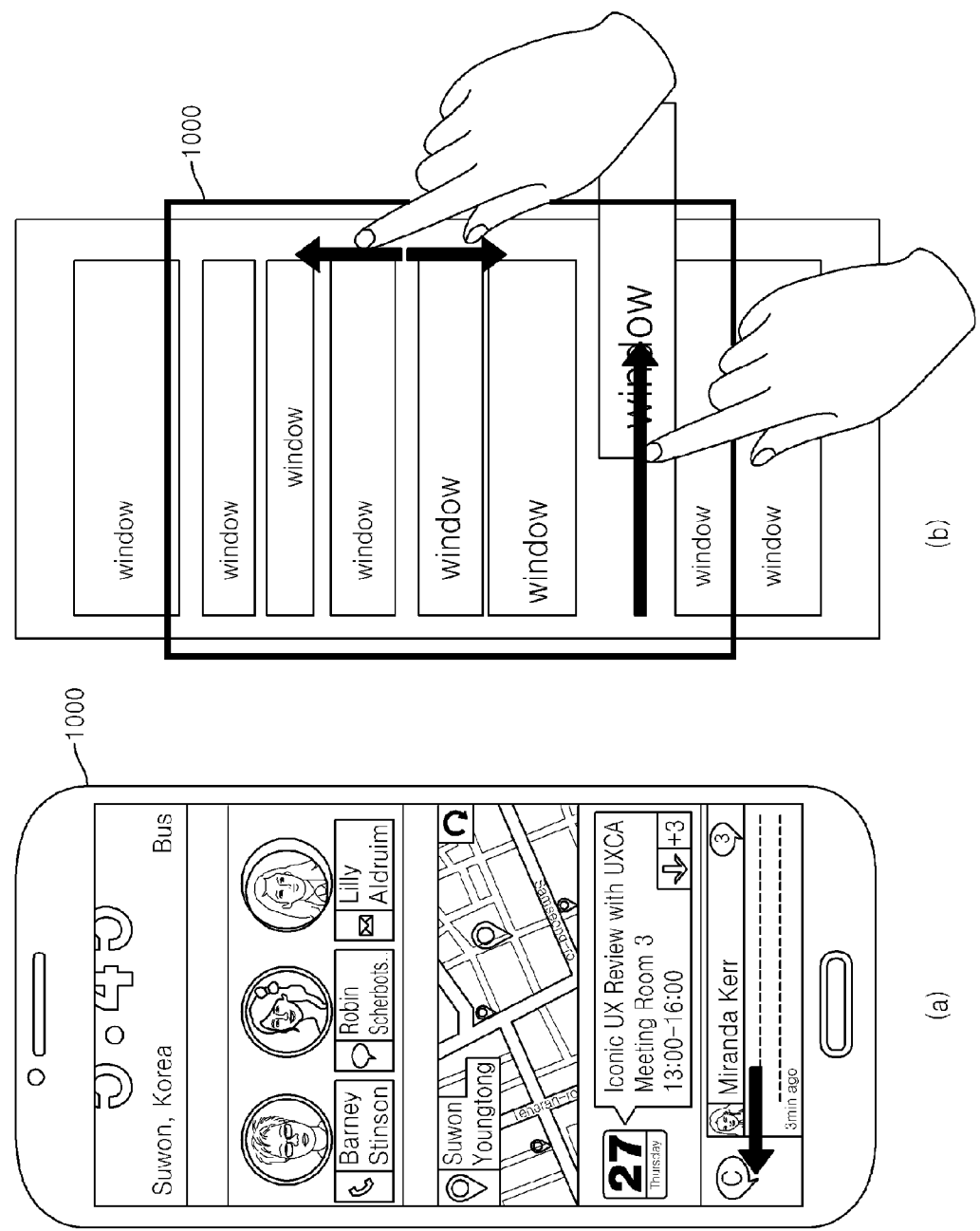
FIG. 3 is a diagram illustrating an example of the window band displayed on the device, according to one or more exemplary embodiments.

FIG. 3 is a diagram illustrating an example of the window band displayed on the device 1000, according to one or more exemplary embodiments.

Referring to (a) of FIG. 3, the device 1000 may display the window band, in which a plurality of windows that show an execution result of an application are arranged in a vertical direction, on a screen of the device 1000. A window may be rectangular-shaped, and a length of a width of the window may be identical to a length of a width of the screen of the device 1000. The device 1000 may update an execution result of an application in the window and display the updated result in the window. Additionally, the device 1000 includes a result of executing a preset function, from among functions of the application. Additionally, the device 1000 may display only a part of a whole area of an execution screen, in which an application is executed, on the window.

Referring to (b) of FIG. 3, the device 1000 may scroll the window band based on a user input. For example, if a user input of swiping the window band in an upward or downward direction is received, the device 100 may scroll the window band in an upward or downward direction. Additionally, the device 100 may remove a certain window from the window band based on a user input. For example, if a certain window in the window band is touched for a preset period of time and a user input of swiping the touched window in a right direction is performed, the device 1000 may delete the touched window from the window band.

FIG. 4 illustrates examples of windows included in the window band, according to one or more exemplary embodiments.

Referring to (a) of FIG. 4, a window included in the window band may be a window for controlling a predefined function of a certain application. Additionally, a window may be generated by a predefined template, and a certain object in the template may map a particular function of the application. For example, a window for performing only a function of controlling music playback from among several functions of a music playback application may be preset by an application manufacturer. Additionally, a plurality of buttons for controlling a predefined function may be included in the window.

Referring to (b) of FIG. 4, a window may be a window in which an execution result with respect to an area in an execution screen of an application, which is designated by a user, is displayed. For example, a user may select an area in an execution screen of a message transmission application, and the device 1000 may display an execution result that is displayed in the part of the area selected by the user, from among execution results of the message transmission application, on the window.

Referring to (c) of FIG. 4, a window may be a window in which information collected from the web in real time is displayed. Preset content collected from a certain web site may be updated and displayed in the window in real time. For example, broadcasting content received from a certain broadcasting channel may be displayed in the windows in real time. An area selected by a user from the whole area of a certain web page may be displayed in the window.

Figure 5:
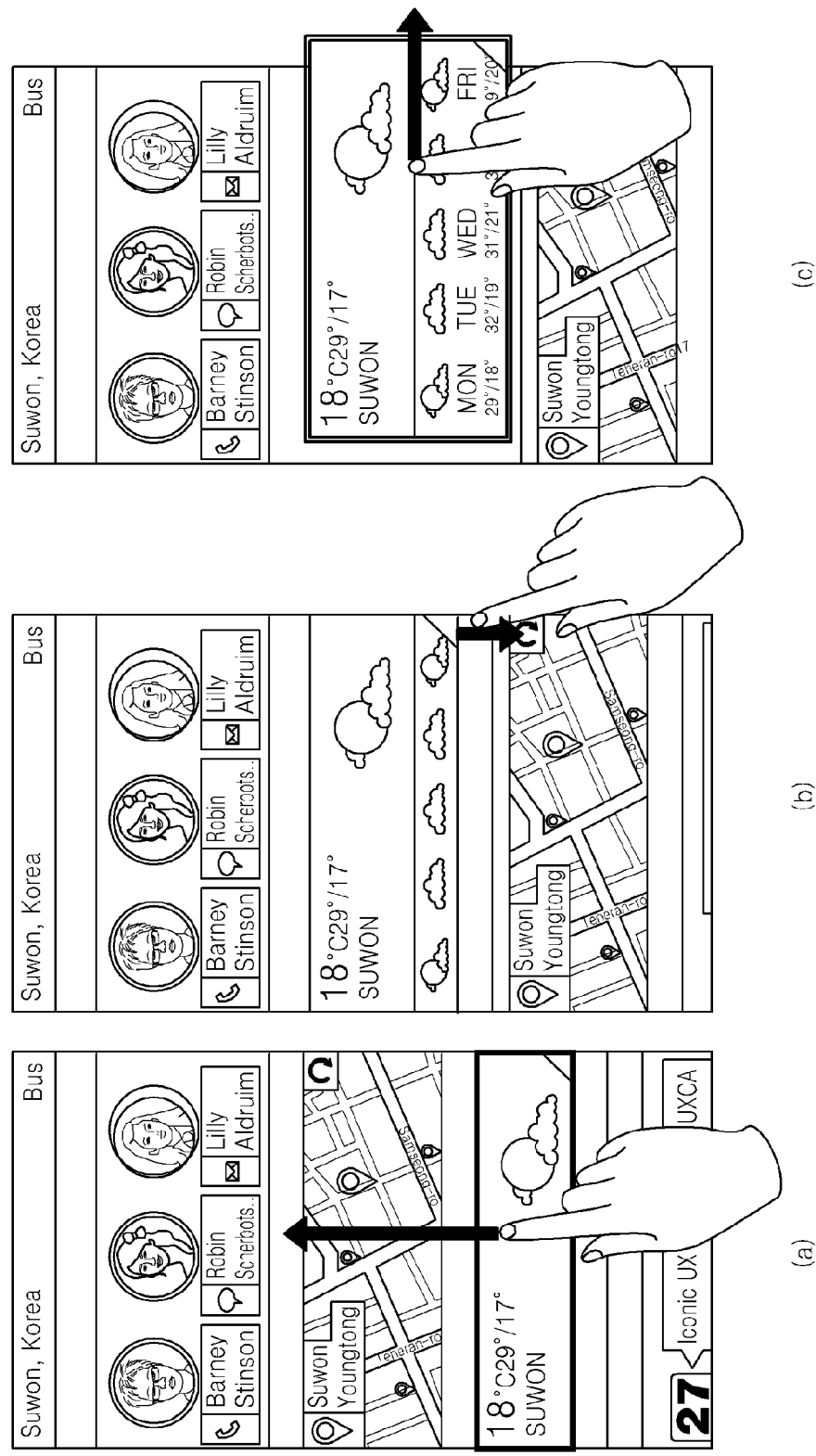
FIG. 5 is a diagram are diagrams illustrating an example of editing the window band according to a user input to the window band, according to one or more exemplary embodiments.

FIG. 5 is a diagram illustrating an example of editing the window band according to a user input to the window band, according to one or more exemplary embodiments.

Referring to (a) of FIG. 5, the device 1000 may change a location of a window in the window band, based on a user input to the window band. For example, if a certain window is touched for a preset period of time and a user input of dragging and dropping the touched window is performed, the device 100 may change a location where the touched window is displayed. In this case, if the touched window is dropped on a boundary area between other windows, the device 1000 may place the touched window between the other windows.

Referring to (b) of FIG. 5, the device 1000 may change a size of a window in the window band, based on a user input to the window band. For example, if a user input of touching an edge of the window for a preset period of time and dragging the touched edge is received, the device 1000 may expand an area of the touched window. More data may be displayed on the expanded window than data displayed in the window before the window is expanded.

Referring to (c) of FIG. 5, the device 1000 may delete a window in the window band, based on a user input to the window band. For example, if an input of touching the window for a preset period of time and swiping the touched window in a left or right direction is received, the device 1000 may remove the touched window from the window band.

Figure 6:
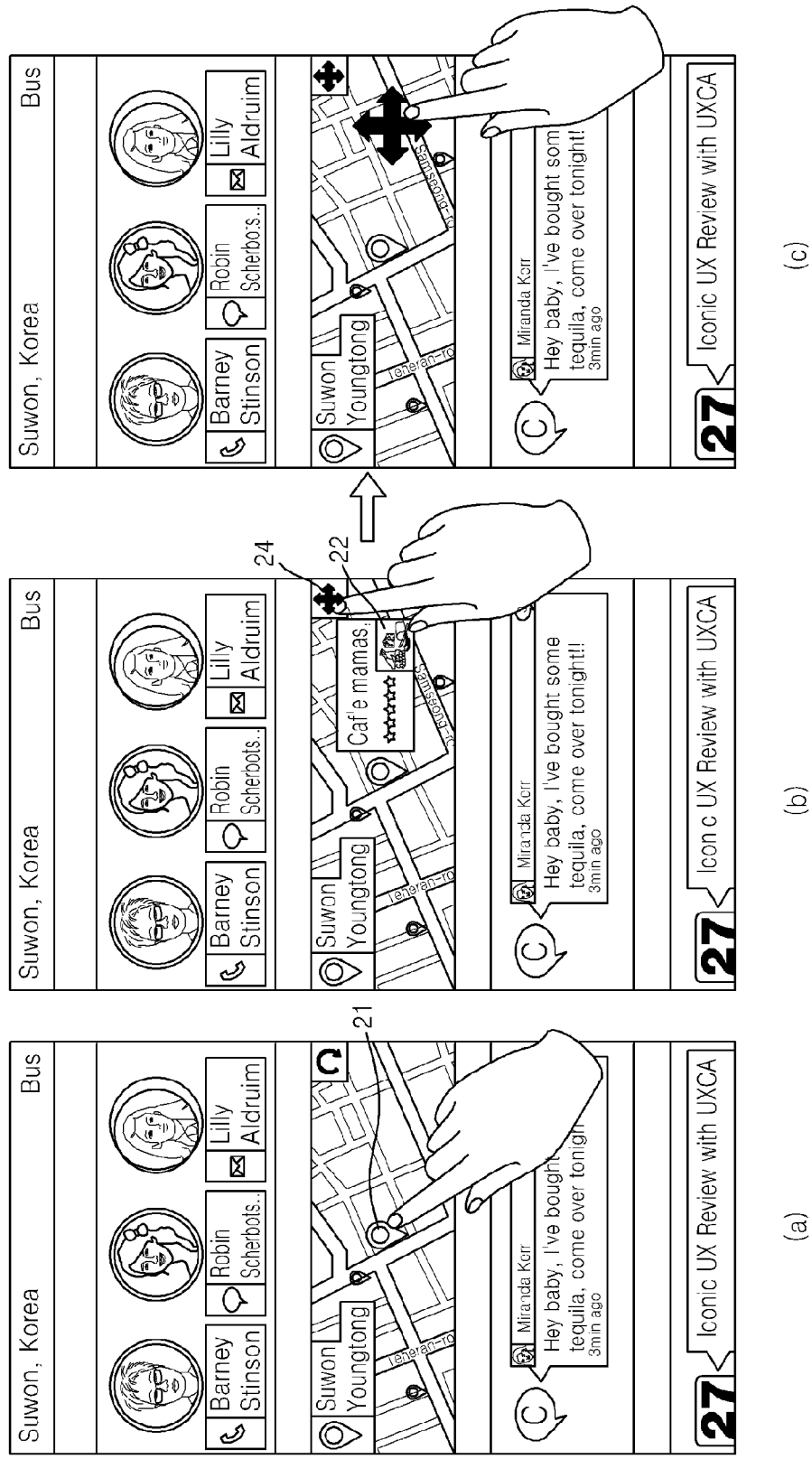
FIG. 6 is a diagram illustrating an example in which a window of a map application in the window band is used by a user, according to one or more exemplary embodiments.

FIG. 6 is a diagram illustrating an example in which a window for a map application in the window band is used by a user, according to one or more exemplary embodiments.

Referring to (a) of FIG. 6, the device 1000 may display a window of a map application in the window band. A part of a map image, provided by the map application, may be displayed in the window of the map application. For example, a map within a preset scope, with reference to a current location of the device 1000, may be displayed in the window.

When a user touches a certain point 21 on a map displayed in a window of a map application, as shown in (a) of FIG. 6, local area information 22 regarding the touched point 21 may be displayed in the window, as shown in (b) of FIG. 6.

After a user presses a button 24 for moving a map image, if the user drags the map image in an up, down, left, or right direction, the map image may be moved in the window, as shown in (c) of FIG. 6.

Figure 7:
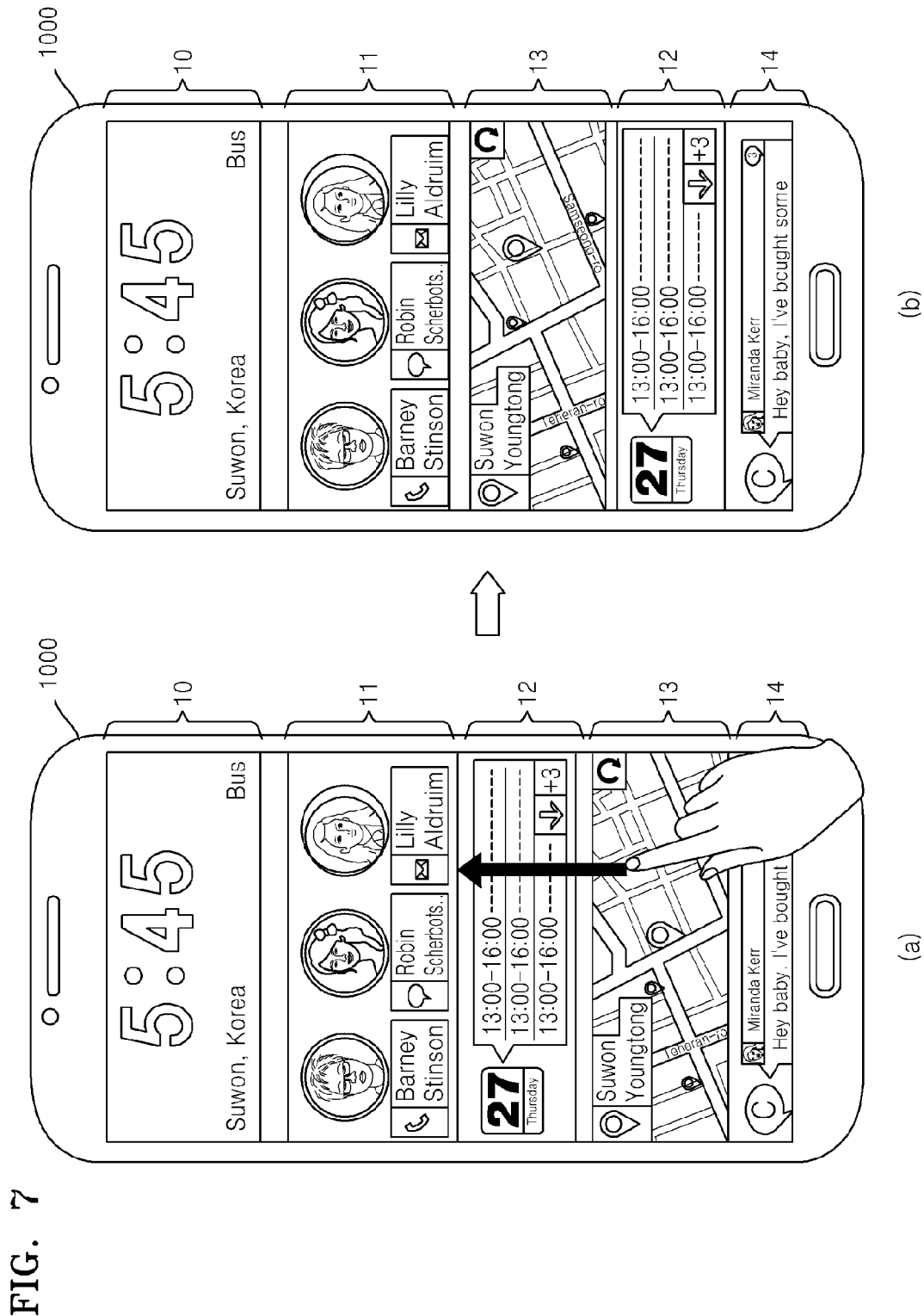
FIG. 7 is a diagram illustrating an example of moving a location of a window in the window band, according to one or more exemplary embodiments.

FIG. 7 is a diagram illustrating an example of moving a location of a window in the window band, according to one or more exemplary embodiments.

As shown in (a) of FIG. 7, a window 10, a window 11, a window 12, a window 13, and a window 14 may be arranged in the window band. Additionally, a user may touch the window 13 for a preset period of time, and drag and drop the touch window 13 to an area of a boundary between the window 11 and the window 12.

Accordingly, as shown in (b) of FIG. 7, the window 13 may be placed between the window 11 and the window 12.

Figure 8:
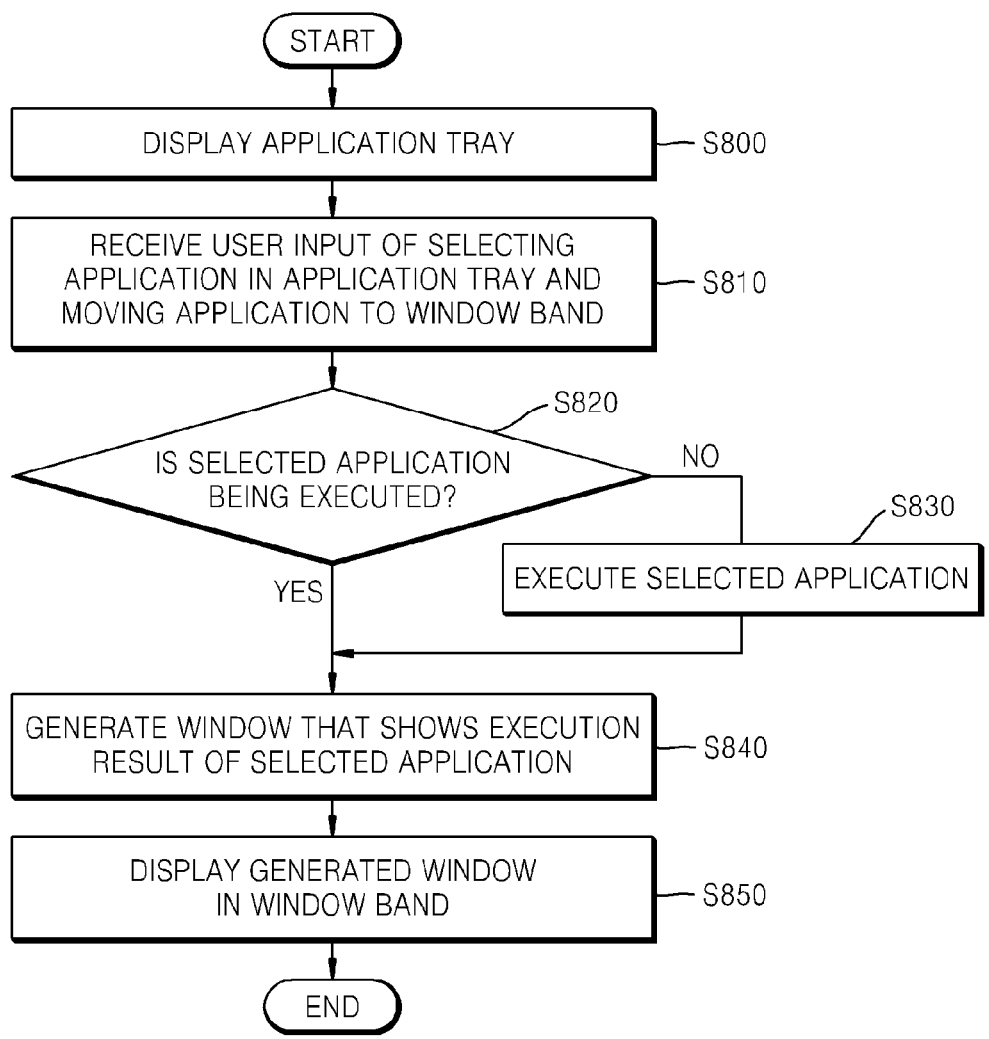
FIG. 8 is a flowchart of a method of generating a window in the window band by using an application tray, according to one or more exemplary embodiments.

FIG. 8 is a flowchart of a method of generating a window in the window band by using an application tray, according to one or more exemplary embodiments.

In operation S800, the device 1000 may display the application tray on a screen of the device 1000. The application tray may be a window in which icons of applications installed in the device 1000 are displayed. Additionally, for example, if a user input of touching and dragging an area of a left edge of the screen of the device 1000 is received, the device 1000 may overlap the application tray with the window band displayed on the screen of the device 1000.

In operation S810, the device 1000 receives a user input of selecting an application in the application tray and moving the application to the window band. The device 1000 may receive a user input of touching an application icon in the application tray, and dragging and dropping the touched application icon in the window band.

In operation S820, the device 1000 determines whether the application selected from the application tray is being executed.

As a result of the determining in operation S820, if the selected application is not being executed, the device 1000 executes the selected application in operation S830. In operation S830, the device 1000 may activate the selected application. Additionally, the device 1000 may execute some preset functions from among functions of the selected application. In this case, the application may include a plurality of function modules, and the device 1000 may execute some functions of the application by calling some of the plurality of function modules. However, one or more exemplary embodiments are not limited thereto.

In operation S840, the device 100 generates a window that shows an execution result of the selected application. Additionally, the device 1000 may generate a window in which only some preset execution results of the application, from among execution results of the application that is being executed. Additionally, the device 1000 may display only a part of a whole area of an execution screen of the application. For example, if the application is a web browser, the device 1000 may generate a window in which only an address input window of the web browser is shown.

In operation S850, the device 1000 displays the generated window in the window band. The device 1000 may insert the generated window into a certain location in the window band. For example, if an application, selected from the application tray by a user, is moved to an area of a boundary between a first window and a second window in the window band, the device 1000 may insert a window, which shows an execution result of the selected application, between the first window and the second window.

Figure 9:
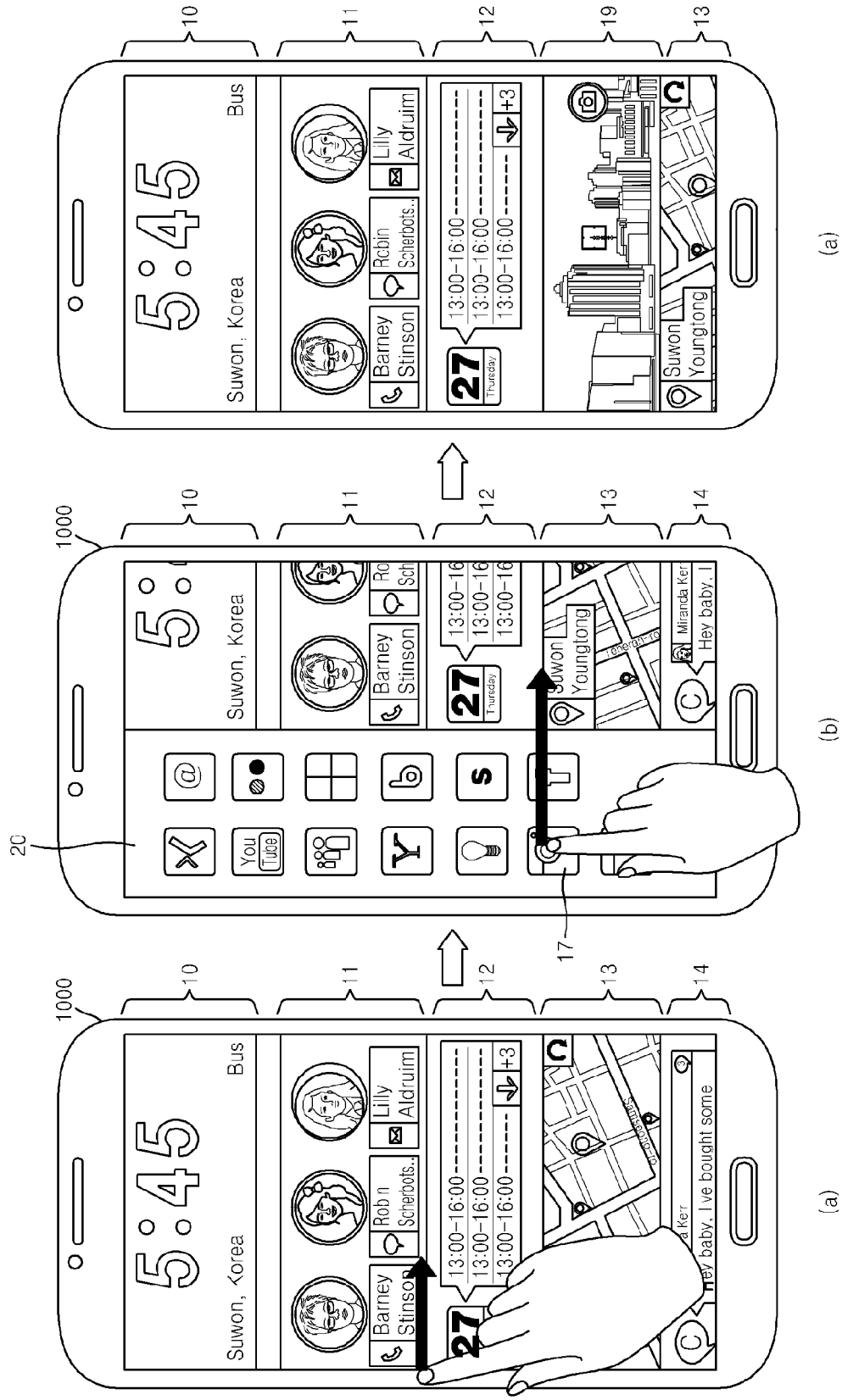
FIG. 9 is a diagram illustrating an example of adding a window to the window band by using an application tray, according to one or more exemplary embodiments.

FIG. 9 is a diagram illustrating an example of adding a window to the window band by using an application tray, according to one or more exemplary embodiments.

Referring to (a) of FIG. 9, the window 10, the window 11, the window 12, the window 13, and the window 14 may be arranged in the window band. Additionally, a user may touch and drag a left edge of a screen of the device 1000 in a right direction.

Accordingly, as shown in (b) of FIG. 9, an application tray 20 that includes icons of a plurality of applications may overlap with the window band. Additionally, a user may touch an icon 17 of a camera application in the application tray 20 and drag the touched icon 17 between an area of a boundary between the window 12 and the window 13.

Accordingly, as shown in (c) of FIG. 9, the device 1000 may execute the camera application and activate a photographing function of the camera application. Additionally, the device 1000 may display an execution result of the photographing function of the camera application. A UI for photographing may be displayed in the window 19. Additionally, a user may capture an image by using the displayed UI, and a result of the photographing may be displayed in a window 19.

Figure 10:
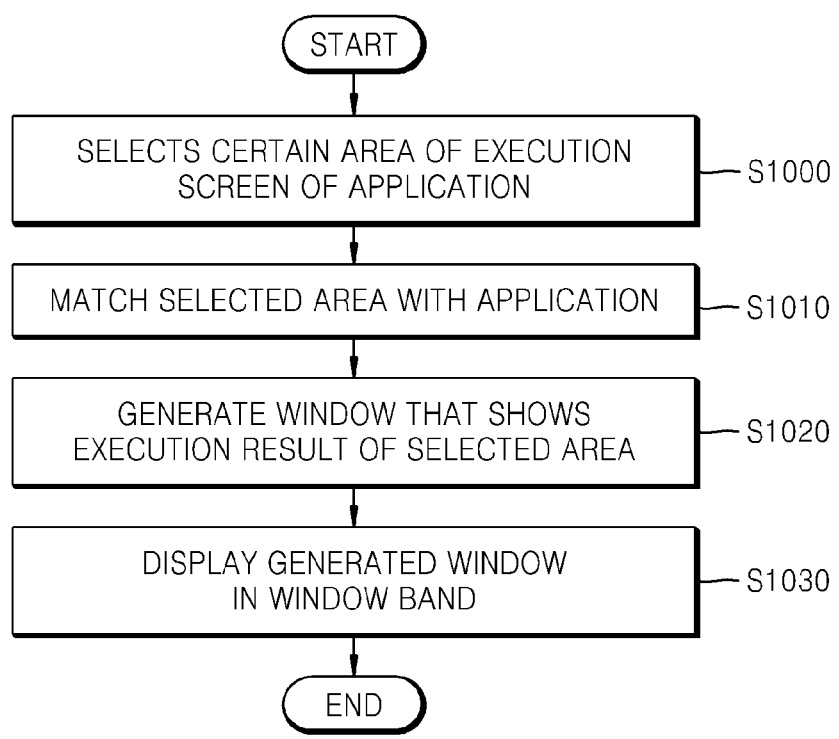
FIG. 10 is a flowchart of a method of generating a window in the window band by selecting a certain area in an execution screen of an application, which is performed by the device, according to one or more exemplary embodiments.

FIG. 10 is a flowchart of a method of generating a window in the window band by selecting a certain area in an execution screen of an application, which is performed by the device 1000, according to one or more exemplary embodiments.

In operation S1000, the device 1000 selects a certain area of an execution screen of the application. The execution screen of the application may be an execution screen displayed on a whole area of a screen of the device 1000.

Additionally, for example, a user may touch and drag, and thus, select a partial area of the execution screen of the application, which is displayed on the whole screen of the device 1000.

In operation S1010, the device 1000 matches the selected area with the application. The device 1000 may match an identification value of the application with the area selected in operation S1000. In this case, an execution result displayed in the area that is selected in operation S1000, from among the execution results of the application, may be included in a window that will be described later. Additionally, the device 1000 may match an identification value of the application with a function that corresponds to the area selected in operation S1000. In this case, an execution result regarding the function that corresponds to the area that is selected in operation S1000, from among the execution results of the application, may be included in a window that will be described later.

In operation S1020, a window that shows the execution result in the selected area is generated. The device 1000 may generate a window that shows the execution result of the area that is selected in operation S1000, from among the execution results of the application. Additionally, the device 1000 may execute only a function that corresponds to the area that is selected in operation S1000, from among the execution results of the application, and generate a window, which shows an execution result of the function that corresponds to the area selected in operation in S1000.

In operation S1030, the device 1000 displays the generated window in the window band. The device 1000 may insert the generated window into a certain location in the window band.

Figure 11:
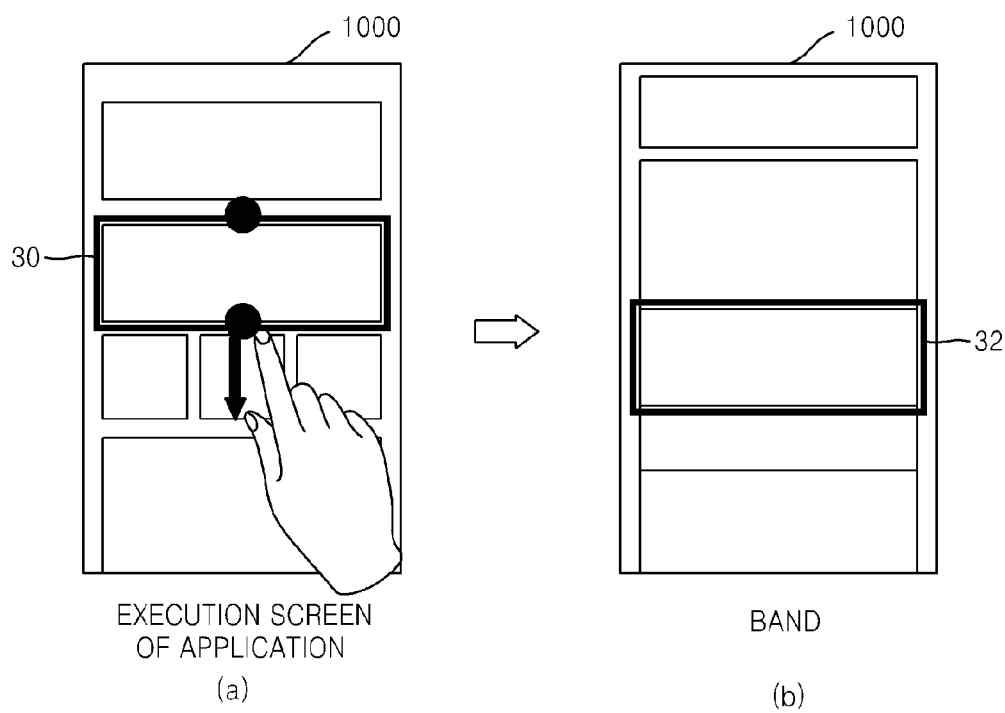
FIG. 11 is a diagram illustrating an example of adding a window to the window band by selecting a certain area in an execution screen of an application, which is performed by the device, according to one or more exemplary embodiments.

FIG. 11 is a diagram illustrating an example of adding a window 32 to the window band by selecting a certain area in an execution screen of an application, which is performed by the device 1000, according to one or more exemplary embodiments.

Referring to (a) of FIG. 11, an execution result of one application may be displayed in a whole area of a screen of the device 1000. The device 1000 may select a partial area 30 of the whole area of the screen of the device 1000. As a user touches and drags a certain point of the screen of the device 1000, the device 1000 may select the partial area 30 in the whole area of the screen of the device 1000. For example, the device 1000 may display an execution result of a phonebook application on a whole area of the screen of the device 1000 and may select an area in which a certain phone number is displayed, based on a user input.

Referring to (b) of FIG. 11, the device 1000 may generate the window 32 for indicating an execution result, displayed on the partial area 30 that was selected, as illustrated in (a) of FIG. 11, and display the generated window 32 in the window band.

Figure 12:
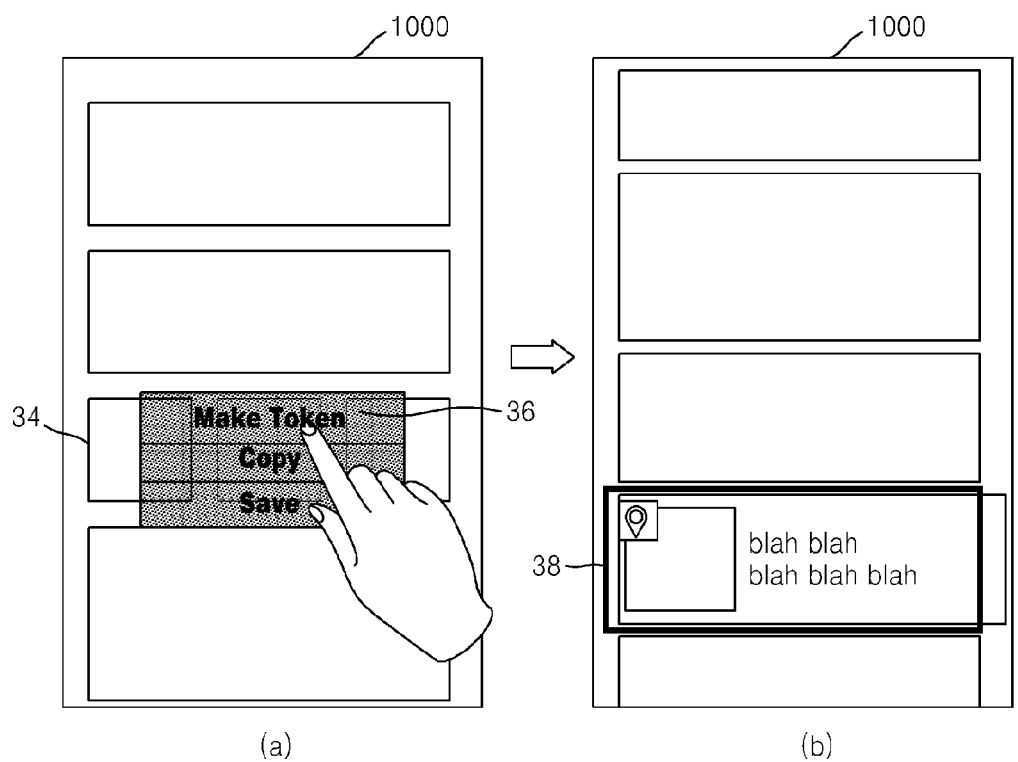
FIG. 12 is a diagram illustrating an example of selecting a certain area in an execution screen of an application and generating a window by working with situation information, which is performed by the device, according to one or more exemplary embodiments.

FIG. 12 is a diagram illustrating an example of selecting a certain area in an execution screen of an application and generating a window 38 by working with situation information, which is performed by the device 1000, according to one or more exemplary embodiments.

Referring to (a) of FIG. 12, an execution result of one application may be displayed in a whole area of a screen of the device 1000. The device 1000 may select a partial area 34 of the whole area of the screen of the device 1000 based on a user input. Additionally, the device 1000 may display a button 36 for setting situation information of a window 38 for indicating an execution result displayed on the selected partial area 34. A user may select the button 36 and input certain situation information. The situation information may include, for example, the time, the weather, a day of the week, a type of an application executed by the device 1000, or a schedule of the user. If the user selects the button 36, the device 1000 may display a certain UI for inputting the situation information.

Referring to (b) of FIG. 12, if the device 1000 determines that a current situation of the device 1000 corresponds to a situation that was set as described with reference to (a) of FIG. 12, the device 1000 may display the window 38 for indicating an execution result displayed in the selected partial area 34, in the window band.

Figure 13:
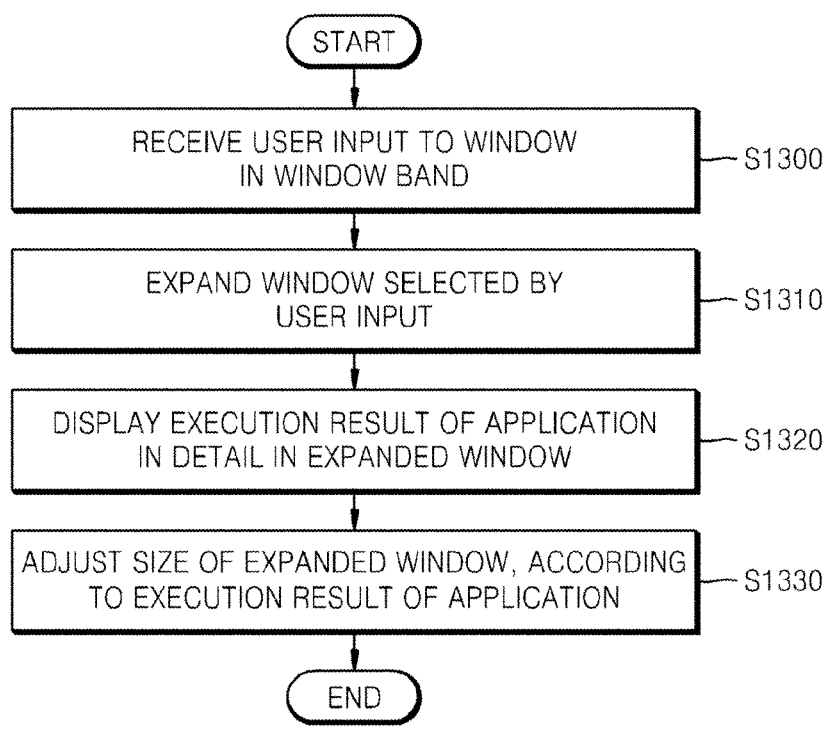
FIG. 13 is a flowchart of a method of displaying an execution result of an application, which is performed by the device, as a window in the window band is expanded, according to one or more exemplary embodiments.

FIG. 13 is a flowchart of a method of displaying an execution result of an application, which is performed by the device 1000, as a window in the window band is expanded, according to one or more exemplary embodiments.

In operation S1300, the device 1000 receives a user input to a window in the window band. For example, the device 1000 may receive a user input of touching and dragging an edge of a window in the window band.

In operation S1310, the device 1000 expands a window selected by a user input. As the user touches and drags an edge of a window in the window band, the device 1000 may expand the window touched by the user.

In operation S1320, the device 1000 displays an execution result of an application in detail in the expanded window. As the window is expanded, the device 1000 may display an execution result of an application that corresponds to the window in detail. For example, if the window is a window that shows an execution result of a weather application, before the window is expanded, only the current weather may be displayed in the window. After the window is expanded, the week's weather, including the current weather, may be displayed. Additionally, if the window is a window that shows an execution result of a phonebook application, before the window is expanded, a name and a phone number of another user may be displayed in the window. After the window is expanded, a photograph of the other user may be additionally displayed in the window.

In operation S1330, the device 1000 adjusts a size of the expanded window, according to an execution result of the application. The device 1000 may control an operation of an application that corresponds to the window, based on a user input to the window. Additionally, as the application is operated, an execution result of the application may be changed. Accordingly, the device 1000 may determine a type and the amount of data that indicates the execution result of the application, and adjust a size of the window that displays the execution result of the application. For example, if the window displays a calendar as an execution result of a calendar application and a user touches a particular date in the calendar, the device 1000 may expand the window and display schedule information of the user regarding the touched date in the expanded window.

Figure 14:
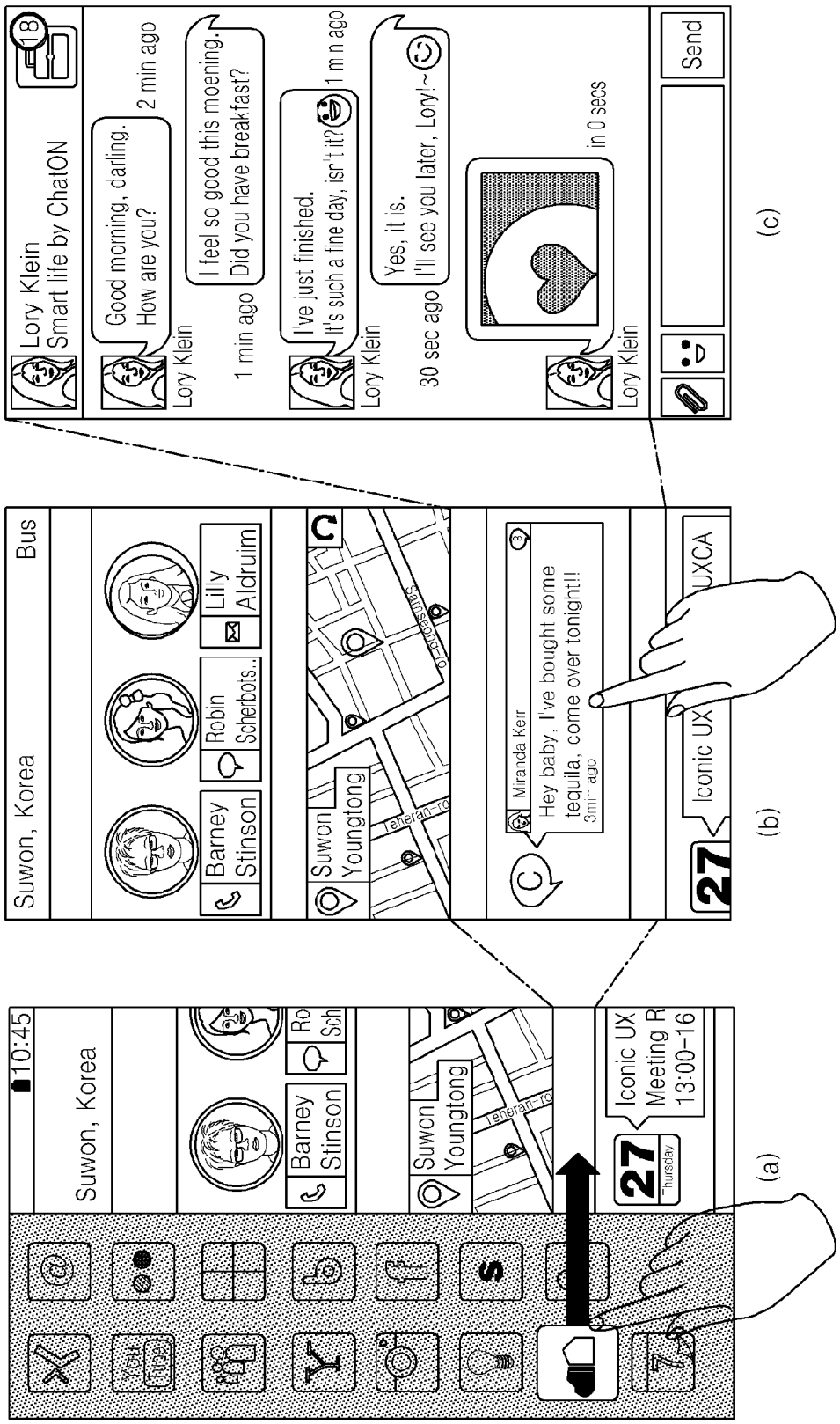
FIG. 14 is a diagram illustrating an example of generating a window, based on a user input, and displaying an execution result of an application that corresponds to the generated window on the whole screen of the device, which is performed by the device, according to one or more exemplary embodiments.

FIG. 14 is a diagram illustrating an example of generating a window, based on a user input, and displaying an execution result of an application that corresponds to the generated window on the whole screen of the device 1000, which is performed by the device 1000, according to one or more exemplary embodiments.

Referring to (a) of FIG. 14, an application tray is displayed on a left side of a screen of the device 1000, and a user may select an icon of a messenger application displayed on the application tray and move the selected icon to the window band. For example, the device 1000 may select an icon of a messenger application displayed on the application tray and move the selected icon to the window band.

Referring to (b) of FIG. 14, the device 1000 may execute some functions of an application associated with the selected icon and display a window that shows an execution result in the window band. For example, if an icon of a messenger application is moved to the window band, the device 1000 may display only a message that has been recently received, from among several messages received by the device 1000, in the window. The device 1000 may display only a message that has been recently received from a particular contact, from among several contacts registered to send messages to the device 1000.

Additionally, if a window of an application associated with the selected icon is selected, as shown in (c) of FIG. 14, an execution result of the application may be displayed on a whole area of a screen of the device 1000. For example, if a user selects a window of the messenger application, the device 1000 may display messages that have been recently transmitted from or received by the device 1000, in the window. The device 1000 may display only messages that have been recently transmitted to or received from a particular contact, from among several contacts registered to send and receive messages with the device 1000.

Figure 15:
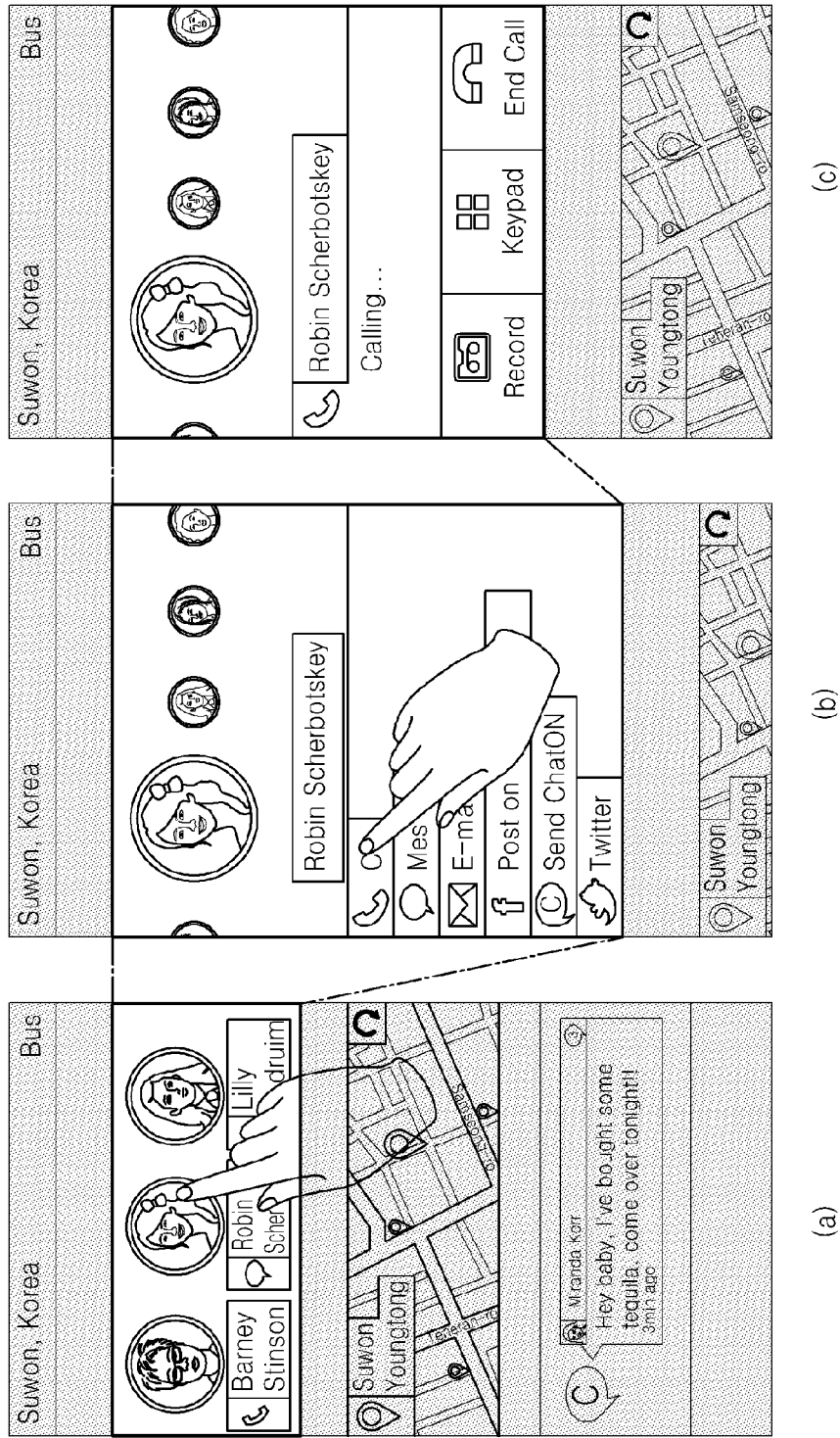
FIG. 15 is a diagram illustrating an example in which a window of a phonebook application in the window band is expanded or reduced based on a user input, according to one or more exemplary embodiments.

FIG. 15 is a diagram illustrating an example in which a window of a phonebook application in the window band is expanded or reduced based on a user input, according to one or more exemplary embodiments.

Referring to (a) of FIG. 15, a window that shows an execution result of the phonebook application (a window of a phonebook application) may be displayed in the window band. Additionally, a contact list may be displayed in the window of the phonebook application, and a user may select a certain contact from the contact list.

Referring to (b) of FIG. 15, as the certain contact is selected, the device 1000 may expand the window of the phonebook application and display additional detailed information about an operation of the phonebook application in the expanded window. For example, the device 1000 may expand the window of the phonebook application and additionally display a button for calling the selected contact and a button for transmitting or receiving a message to or from the selected contact in the expanded window.

Referring to (c) of FIG. 15, the device 1000 may reduce the window of the phonebook application according to an execution result of the phonebook application and display other information in the reduced window. For example, as a button for calling the selected contact in the window of the phonebook application, the device 1000 may call the selected contact. Additionally, the device 1000 may reduce the window of the phonebook application and display a button for controlling an operation of the device 1000 while making a phone call.

Figure 16:
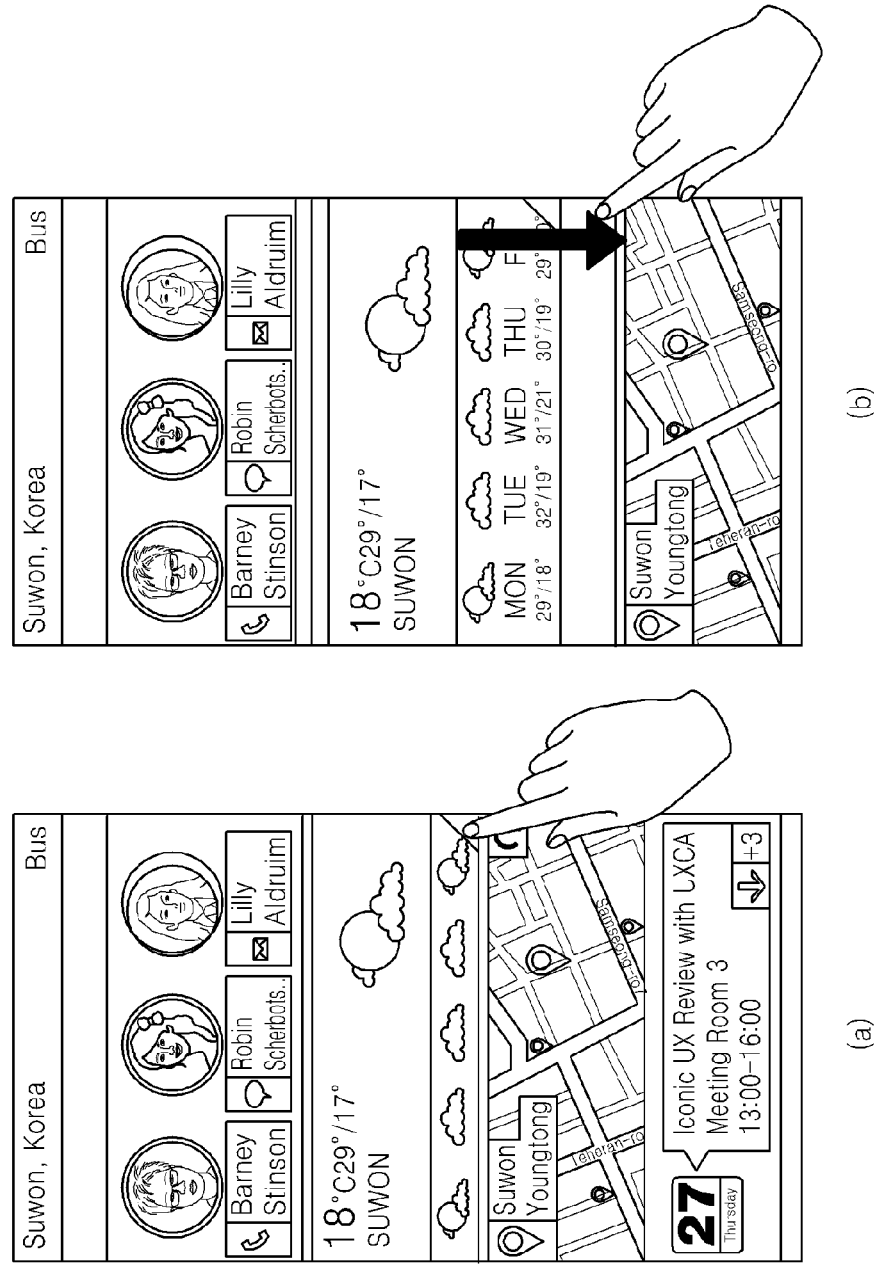
FIG. 16 is a diagram illustrating an example in which a window that shows an execution result of a weather application is expanded, according to one or more exemplary embodiments.

FIG. 16 is a diagram illustrating an example in which a window, which shows an execution result of a weather application, is expanded according to one or more exemplary embodiments.

Referring to (a) of FIG. 16, a window, which shows an execution result of a weather application (a window of the weather application), may be displayed in the window band. Additionally, information about today's weather may be displayed in the window of the weather application.

Referring to (b) of FIG. 16, if a user input of touching and dragging an edge of a lower part of the window of the weather application in a downward direction of the window is received, the device 1000 may expand the window of the weather application. Additionally, the device 1000 may display the week's weather in the expanded window of the weather application. Although a weather application is shown, this is only an example, and, according to one or more exemplary embodiments, a different window may be expanded in a similar manner.

Figure 17:
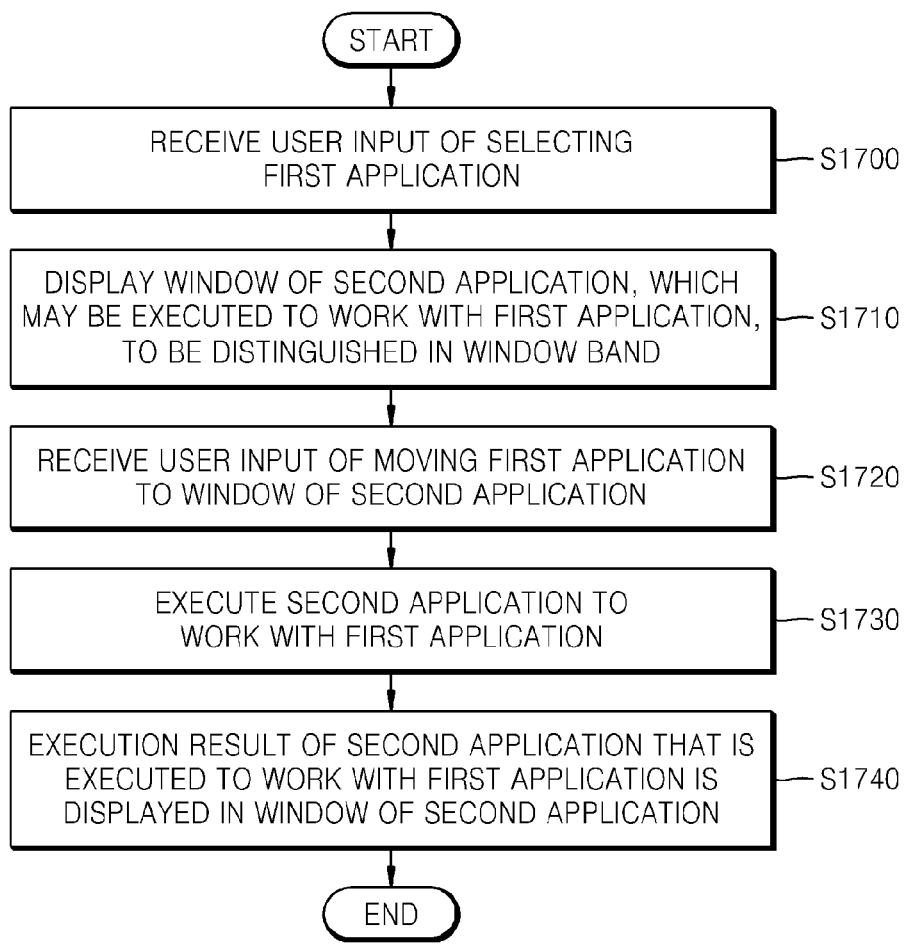
FIG. 17 is a flowchart of a method of executing a plurality of applications to work with each other by using the window band, according to one or more exemplary embodiments.

FIG. 17 is a flowchart of a method of executing a plurality of applications to work with each other by using the window band, according to one or more exemplary embodiments.

In operation S1700, the device 1000 may receive a user input of selecting a first application. The device 1000 may select a first application by selecting an icon of the first application displayed on an application tray. Additionally, the device 1000 may select a first application by selecting a window of the first application from among windows in the window band. Additionally, the device 1000 may select a first application by selecting an icon of the first application displayed on an application screen.

In operation S1710, the device 1000 displays a window of a second application, which may be executed to work with the first application, to be distinguished from other windows in the window band. The second application that may be executed to work with the first application may employ a function of the first application or data of the first application. The data of the first application may include data input via the first application and data collected by the first application. Additionally, for example, the first device 1000 may change and display a color or a thickness of an edge of a window of the second application that may be executed to work with the first application. Additionally, for example, the device 1000 may display a window of the second application in 3D. Additionally, for example, the device 1000 may display the window of the second application to be brighter than another window. However, exemplary embodiments are not limited thereto.

Additionally, the device 1000 may identify a second application that may work with the first application, based on an identification value, a type, and data of the first application. For example, based on an identification value, a type, and data of the first application, a second application that may be executed to work with the first application may be preset and, based on the presetting, the device 1000 may identify a second application that may be executed to work with the first application. As a non-limiting example, if the data of the first application is location information, the device 1000 may determine that a map application may be executed to work with the first application. Additionally, the device 1000 may determine an application, associated with a window adjacent to a window of the first application, as a second application.

In operation S1720, the device 1000 receives a user input of moving the first application to a window of the second application. The device 1000 may receive a user input of touching an icon of the first application, which is displayed on an application tray, and dragging the touched icon to a window of the first application in the window band. Additionally, the device 1000 may receive a user input of touching an icon of the first application displayed on an application screen, and dragging the touched icon to a window of the first application in the window band.

In operation S1730, the device 1000 executes the second application to work with the first application. The device 1000 may control the second application so that the second application may use a function of the first application. Additionally or alternatively, the device 1000 may control the second application so that the second application may use data of the first application.

In operation S1740, an execution result of the second application that is executed to work with the first application is displayed in a window of the second application. The device 1000 may visually display the execution result of the second application that is executed to work with the first application in the window of the second application. For example, if the second application that is a map application uses location information obtained from the first application, the second application may visually display location information, obtained from the first application, on a map image.

Figure 18:
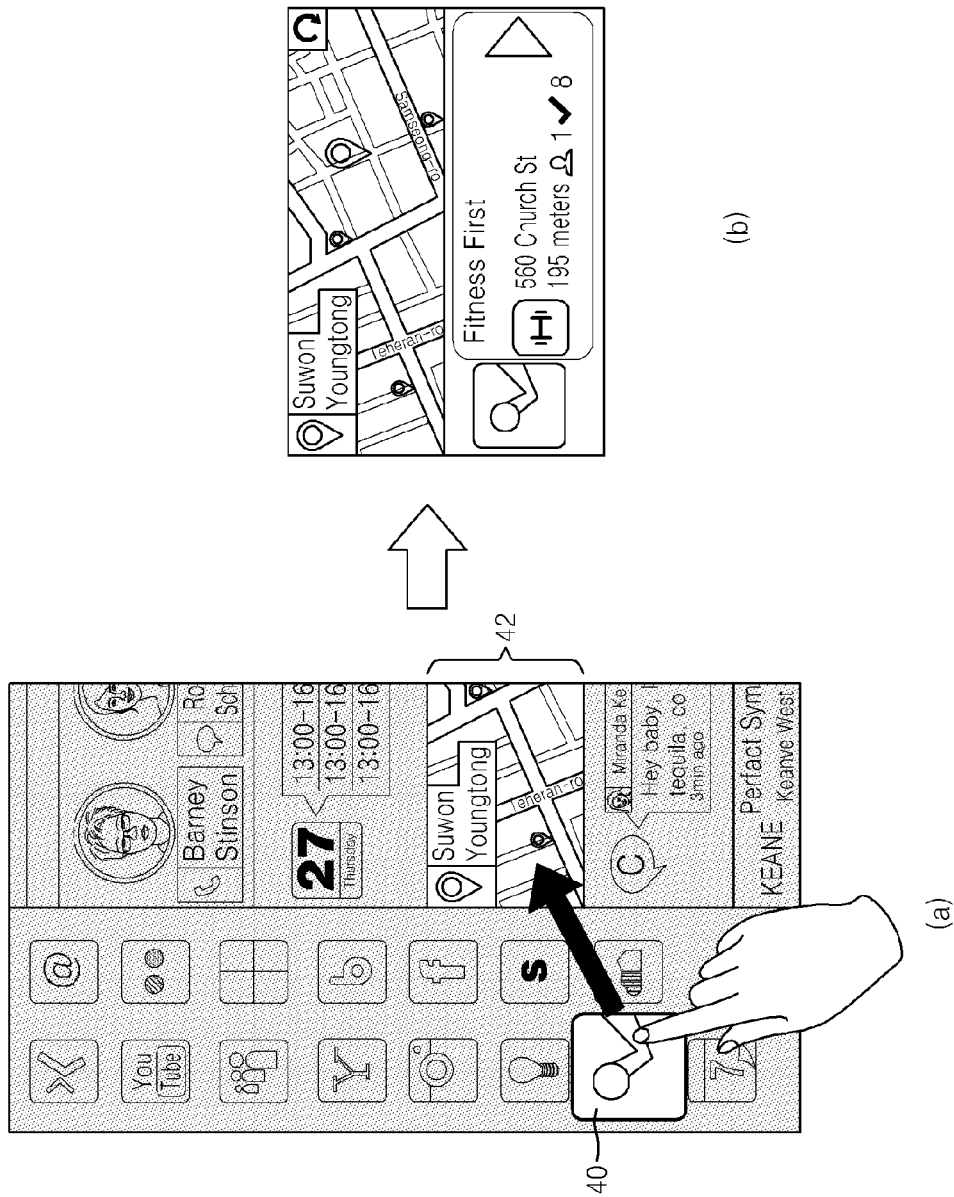
FIG. 18 is a diagram illustrating an example of executing an application selected from an application tray and an application that corresponds to a certain window included in the window band to work with each other, according to one or more exemplary embodiments.

FIG. 18 is a diagram illustrating an example of executing an application selected from an application tray and an application that corresponds to a certain window included in the window band to work with each other, according to one or more exemplary embodiments.

Referring to (a) of FIG. 18, a user may touch an icon 40 of a first application on an application tray. As the user touches the icon 40, the device 1000 may display a window 42 of a second application that may be executed to work with the first application so that the window 42 may be distinguished from other windows in the window band. For example, the device 1000 may display the window 42 of the second application to be bright, and other windows in the window band to be dark. Additionally, the user may move the touched icon 40 to the window 42 that is displayed to be distinguished from other windows in the window band. In (a) of FIG. 18, the first application may be an application that may collect location information, and the second application may be a map application.

Referring to (b) of FIG. 18, the device 1000 may display location information collected by the first application on a map image of the second application. For example, the device 1000 may insert point of interest (POI) information in a certain location on a map image of the second application, based on the location information collected by the first application. For example, the first application may be an application that may collect location information of a contact that is registered in a phonebook, and the second application may display an icon, which indicates a location of a contact registered in a phonebook on the map image.

FIG. 19 is a diagram illustrating an example in which a plurality of applications are executed to work with each other by dragging a window included in the window band, according to one or more exemplary embodiments.

Referring to (a) of FIG. 19, a user may touch a window 44 of a first application in the window band. As the user touches the window 44, the device 1000 may display a window 46 of a second application that may be executed to work with the first application so that the window 46 may be distinguished from other windows in the window band. For example, the device 1000 may display the window 44 of the first application and the window 46 of the second application to be bright, and other windows in the window band to be dark. Additionally, the user may move the touched window 44 to the window 46 in the window band. In (a) of FIG. 19, the first application may be a phonebook application that may collect location information, and the second application may be a map application.

Referring to (b) of FIG. 19, the device 1000 may display location information collected by the first application on a map image of the second application. For example, the device 1000 may insert POI information in a certain location on a map image of the second application, based on the location information collected by the first application. For example, the first application may be a phonebook application that may collect location information of a user of the device 1000 and another user, and the second application may display an icon, which indicates a location of the other user on a map image, on the map image.

Figure 20:
FIG. 20 is a diagram illustrating an example in which applications adjacent to each other in the window band are executed to work with each other, according to one or more exemplary embodiments.

FIG. 20 is a diagram illustrating an example in which applications adjacent to each other in the window band are executed to work with each other, according to one or more exemplary embodiments.

Referring to FIG. 20, as a non-limiting example, a first application is a map application, and a plurality of second applications adjacent to the first application may be a clock application and a weather application. A window 52 of the map application may be adjacent to a window 50 of the clock application and a window 54 of the weather application.

Additionally, location information of a point on a map image displayed by the map application, which is selected by a user, may be provided to the clock application and the weather application. Additionally, the clock application may display a current time of the point on the map image, which is selected by the user, in the window 50 by using the provided location information. Additionally, the weather application may display the current weather of the point on the map image, which is selected by the user, in the window 54 by using the provided location information.

Figure 21:
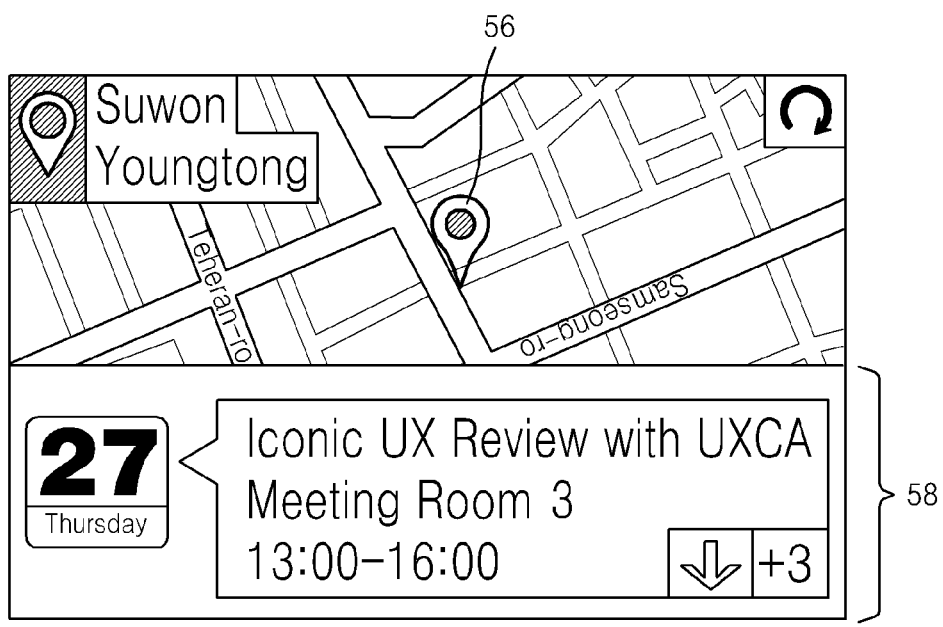
FIG. 21 is a diagram illustrating an example in which a schedule application and a map application are executed to work with each other, according to one or more exemplary embodiments.

FIG. 21 is a diagram illustrating an example in which a schedule application and a map application are executed to work with each other, according to one or more exemplary embodiments. In FIG. 21, the schedule application may be a first application, and a map application may be a second application.

Referring to FIG. 21, the schedule application that is the first application may collect schedule information according to dates. For example, the schedule application may collect information about a meeting place, a meeting time, description of a meeting of a user according to dates, based on a user input.

The map application that is the second application may obtain today's schedule information from the schedule application. For example, the map application may collect information about a meeting place, a meeting time, description of a meeting held today from the schedule information. Additionally, the map application may display an icon 56 on a location that corresponds to the place of the meeting held today. Additionally, the map application may display the meeting time and the description of the meeting held today on a map image. In this case, a UI 58 for displaying the meeting time and the description of the meeting held today is received from the schedule application, and the received UI 59 may overlap with the map.

Figure 22:
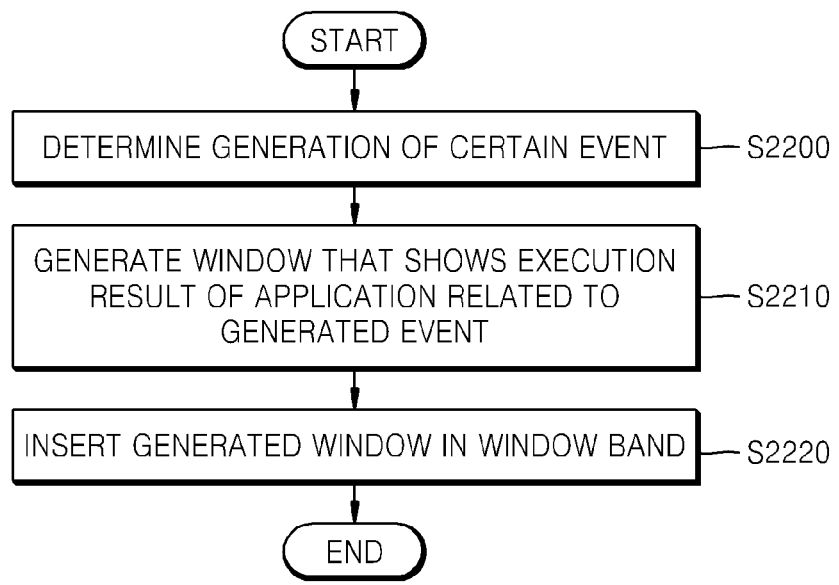
FIG. 22 is a flowchart of a method of inserting a window, which shows an execution result of an application related to an event, into the window band, according to one or more exemplary embodiments.

FIG. 22 is a flowchart of a method of inserting a window, which shows an execution result of an application related to an event, into the window band, according to one or more exemplary embodiments.

In operation S2200, the device 1000 determines generation of a certain event. A type and a generation time of an event may be preset by a user. An event may include, for example, an event for notifying whether a preset time has been reached, an event for notifying whether a user has arrived at a preset local area, an event for notifying whether the device 1000 plays preset content, or an event for notifying whether a preset user is located near the device 1000, but is not limited thereto. Although the certain event is a preset event, this is merely an example, and the certain event may be a non-preset event.

In operation S2210, the device 1000 generates a window that shows an execution result of the application related to the generated event. As the preset event is generated, the device 1000 may execute an application related to the generated event and generate a window that shows an execution result of the application. In this case, an application associated with the preset event may be preset. For example, if a preset time has been reached, the device 1000 may execute an alarm application and generate a window that shows an execution result of the alarm application.

Additionally, as a preset event is generated, the device 1000 may sequentially execute a plurality of applications related to the generated event and sequentially generate a plurality of windows for indicating an execution result of the plurality of applications. For example, if a preset time has been reached, the device 1000 may execute an alarm application and generate a window that shows an execution result of the alarm application. Then, the device 1000 may execute a stock application and generate a window that shows stock information of a current time.

In operation S2220, the device inserts the generated window into the window band. The device 1000 may insert the window, generated in operation S2210, into a preset location in the window band. Additionally, the device 1000 may sequentially insert the plurality of windows, generated in operation S2210, into a preset location in the window band. For example, the device 1000 may insert the window of the alarm application into an upper part of the window band, and then, insert the window of the stock application below the alarm application.

Figure 23:
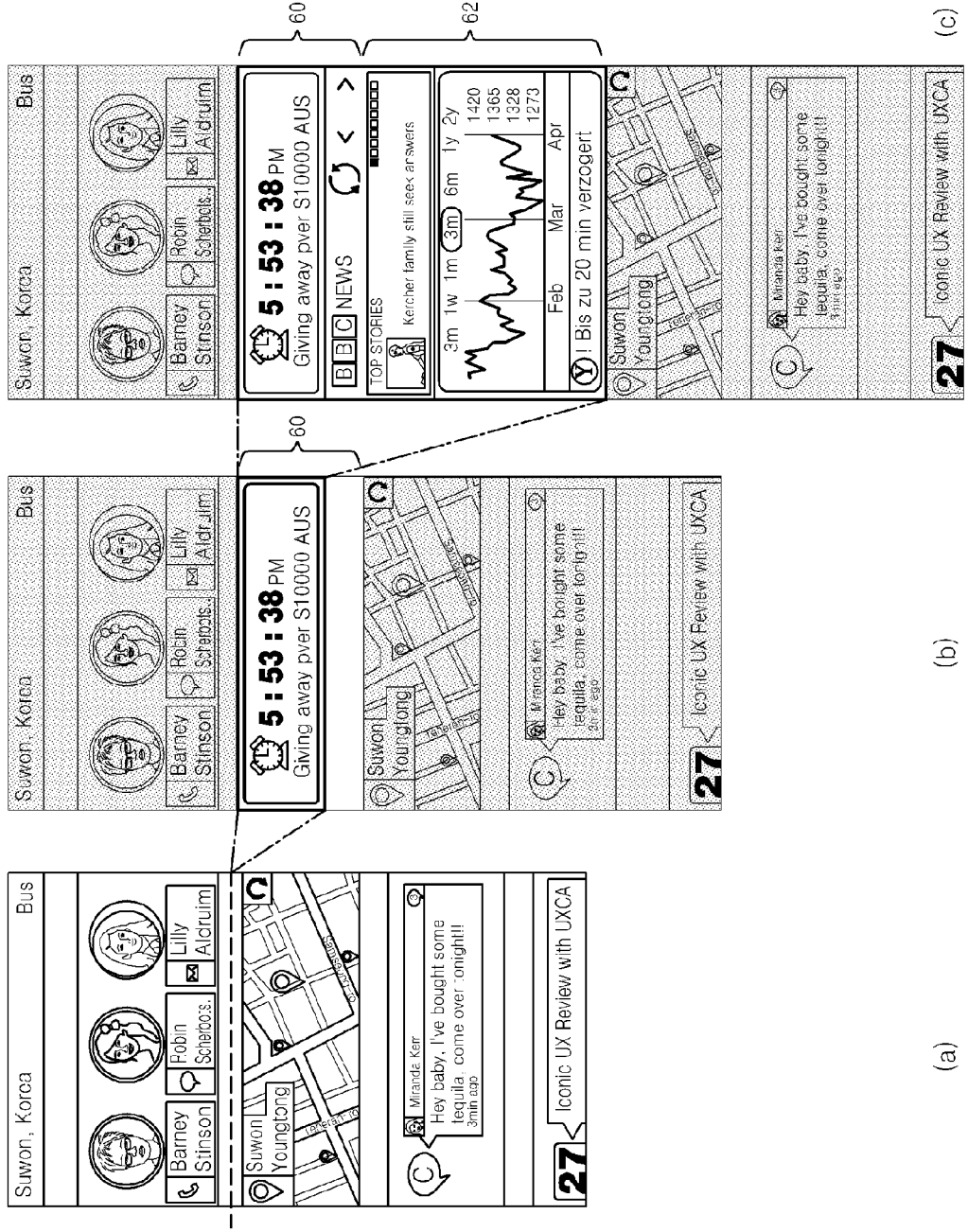
FIG. 23 is a diagram illustrating an example in which, as a certain event is generated, an execution result of an application related to the event is displayed in the window band, according to one or more exemplary embodiments.

FIG. 23 is a diagram illustrating an example in which, as a certain event is generated, an execution result of an application related to the event is displayed in the window band, according to one or more exemplary embodiments.

As shown in (a) of FIG. 23, when the window band is displayed on a screen of the device 1000 and a current time reaches a preset time, the device 1000 may execute an alarm application and insert an alarm window 60 of the alarm application into the window band, as shown in (b) of FIG. 23. Additionally, the device 1000 may output a certain sound for notifying that the current time has reached a preset time.

Additionally, if a user touches the window 60 of the alarm application, the device 1000 may execute an application related to the alarm. For example, when a stock application is related to the alarm, the device 1000 may execute the stock application and generate a window 62 of the stock application, as shown in (c) of FIG. 23. Additionally, the device 1000 may insert the generated window 62 of the stock application below the alarm application. Although in FIG. 23, the related application is a stock application, this is only exemplary, and the related application may be a different application.

Figure 24:
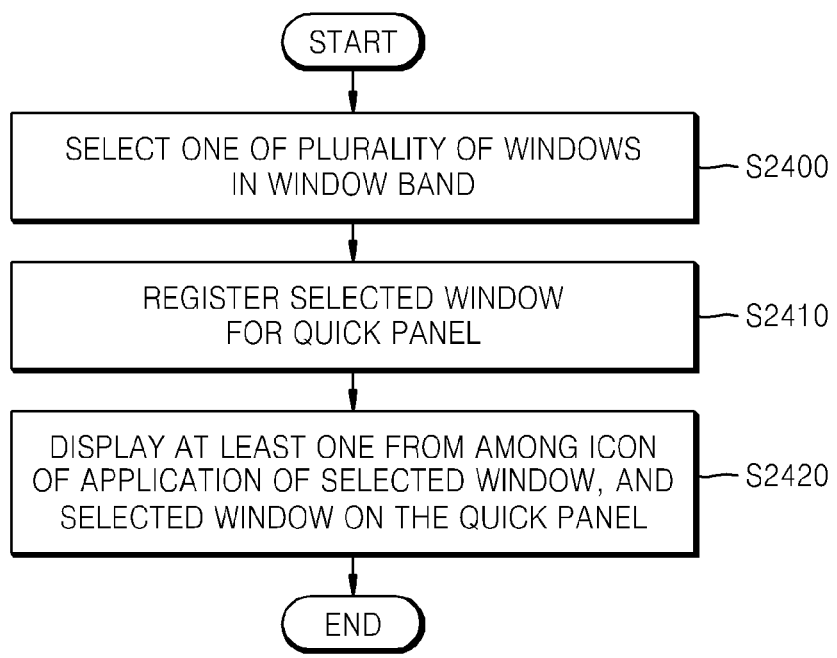
FIG. 24 is a flowchart of a method of displaying a window in the window band on a quick panel, according to one or more exemplary embodiments.

FIG. 24 is a flowchart of a method of displaying a window in the window band on a quick panel, according to one or more exemplary embodiments;

In operation S2400, the device 1000 selects one of a plurality of windows in the window band. A user may touch one of the plurality of windows in the window band.

In operation S2410, the device 1000 registers the selected window for the quick panel. The device 1000 may receive an input of dragging and dropping the touched window to the quick panel. Accordingly, the touched window may be registered for the quick panel. The quick panel may be displayed in the shape of a tray in an upper part of a screen of the device 1000. According to a user input of touching and dragging the quick panel in a downward direction, the quick panel may be expanded in a downward direction and displayed.

In operation S2420, the device 1000 displays at least one from among an icon of an application that corresponds to the selected window and the selected window on the quick panel. The icon of the application that corresponds to the selected window, and the selected window may be displayed on a screen of the device 1000, as the quick panel is expanded in a downward direction and displayed, but is not limited thereto. Even if the quick panel is expanded according to a user input, the icon of the application that corresponds to the selected window, and the selected window may be displayed on the quick panel.

Figure 25:
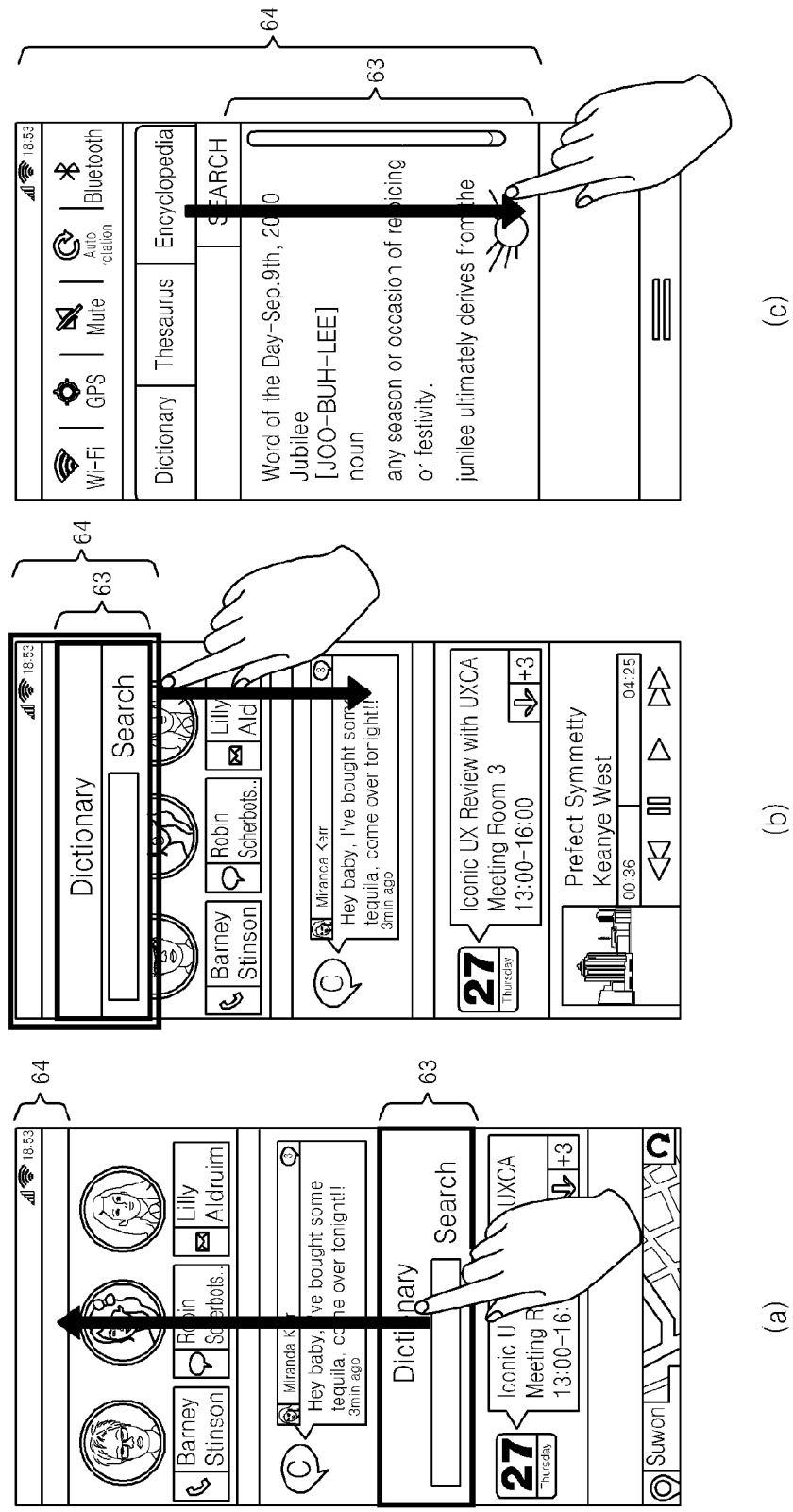
FIG. 25 is a diagram illustrating an example of displaying a window in the window band on a quick panel, according to one or more exemplary embodiments.

FIG. 25 is a diagram illustrating an example of displaying a window in the window band on a quick panel, according to one or more exemplary embodiments.

Referring to (a) of FIG. 25, a user may touch a window 63 of a dictionary application in the window band, and move the touched window 72 to a quick panel 64.

Additionally, referring (b) of FIG. 25, as the touched window 63 is moved to the quick panel 64, the device 1000 may register the window 63 for the quick panel 64 and display the window 63 on the quick panel 64. Additionally, the device 1000 may remove the window 63 from the window band.

Referring to (c) of FIG. 25, if the user touches a lower side of the window 63 displayed on the quick panel 64 and drags and drops the lower side of the window 63 in a downward direction, the device 1000 may expand the quick panel 64 and the window 63. In this case, the quick panel 64 and the window 63 may be expanded to a location to which the touch by the user is dropped.

Additionally, the device 1000 may display an execution result of the dictionary application in the expanded window 63 in detail. For example, before the window 63 is expanded, the device 1000 may display only a UI for inputting words in the window 63. Additionally, for example, after the window 63 is expanded, the device 1000 may display the UI for inputting words and a result of searching for words in the window 63.

Accordingly, while using a certain application, the user may expand the quick panel to have a desired size at any time, and use another application via a window of the other window displayed on the quick panel.

Figure 26:
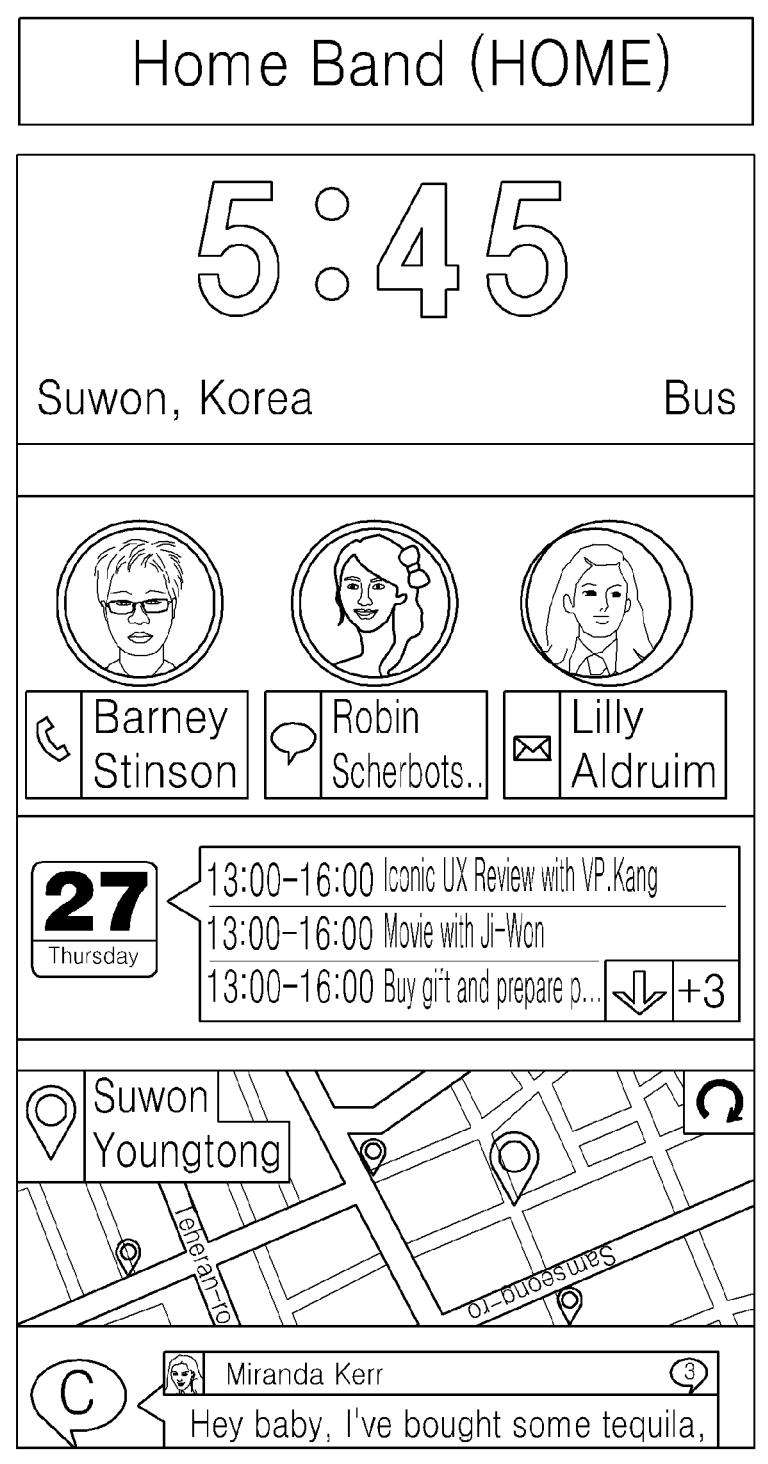

FIG. 26 is a diagram illustrating an example of a home band according to one or more exemplary embodiments.

Referring to FIG. 26, according to one or more exemplary embodiments, the home band includes a plurality of windows for displaying an execution result of an application, and the plurality of windows may be arranged to be adjacent to each other in the home band. Additionally, the home band may be displayed on a home screen of the device 1000.

Figure 27:
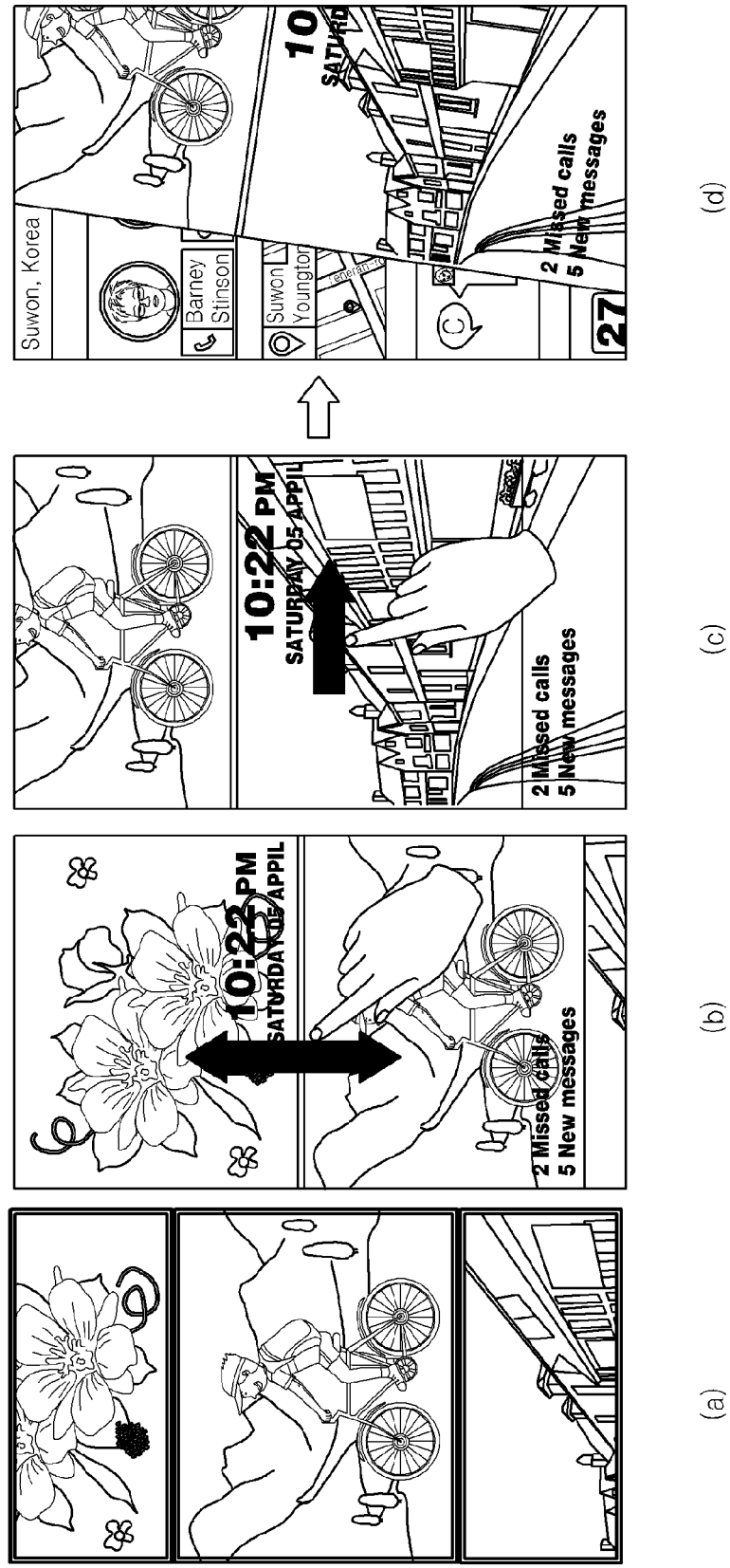
FIG. 27 is a diagram illustrating an example of a lock band according to one or more exemplary embodiments.

FIG. 27 is a diagram illustrating an example of a lock band according to one or more exemplary embodiments.

Referring to (a) of FIG. 27, according to one or more exemplary embodiments, the lock band includes a plurality of windows for displaying certain content, and the plurality of windows may be arranged to be adjacent to each other in the lock band. Additionally, the lock band may include a window that shows an execution result of an application in real time. Additionally, the lock band may be displayed on a lock screen of the device 1000.

Referring to (b) of FIG. 27, as an input of touching the lock band and swiping the lock band in an upward or downward direction is received, the device 1000 may scroll windows in the lock band.

Referring to (c) and (d) of FIG. 27, as an input of touching the lock band and swiping the lock band in a right direction is received, the device 1000 may be unlocked and the home screen thereof may be accessed. Additionally, the home band may be displayed on the home screen of the device 1000.

Figure 28:
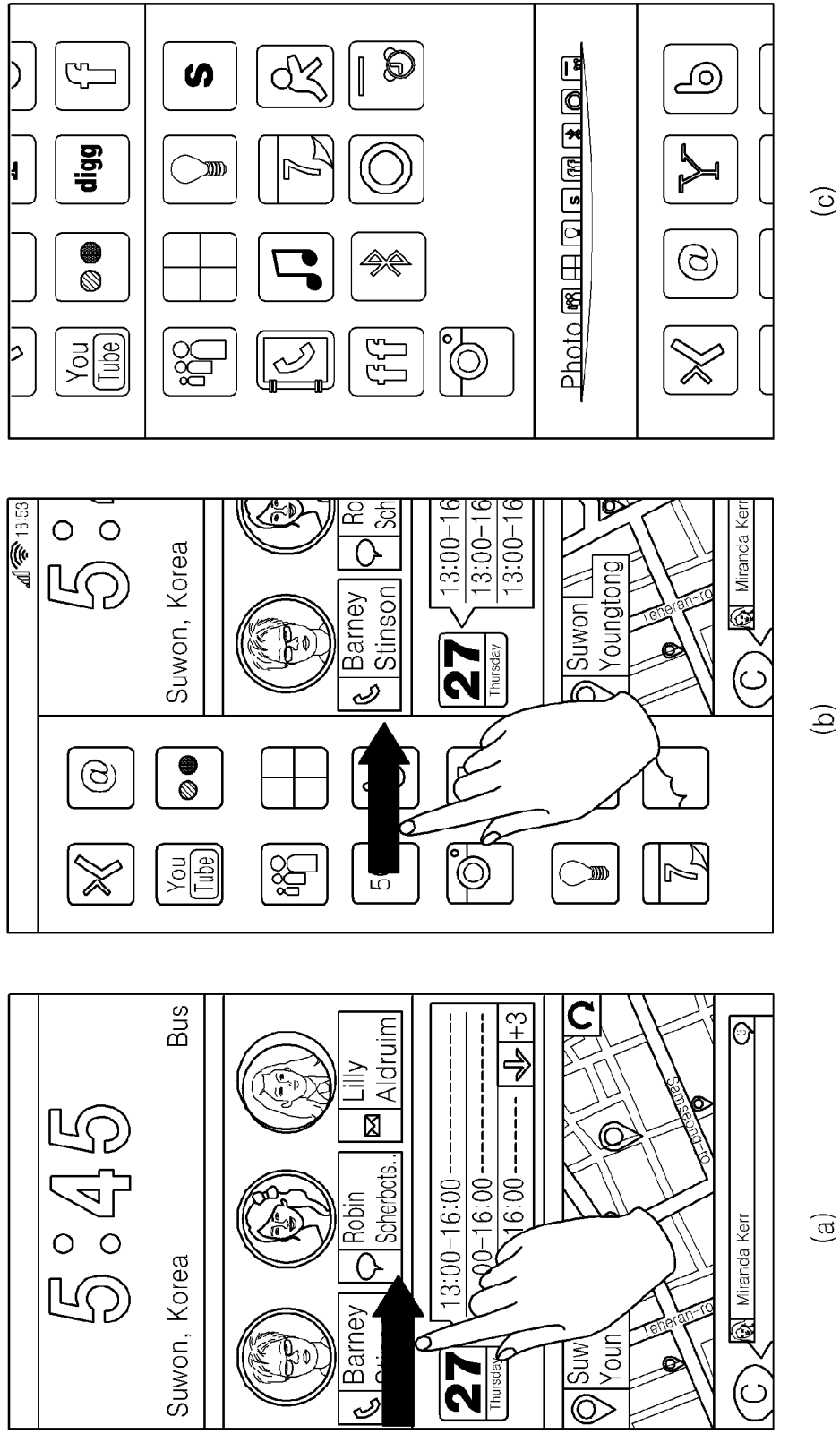
FIG. 28 is a diagram illustrating an example of an application band according to one or more exemplary embodiments.

FIG. 28 is a diagram illustrating an example of an application band according to one or more exemplary embodiments.

As shown in (a) of FIG. 28, if an input of touching and dragging a left edge of a screen of the device 1000 in a right direction is received, the device 1000 may display an application tray on a screen of the device 1000, as shown in (b) of FIG. 28.

As shown in (c) of FIG. 28, if a touch by a user drags to a right edge of the screen of the device 1000, an application band may be display on the screen of the device 1000. Icons of all applications installed in the device 1000 may be displayed in the application band, but the application band is not limited thereto. Icons of certain preset applications may not be displayed in the application band.

Figure 29:
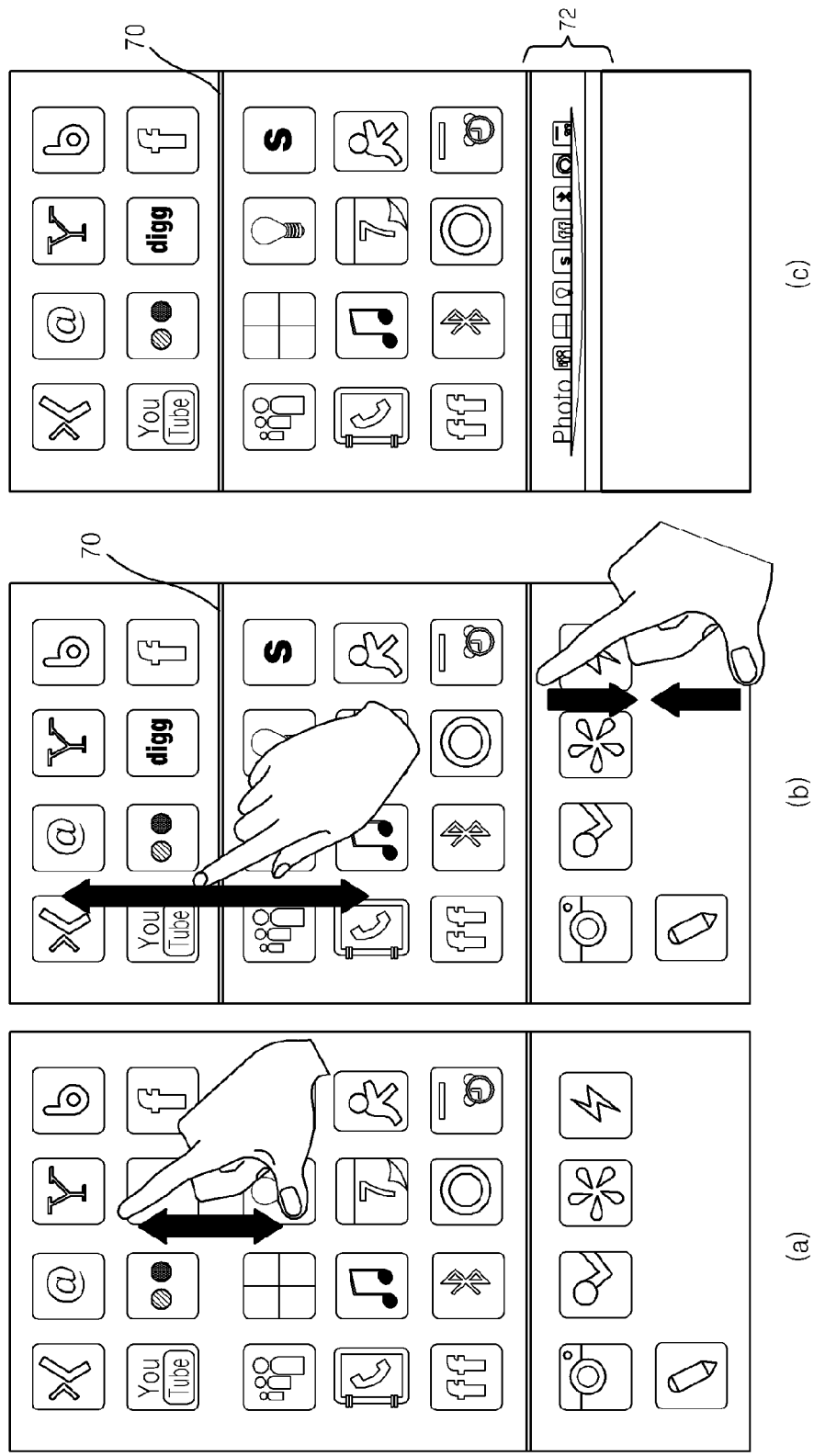
FIG. 29 is a diagram illustrating generating a boundary in an application band, according to one or more exemplary embodiments.

FIG. 29 is a diagram illustrating generating a boundary in an application band according to one or more exemplary embodiments.

As shown in (a) of FIG. 29, if an unpinching input by a user on a certain location in the application band is received, the device 1000 may generate a boundary 70 on a location where the unpinching input is received, as shown in (b) of FIG. 29.

If an input of scrolling the application band in an upward or downward direction is received, the device 1000 may scroll the application band in an upward or downward direction. Additionally, while the application band is being scrolled, if the generated boundary 70 is located at an edge of a screen of the device 1000, the device 1000 may stop scrolling. For example, while the application band is being scrolled in a downward direction, if the boundary 70 meets a lower edge of the screen of the device 1000, the device 1000 may stop scrolling. Additionally, for example, while the application band is being scrolled in an upward direction, if the boundary 70 meets an upper edge of the screen of the device 1000, the device 1000 may stop scrolling.

As shown in (b) of FIG. 29, if a pinching input by the user at an area between boundaries is received, the device 1000 may reduce the area between the boundaries and display an icon of an application to have a small size in a reduced area 72, as shown in (c) of FIG. 29. If the user touches the reduced area 72, the device 1000 may expand the reduced area 72 back.

Figure 30:
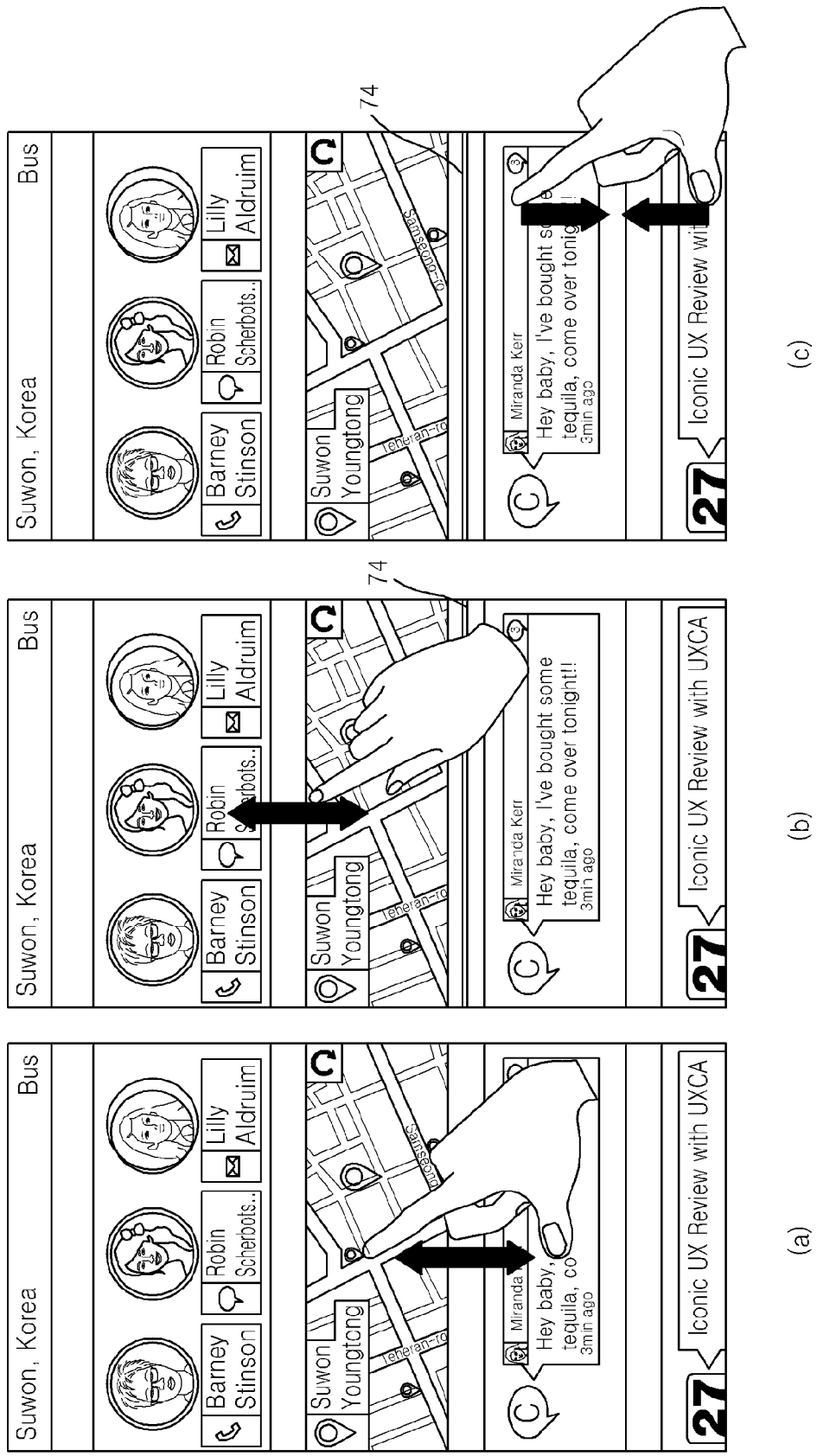
FIG. 30 is a diagram illustrating generating a boundary in a home band, according to one or more exemplary embodiments.

FIG. 30 is a diagram illustrating generating a boundary in a home band according to one or more exemplary embodiments.

As shown in (a) of FIG. 30, if an unpinching input by a user on a certain location in the home band is received, the device 1000 may generate a boundary 74 on a location where the unpinching input is received, as shown in (b) of FIG. 30.

As shown in (b) of FIG. 30, if an input of scrolling the home band in an upward or downward direction is received, the device 1000 may scroll the home band in an upward or downward direction. Additionally, while the home band is being scrolled, if the generated boundary 74 is located at an edge of a screen of the device 1000, the device 1000 may stop scrolling. For example, while the home band is being scrolled in a downward direction, if the boundary 70 meets a lower edge of the screen of the device 1000, the device 1000 may stop scrolling. Additionally, for example, while the home band is being scrolled in an upward direction, if the boundary 70 meets an upper edge of the screen of the device 1000, the device 1000 may stop scrolling.

As shown in (c) of FIG. 30, if a pinching input by the user at an area between boundaries is received, the device 1000 may reduce the area between the boundaries. Additionally, the device 1000 may reduce and display a window of an application in the reduced area. Additionally, the device 1000 may display an icon of an application in the reduced area.

Figure 31:
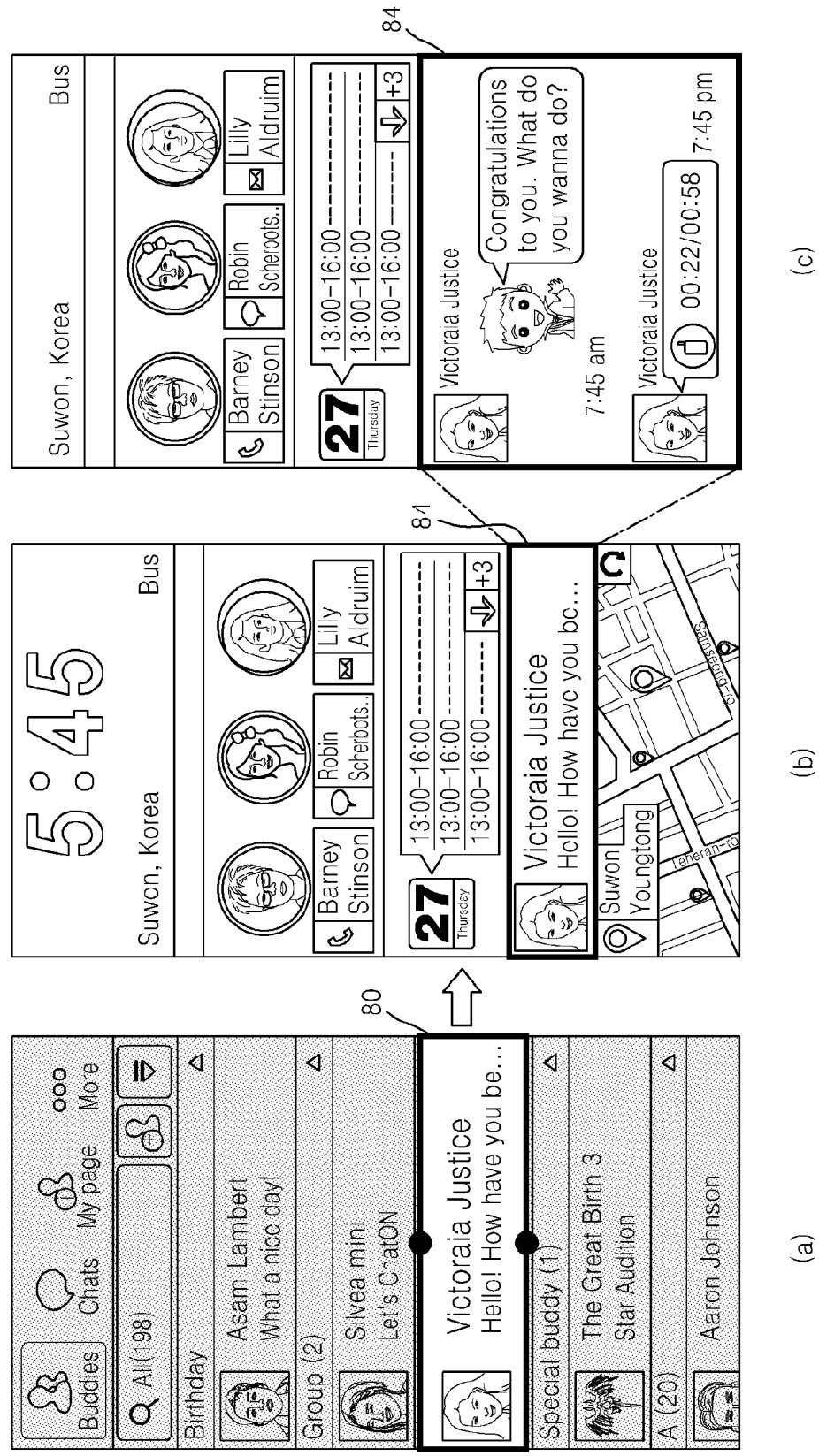
FIG. 31 is a diagram illustrating an example in which a window of a communication application is generated and used, according to one or more exemplary embodiments.

FIG. 31 is a diagram illustrating an example in which a window of a communication application is generated and used, according to one or more exemplary embodiments;

Referring to (a) of FIG. 31, an execution result of a messenger application may be displayed in a whole area of a screen of the device 1000. A partial area 80 may be selected from a screen for showing the execution result of the messenger application.

Referring to (b) of FIG. 31, as the partial area 80 is selected, the device 1000 may generate a window 84 for indicating an execution result in the partial area 80, and display the generated window 84 in the window band.

If the user touches the window 84, the device 1000 may expand the window 84, and display an execution result of an application related to the window 84 in the expanded window 84 in detail, as shown in (c) of FIG. 31.

Figure 32:
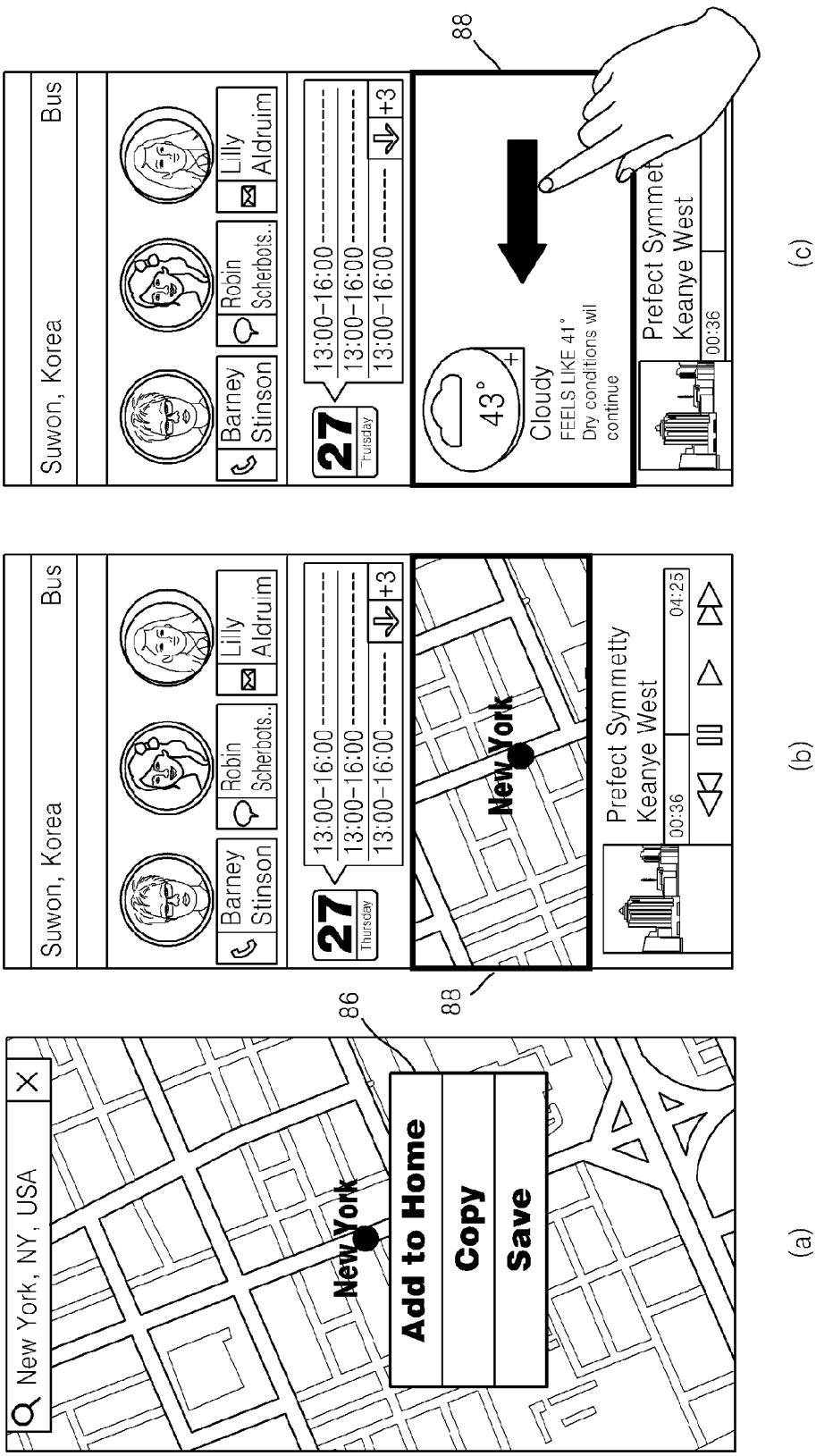
FIG. 32 is a diagram illustrating an example of showing execution results of a plurality of applications in one window, according to one or more exemplary embodiments.

FIG. 32 is a diagram illustrating an example of showing execution results of a plurality of applications in one window according to one or more exemplary embodiments.

Referring to (a) of FIG. 32, the device 1000 may select certain content based on a user input. Content may include, for example, a keyword, location information, or a multimedia file, but is not limited thereto. For example, if a user touches a certain point in a map image, the device 1000 may display a menu 86 for generating a window. Additionally, the device 1000 may select a name of a local area and location information of a point touched in a map as content, based on a user input. For example, the device 1000 may select 'New York' as content.

Referring to (b) of FIG. 32, the device 1000 may execute a plurality of applications related to the selected content and obtain information regarding content from the executed plurality of applications. Additionally, the device 1000 may generate a window 88 for displaying information obtained from the plurality of applications. Additionally, the device 1000 may display the generated window 88 in the window band. For example, if the device 1000 selects 'New York' as content, the device 1000 may execute a map application, a weather application, and a clock application. Additionally, the device 1000 may obtain map image showing a location of New York by using the map application, obtain current weather information of New York by using a weather application, and obtain current time information of New York by using a clock application. Additionally, the device 1000 may display the obtained map image, weather information, time information in one window 88.

Referring to (c) of FIG. 32, the device 1000 may generate a page for indicating a map image, a page for indicating weather information, and a page for indicating time information. Based on a swiping input by a user to the window 88, the device 1000 may sequentially display the generated pages in the window 88.

Figure 33:
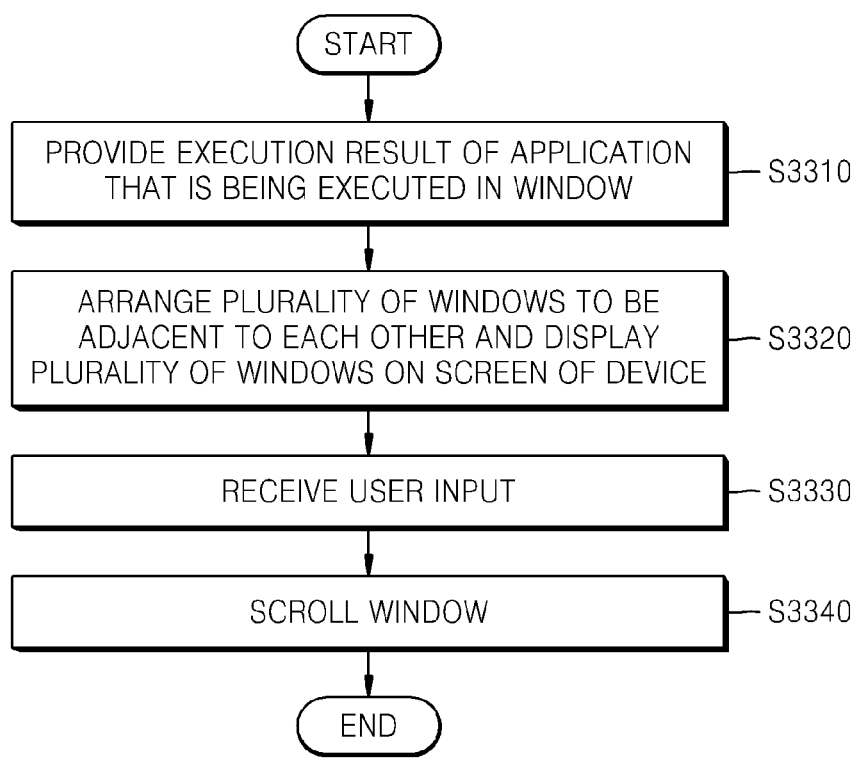
FIG. 33 is a flowchart of a method of scrolling a plurality of windows when the plurality of windows are displayed on a screen, according to one or more exemplary embodiments.

FIG. 33 is a flowchart of a method of scrolling a plurality of windows when the plurality of windows are displayed on a screen, according to one or more exemplary embodiments;

A device may provide an execution result of an application, which is being executed by the device, to the plurality of windows that are displayed in at least two modes by a touch input, display the plurality of windows, which show execution results of the plurality of windows, on a screen of the device by arranging the plurality of windows to be adjacent to each other, receive a user input when the plurality of windows are displayed on the screen, and scroll the plurality of windows in correspondence with a user input. The user input may be a flick gesture. The flick gesture is an operation by which a user contacts a part of a body or an input apparatus of a user (for example, a touch pen) to a screen that may detect a touch and, while maintaining the touch, moving the part of the body or the input apparatus in a certain direction.

Referring to FIG. 33, in operation S3310, the device provides an execution result of an application that is being executed in a window. As the device provides the execution result of an application that is being executed to the window, the execution result of the application that is being executed may match the window and may be displayed in the window. Additionally, the window may be displayed in at least two modes according to a user input. For example, a display mode of the displayed window may include a first mode, a second mode, and a third mode. A user input may be a touch input. Alternately, a user input may be a tap gesture input. The device may generate a window band by arranging a plurality of windows to be adjacent to each other and display the generated window band on a screen of a display.

An execution result of an application that is being executed may be displayed in each of the plurality of windows that constitute the window band. The execution result may include various objects according to an application, and an execution result of one application may be displayed in one window. Additionally, an execution result of one application may be displayed in the plurality of windows. For example, if an application for displaying weather information is executed, weather information may be displayed in one window. If a game is executed, a screen of the game may be displayed in a first window, and a button for controlling the game may be displayed in a second window.

A window may be displayed in at least two display modes. A display mode of the window may include a first mode and a second mode. A display of the window may further include a third mode. Additionally, according to a display mode of the window, a size of the window or a type of data displayed in the window may vary. For example, the window may display first data in the first mode, and the first data and second data in the second mode. The window may be displayed with a smaller size in the first mode than in the second mode. For example, the window may include a reduced mode or a general mode. The reduced mode may be the first mode. The general mode may be the second mode. If the device receives a tap gesture to one window from among the plurality of windows when the plurality of windows are displayed in the first mode, in correspondence with the tap gesture, the window may be displayed in an uppermost part of the plurality of windows. A tap gesture may be a single tap or a double tap. For example, windows A through E may be sequentially displayed in a first mode from an upper part of the screen of the device. In this case, the windows A through E may constitute a window band. If a user taps the window C located in the middle of the windows A through E when the window band, formed of the windows A through E, is displayed, the device may display the window C at an uppermost part of the window band. The windows in the window band may be disposed in an order of the windows C, A, B, D, and E. In other words, the windows C, A, B, D, and E may be sequentially displayed from an upper part. Additionally, the window C may be displayed to have an increased size in a second mode, and the other windows A, B, D, and E may be displayed in a first mode.

The display mode of the window may include the third mode. The third mode may be an expanded mode. A size of the window may be changed to be displayed according to the display mode. When the display mode of the window is a first mode, the window may have a smallest size, and when the display mode of the window is a second mode, the window may have a medium size. When the display mode of the window is a third mode, the window may have the biggest size. The window may be displayed in the first mode, the second mode, or the third mode. Accordingly, the window band may be displayed in the first mode, the second mode, and/or the third mode. For example, the windows A and B that constitute the window band may be displayed in the first mode, the windows C and D may be displayed in the second mode, and the window E may be displayed in the third mode. The window band is arranged when a plurality of windows are adjacent to each other.

The window may switch to the first mode, the second mode, or the third mode according to a user input. The first mode may be a reduced mode, the second mode may be a general mode, and the third mode may be an expanded mode. For example, if a user inputs a pinch zoom-out gesture to the window band that is displayed in the reduced mode, the device may display a plurality of windows that constitute the window band as a general mode. When the plurality of windows are displayed in a general mode, if the user taps one of the plurality of windows, the device may display a window, which is shown on a location where a tap gesture is received, in an expanded mode.

In the reduced mode, first data may be displayed in the window. The first data may include a name of an application. Additionally, the first data may include a name of the window. The name of the window may be a name of an application that is being executed. In the reduced mode, a name of the application may be displayed in the window.

In the general mode, the first data and the second data may be displayed in the window. In the general mode, the second data may be further displayed in addition to data that is displayed in the reduced mode. The second data may include an execution result of an application and an icon that corresponds to the application. For example, a name of an application, an icon that corresponds to the application, and content related to the application may be displayed in the window in a general mode. Content may be an execution result of the application. Content may include a plurality of items. If a user touches the icon in the general mode, the application may be displayed in a whole screen of the display.

In the expanded mode, the first data, the second data, and the third data may be displayed in the window. In the expanded mode, the third data may be further displayed in addition to the data that was displayed in the general mode. For example, a name of an application, an icon that corresponds to the application, content related to the application, and additional information about the content may be displayed in the window in the expanded mode. The additional information about the content may not be displayed in the general mode. For example, if weather information about a particular local area and a particular date is displayed in the window that is shown in the general mode, weather information for a week may be displayed in the expanded mode, in addition to the particular local area and the weather information about the particular date.

Each window that constitutes the plurality of windows may be displayed with a smaller size in the reduced mode than in the general mode. Each window that constitutes the plurality of windows may be displayed with a smaller size in the general mode than in the expanded mode.

In operation S3320, the device may arrange a plurality of windows to be adjacent to each other, and the arranged plurality of windows may be displayed on a screen of the display of the device. The device may arrange the plurality of windows in an upward or downward direction. However, exemplary embodiments are not limited thereto, and the device may arrange the plurality of windows in a left or right direction. The device may arrange the plurality of windows according to preset criteria. Additionally, an execution result of the application may be displayed in each window. The device may generate a window band by arranging a plurality of windows to be adjacent to each other. A plurality of windows for showing an execution result of a plurality of applications may be arranged in the window band to be adjacent to each other.

In operation S3330, the device may receive a user input when a plurality of windows are displayed on the display. A user input may include a flick gesture. The device may receive a flick gesture.

In operation S3340, the device may scroll a plurality of windows in correspondence with the user input. If a user performs a flick operation on a window displayed on a screen in an upward or downward direction, the device may display a window in the window band by scrolling the window in an upward or downward direction.

Figure 34:
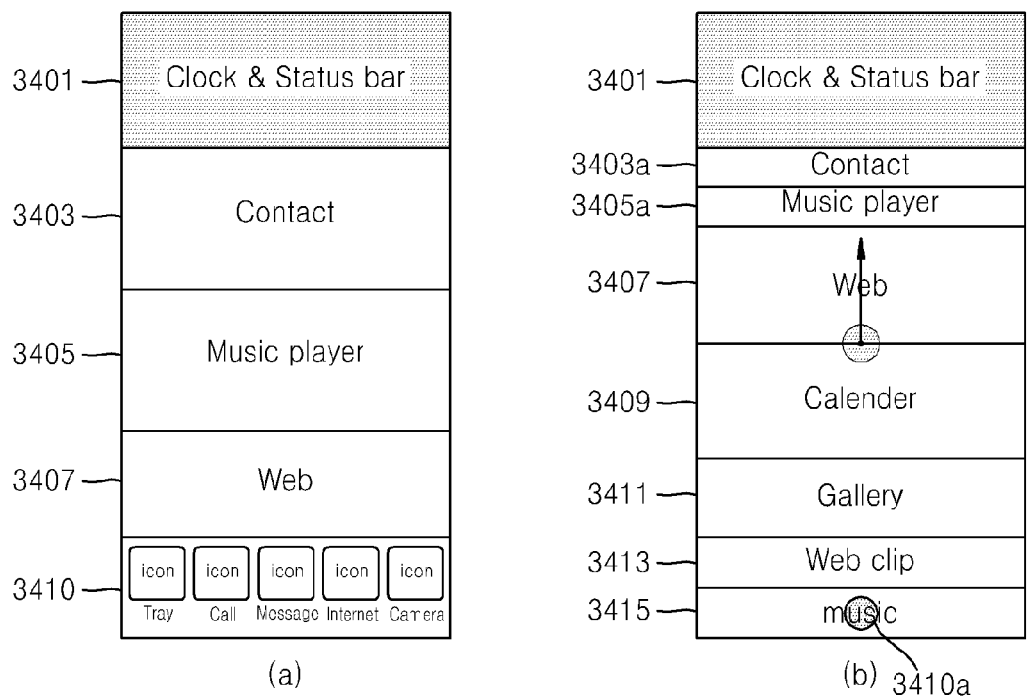
FIG. 34 is a diagram illustrating an example of scrolling a plurality of windows included in the window band, which is performed by the device, according to one or more exemplary embodiments.

FIG. 34 is a diagram illustrating an example of scrolling a plurality of windows included in the window band, which is performed by the device, according to one or more exemplary embodiments.

Referring to (a) of FIG. 34, a status bar 3401, a plurality of windows 3403, 3405, and 3407, and an app dock 3410 are shown. A status of the device and a current time may be displayed in the status bar 3401. The status bar 3401 may be displayed fixed on a screen of the device, and even if the plurality of windows 3403, 3405, and 3407 are scrolled, the status bar 3401 may not disappear and may be displayed on the screen of the device.

The plurality of windows 3403, 3405, and 3407 may constitute the window band and may be displayed in a general mode. Each window may be displayed in a reduced mode, a general mode, or an expanded mode, and according to each mode, the window may be displayed with different sizes. A size of the window may be changed according to at least two steps according to a user input. A user input may be a touch and/or gesture input. For example, when a plurality of windows are displayed in a general mode, if a user taps, and thus, selects one of the plurality of windows, the device may change the selected window to be displayed in an expanded mode. Additionally, for example, when a plurality of windows are displayed in a general mode, if a user taps one of the plurality of windows, the device may change the plurality of windows to be displayed in an expanded mode.

Additionally, an execution result of the application that is being executed may be displayed in the window. A controller may provide an execution result of the application to the window, so that the execution result of the application may be displayed on a screen. The plurality of windows 3403, 3405, and 3407 may be arranged to be adjacent to each other. A window band may be formed by disposing the window 3405 to be adjacent to and below the window 3403, and disposing the window 3407 to be adjacent to and below the window 3405. If a user performs a flick operation on a screen in an upward or downward direction, the plurality of windows may be scrolled in an upward or downward direction. For example, while the plurality of windows displayed in a general mode are being scrolled, the plurality of windows may be displayed with a smaller size than in the general mode.

While the plurality of windows is being scrolled, the app dock 3410 may not be displayed. Additionally, if the plurality of windows are scrolled to an end and a certain user input is received, the app dock 3410 that has disappeared may be displayed on the screen. An icon that corresponds to the application may be displayed in the app dock 3410. If a user performs a flick operation on the icon displayed in the app dock 3410 in a left or right direction, the icon may be scrolled in an upward or downward direction.

(b) of FIG. 34 illustrates a status in which a plurality of windows 3403a, 3405a, 3407, 3409, 3411, 3413, and 3415 are scrolled. Referring to (b) of FIG. 34, the status bar 3401 and the plurality of windows 3403a, 3405a, 3407, 3409, 3411, 3413, and 3415 are shown. As a user performs a flick operation on a screen in an upward or downward direction, the plurality of windows 3403a, 3405a, 3407, 3409, 3411, 3413, and 3415 may be scrolled. While the plurality of windows 3403a, 3405a, 3407, 3409, 3411, 3413, and 3415 are being scrolled, the plurality of windows 3403a, 3405a, 3407, 3409, 3411, 3413, and 3415 may have different sizes according to an area of the screen in which the plurality of windows 3403a, 3405a, 3407, 3409, 3411, 3413, and 3415 are displayed. For example, if the windows 3403a, 3405a, and 3407 are scrolled in an upward direction, the windows 3409, 3411, 3413, and 3415 may be newly displayed on a lower part of the window band. Additionally, the plurality of windows 3403a, 3405a, 3407, 3409, 3411, 3413, and 3415 may move from a lower part of the window band to an upper part of the window band through a center of the window band. As each window moves to the upper part, a size of each window gradually increases. Then, if each window is placed at an uppermost part of the window band, each window may be covered by a window placed below, and thus, disappear from the screen.

If a user performs a flick operation on the plurality of windows to an upper part of the screen, each window may move from a lower part to an upper part of the screen. If the window is in the lower part of the window band, the window may have a small size. Then, when the window moves through approximately a center part of the screen, a size of the window increases largest. Then, as the window moves upwards, a size of the window decreases, and then, the window may disappear from the screen. For example, the windows 3413 and 3415, displayed on a lower part of the screen, may be smaller than the window 3411. Additionally, the window 3411 may be smaller than the window 3409. Additionally, the window 3409 may be smaller than the window 3407. The window 3407 placed in a center part may be the biggest and may be displayed in a general mode. As the windows are scrolled in an upward direction, the window placed in an upper location may be gradually covered by the window placed in a lower location, and thus, may disappear from the screen. The window 3403a may be covered by the window 3405a placed below, and thus, only a part of the window 3403a may be displayed. The window 3403a may be covered by the window 3405a placed below, and thus, only a part of the window 3403a may be displayed. While the plurality of windows are scrolled, the app dock 3410 may not be displayed, and a dot 3410a that corresponds to the app dock 3410 may be displayed on the screen. Even after the scrolling is finished, the dot 3410a may be still displayed on the screen. If a user touches the dot 3410a displayed on the screen, the app dock 3410 may be displayed on the screen.

Figure 35:
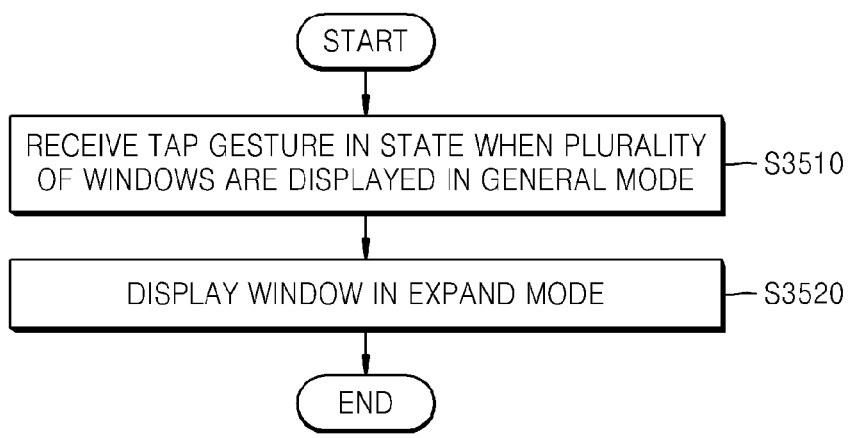
FIG. 35 is a flowchart of a method of receiving a tap gesture with respect to one window from among a plurality of windows displayed in a general mode and, in response to the tap gesture, displaying the window in an expanded mode, according to one or more exemplary embodiments.

FIG. 35 is a flowchart of a method of receiving a tap gesture with respect to one window from among a plurality of windows displayed in a general mode and, in correspondence with the tap gesture, displaying the window in an expanded mode, according to one or more exemplary embodiments.

Referring to FIG. 35, in operation S3510, when a plurality of windows are displayed in a general mode, a device receives a tap gesture from one of a plurality of windows. In operation S3520, in correspondence with the tap gesture, the device may display the window in an expanded mode. The device may expand and display the window that is displayed on a location where the tap gesture is input. As the window is displayed in an expanded mode, a window adjacent to the window, which is displayed in the expanded mode, may be displayed smaller than in a general mode. For example, when three windows A, B, and C are arranged to be adjacent to each other in a screen, if the window B disposed in a middle thereof is tapped, the window B is displayed in an expanded mode, and the windows A and C are reduced and displayed with a smaller size than in the general mode.

An example in which a window displayed in a general mode is displayed in an expanded mode according to a tap gesture has been described. However, exemplary embodiments are not limited to a tap gesture. As a non-limiting example, according to a rule preset by a device, a window displayed in a general mode based on a touch input and a touch and hold gesture input may be displayed in an expanded mode.

If a window displayed in a general mode is displayed in an expanded mode according to a tap gesture input by a user, a direction in which the window is expanded may vary according to a location of the window displayed in the general mode. If the device receives a tap gesture by a user when the window displayed in the general mode is displayed above a center of the screen, the device may expand and display the window in a lower direction. If the device receives a tap gesture when the window displayed in the general mode is displayed below the center of the screen, the device may expand and display the window in an upper direction.

Figure 36:
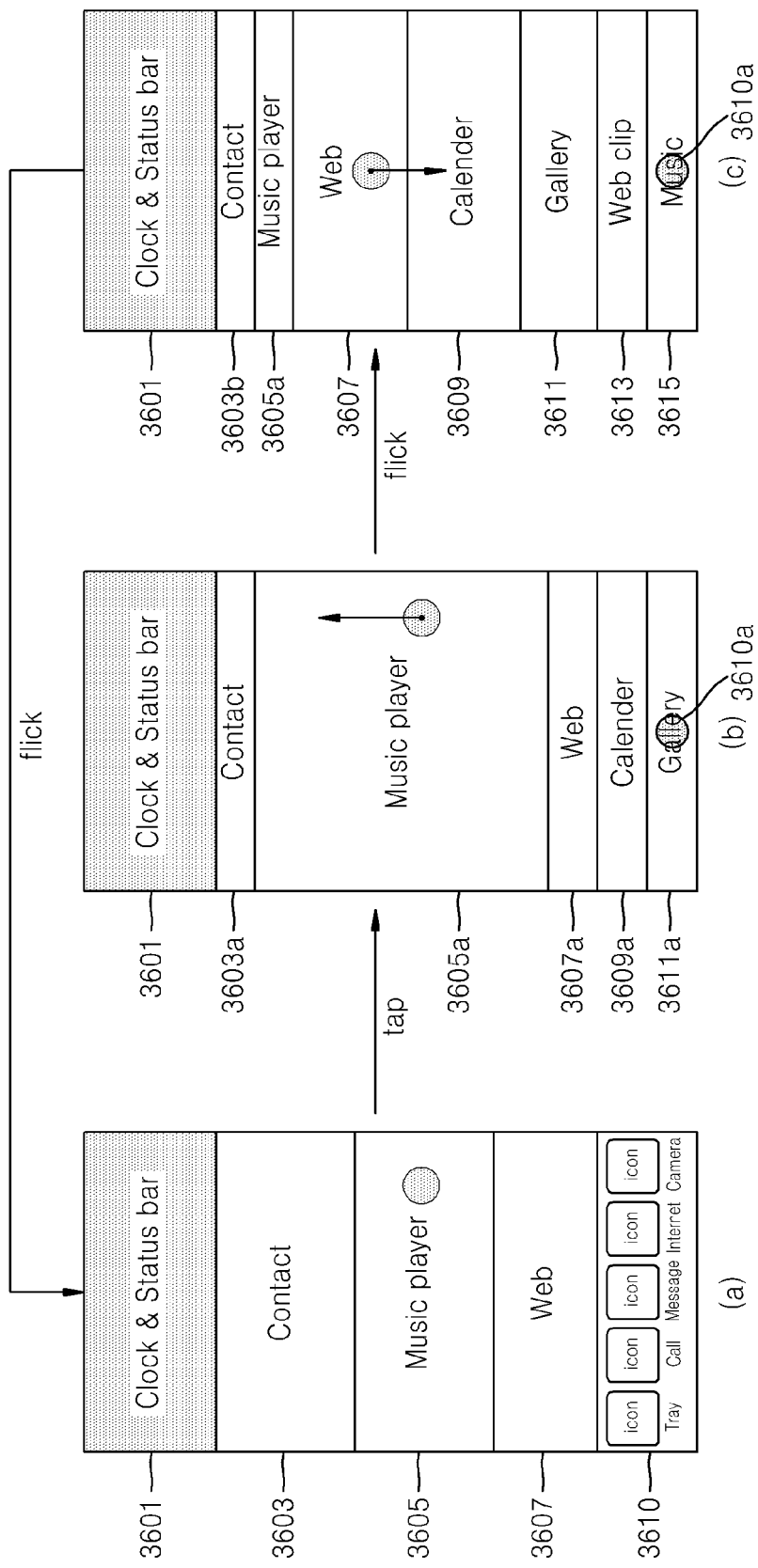
FIG. 36 is a diagram illustrating a window band according to one or more exemplary embodiments.

FIG. 36 is a diagram illustrating a window band according to one or more exemplary embodiments. Referring to (a) of FIG. 36, a status bar 3601, a plurality of windows 3603, 3605, and 3607, and an app dock 3610 are shown. A window band may be formed by displaying the plurality of windows 3603, 3605, and 3607 to be adjacent to each other. The plurality of windows 3603, 3605, and 3607 are displayed to have a general size. If a user taps the window 3605, the window 3605 may be expanded and displayed. When a tap gesture is input to the window, in correspondence with the tap gesture, a controller may change the selected window to be displayed in an expanded mode. Referring to (b) of FIG. 36, the status bar 3601 and a plurality of windows 3603a, 3605a, 3607a, 3609a, and 3611a are shown. As the window 3605a is displayed in an expanded mode, the other windows 3603a, 3607a, 3609a, and 3611a may be displayed in a reduced mode. In this case, the app dock 3610 may disappear from the screen, and a dot 3610a that corresponds to the app dock 3610 may be displayed on the screen. If a window is expanded, a direction in which the window is expanded may vary according to a location where the window is displayed. If the controller receives a tap gesture input when the window is placed above a center of the screen, the controller may expand and display the window in a lower direction. If the controller receives a tap gesture input when the window is placed below the center of the screen, the device may expand and display the window in an upper direction. For example, if the window 3607 is tapped, the window 3607 may be expanded in an upper direction. If the window 3603 is tapped, the window 3603 may be expanded in a lower direction.

In the reduced mode, a name of an application may be displayed in a window. Only a name of an application may be displayed in the reduced mode, due to a limited space in the window. More information may be displayed in a general mode than in the reduced mode. For example, a name of an application, an icon that corresponds to the application, and content related to the application may be displayed in the window in the general mode. A name of an application, an icon that corresponds to the application, content related to the application, and additional information about the content may be displayed in the window in the expanded mode. The additional information about the content may not be displayed in the general mode.

If a flick operation is performed on the window 3605a in an upward direction when the window 3605a is displayed in an expanded mode, the window 3605a may be displayed in a reduced mode or a general mode and scrolled in an upward direction. Referring to (c) of FIG. 36, the status bar 3601, a plurality of windows 3603b, 3605a, 3607, 3609, 3611, and 3613 are shown. As the plurality of windows 3603b, 3605a, 3607, 3609, 3611, and 3613 are scrolled, the uppermost window 3603b is covered by the adjacent window 3605a below the window 3603b, and thus, disappears from the screen. For example, the window 3605a is covered by the window 3607.

Figure 37:
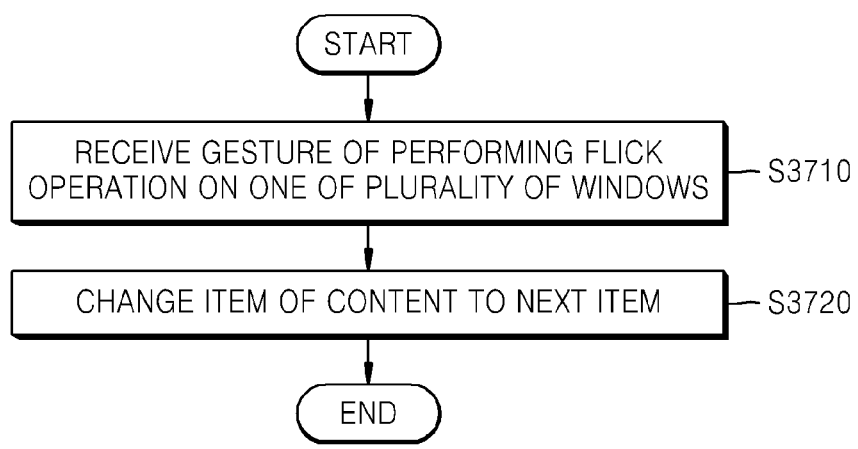
FIG. 37 is a flowchart of a process of processing if a flick gesture is generated in a left or right direction when a window is displayed in a general mode, according to one or more exemplary embodiments.

FIG. 37 is a flowchart of a process of processing if a flick gesture is generated in a left or right direction when a window is displayed in a general mode. Referring to FIG. 37, in operation S3710, when a plurality of windows are displayed in a general mode, a device receives a gesture of performing a flick operation on one of the plurality of windows in a left or right direction. In operation S3720, in correspondence with the gesture of performing a flick operation on one of the plurality of windows in the left or right direction, the device may change an item of content, displayed in the window, to a next item or a previous item and display the next item or the previous item. Content may include a plurality of items. If a user performs a flick operation on a window in which content is displayed in a left or right direction, the device may display a next item or a previous item of content that is currently displayed in the window. For example, when a second item of content that includes a first item, the second item, and a third item is displayed in the window, if a user performs a flick operation on the window in a left direction, the third item may be displayed in the window. If a user performs a flick operation on the window in a right direction, the first item may be displayed in the window.

The device may provide an execution result of a plurality of applications, which are being executed by the device, to a plurality of windows that are displayed in at least two modes by a user input, and arrange and display the plurality of windows for showing an execution result of the plurality of windows on a screen of the device. When the plurality of windows are displayed on the screen, a gesture input in an upward, downward, left, or right direction is received. If a gesture in an upward or downward direction is received, a plurality of windows are scrolled. If a gesture in a left or right direction is received, content displayed in one of the plurality of windows may be changed.

Figure 38:
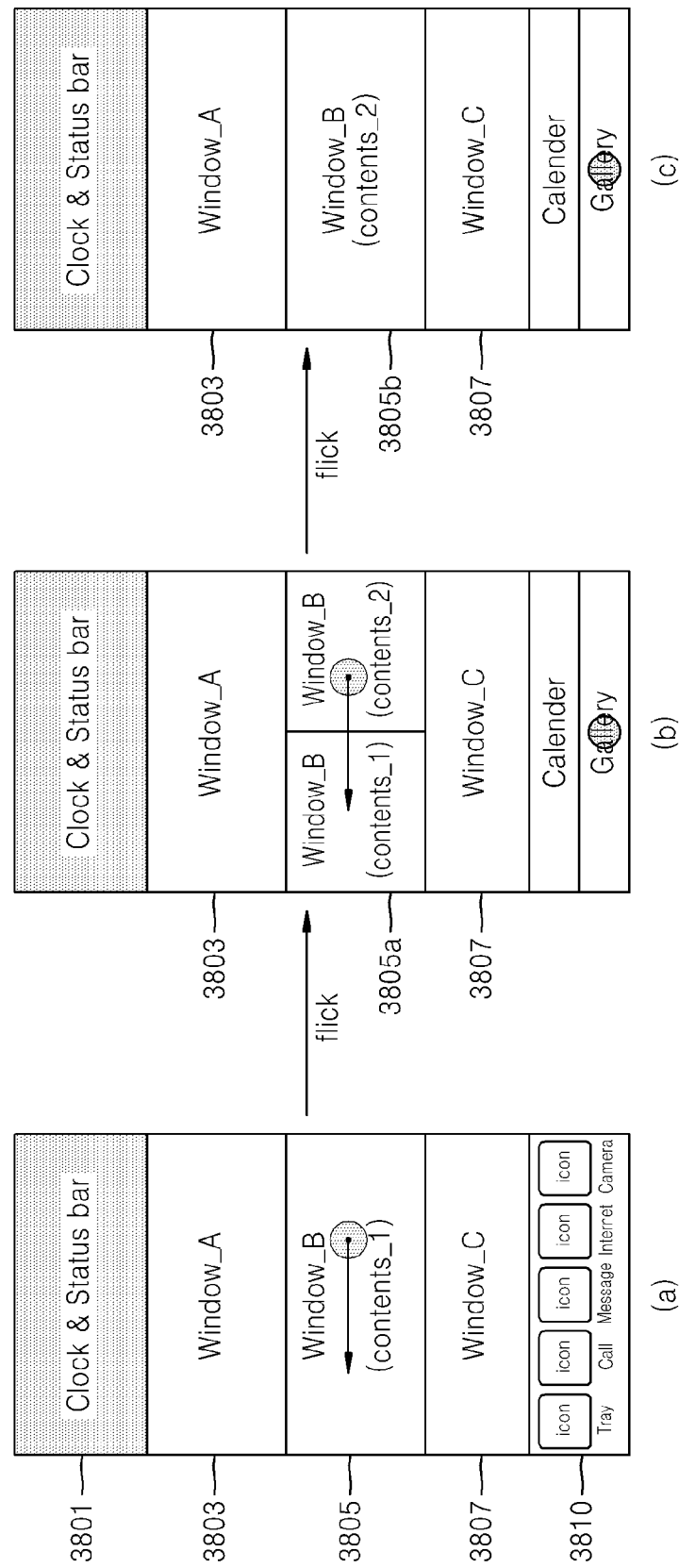
FIG. 38 is a diagram illustrating a flowchart of a process of changing an item of content displayed in a window if a flick operation is performed on the window in a left or right direction, according to one or more exemplary embodiments.

FIG. 38 is a diagram illustrating a process of changing an item of content displayed in a window if a flick operation is performed on the window in a left or right direction, according to one or more exemplary embodiments. Referring to (a) of FIG. 38, a status bar 3801, a plurality of windows 3803, 3805, and 3807, and an app dock 3810 are shown. The plurality of windows 3803, 3805, and 3807 are displayed in a general mode. A name of an application, an icon that corresponds to the application, and content related to the application may be displayed in the window in a general mode. Content may include a plurality of items, and one of the plurality of items may be displayed in the plurality of windows 3803, 3805, and 3807. If a user performs a flick operation on a window, in which one of the plurality of items is displayed, in a left or right direction, a previous item or a next item of currently displayed content may be displayed in the window. For example, when contents_1 that is a first item of content, which includes a plurality of items, is displayed in the window 3805, if a user performs a flick operation on the window 3805 in a left direction, contents_2 that is a second item may be displayed.

As the user performs a flick operation on the window 3805, content of the window 3805 may be displayed with content of a window 3805b after being displayed with content of the window 3805a, as shown in (b) of FIG. 38. A part of contents_1 and a part of contents_2 are displayed. contents_2 that is the second item of currently displayed content is displayed in the window 3805b, as shown in (c) of FIG. 38.

At least one of the plurality of windows 3803, 3805, and 3807 may be displayed in an expanded mode. A name of an application, an icon that corresponds to the application, content related to the application, and additional information about the content may be displayed in the expanded mode. If a user performs a flick operation on a window, in which one of the plurality of items is displayed, in a left or right direction, a next item or a previous item of currently displayed content may be displayed in the window.

Figure 39:
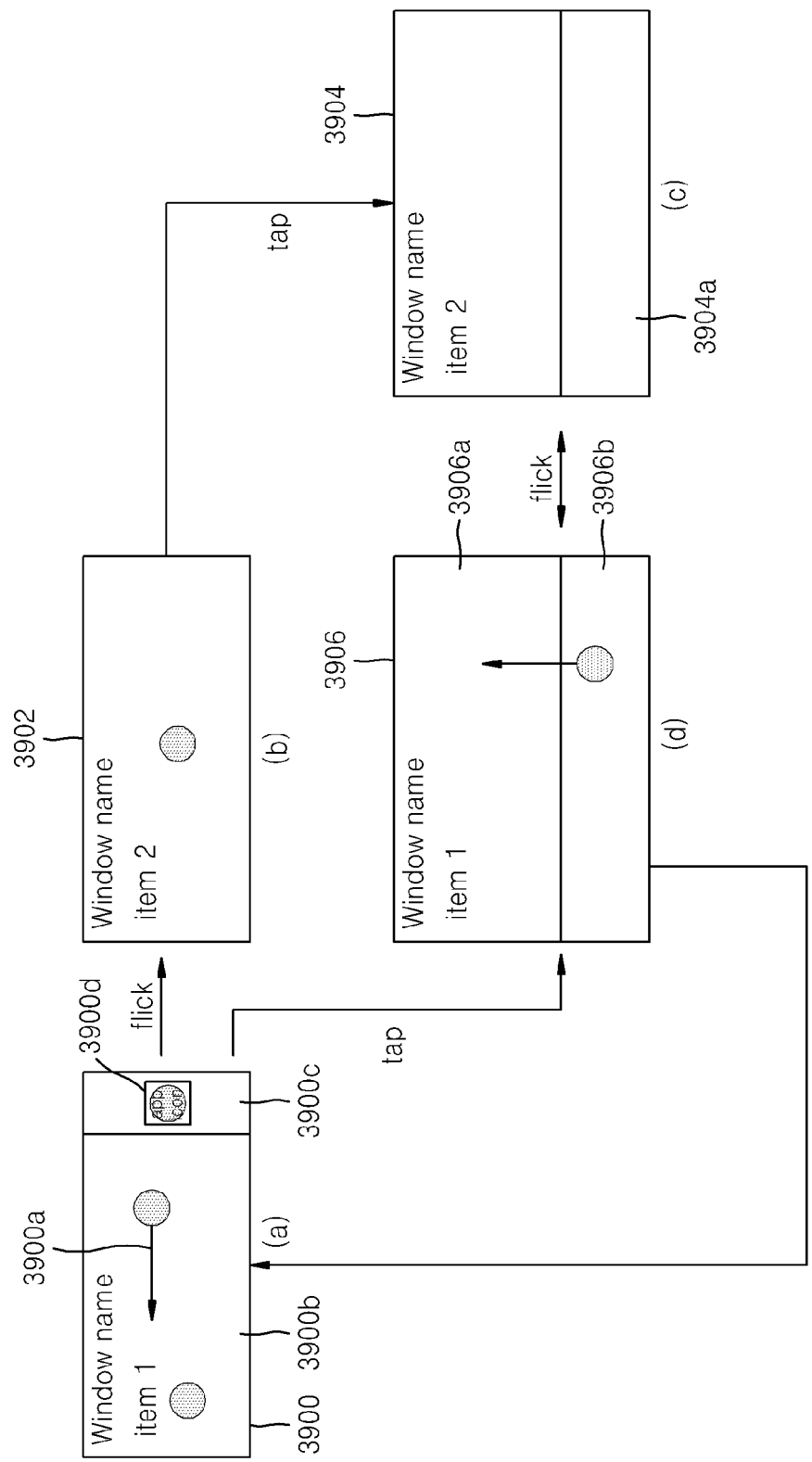
FIG. 39 is a diagram illustrating an example of changing a displayed detail of a window or expanding the window in correspondence with a gesture by a user, when the window is displayed in a general mode, according to one or more exemplary embodiments.

FIG. 39 is a diagram illustrating an example of changing a displayed detail of a window or expanding the window in correspondence with a gesture by a user, when the window is displayed in a general mode. If a user inputs a gesture of performing a flick operation on one of a plurality of windows in a left or right direction, a device may receive the gesture and, in correspondence with the gesture, change an item of content, displayed in the window, to a next item or a previous item and display the next or the previous item. In correspondence with a gesture of performing a flick operation on one of the plurality of windows in a left or right direction, the device may change an item of content, displayed as an execution result of an application, to a different item.

Referring to (a) of FIG. 39, a window 3900 is displayed in a general mode. The window 3900 may include a first area 3900b and a second area 3900c. Content provided according to an execution result of an application may be displayed in the first area 3900b. Content may include a plurality of items. "item 1" is displayed in the window 3900. Additionally, a name of the window may be displayed in the first area 3900b. A name of the window may be a name of an application. An icon 3900d that corresponds to the application may be displayed in the second area 3900c. An icon 3900d that corresponds to an application may be displayed in the second area 3900c. If a user performs a flick operation on the window 3900 in a left direction, a next item of content may be displayed. (b) of FIG. 39 shows a result in which the user performs a flick operation on the window 3900 in a left direction. "item 2" that is a next item is displayed in a window 3902.

In (b) of FIG. 39, if a user taps the window 3902, a window may be displayed expanded. Referring to (c) of FIG. 39, a control button for controlling additional information regarding content and content may be displayed in an expanded area 3904a. In (c) of FIG. 39, if a user performs a flick operation on the window 3902 in a right direction, "item 1" that is a previous item may be displayed in a window 3906. Additionally, in (a) of FIG. 39, if a user taps on the window 3900, the expanded window 3906 may be displayed on a screen, as shown in (d) of FIG. 39. Additionally, in (d) of FIG. 39, if a user taps on the expanded window 3906, the window 3900 may be displayed on a screen, as shown in (a) of FIG. 39.

Figure 40:
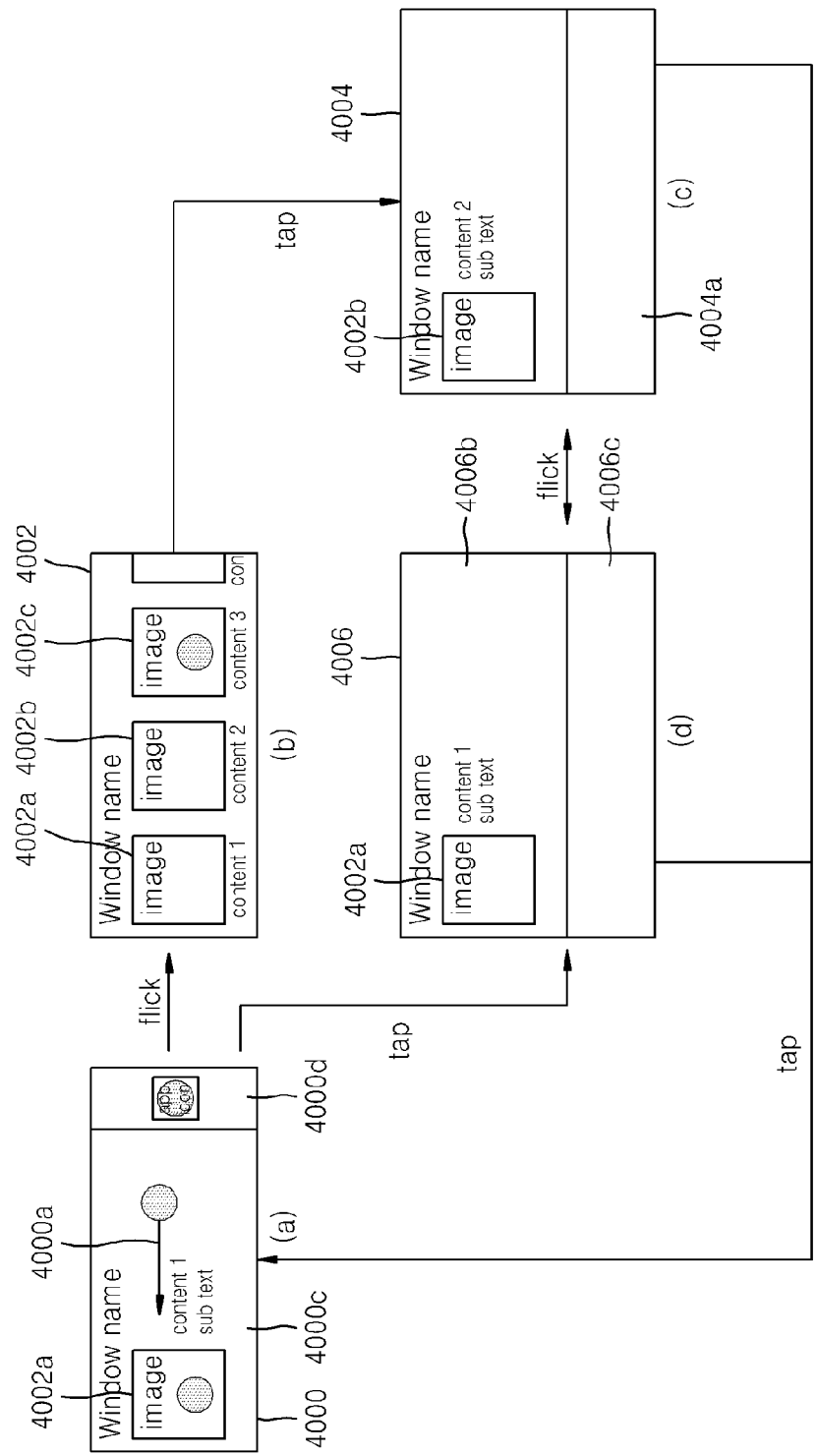
FIG. 40 is a diagram illustrating an example of changing a displayed detail of a window or expanding the window in correspondence with a gesture by a user, when a thumbnail image is displayed in the window, according to one or more exemplary embodiments.

FIG. 40 is a diagram illustrating an example of changing a displayed detail of a window or expanding the window in correspondence with a gesture by a user, when a thumbnail image is displayed in the window. Referring to (a) of FIG. 40, a thumbnail image 4002a is displayed in the window 4000. The window 4000 may include a first area 4000c and a second area 4000d. The thumbnail image 4002a provided according to an execution result of an application is displayed in the first area 4000c. An icon that corresponds to the application is displayed in the second area 4000d. If the user touches the icon, the application may be displayed on a whole screen. Displaying of an application on a screen refers to displaying content, displayed as an execution result of the application, or various graphical user interface (GUI) objects for manipulating the application.

If the user performs a flick operation 4000a on the window 4000 in a left direction, another thumbnail image may be displayed. (b) of FIG. 40 shows a result in which a user performs a flick operation on the window 4000 in a left direction. A plurality of thumbnail images 4002a, 4002b, and 4002c are displayed in a window 4002. As the user performs a flick operation on the window 4002, the plurality of thumbnail images 4002a, 4002b, and 4002c may be scrolled in a direction of the flick operation. If the user taps one of the plurality of thumbnail images 4002a, 4002b, and 4002c, the window may be displayed in an expanded mode. For example, if the user taps the thumbnail image 4002c, the window is displayed in an expanded mode. (c) of FIG. 40 shows an expanded window 4004. The thumbnail image 4002b and information thereof may be displayed in the window 4004. Information regarding the thumbnail image 4002b may include a photographing place and a photographing date. The window 4004 may include an expanded area 4004a. If the user performs a flick operation on the window 4004 in (c) of FIG. 40, the thumbnail image 4002b that is a previous item and information regarding the thumbnail image 4002b may be displayed in the window 4004. Additionally, if the user performs a flick operation on the window 4004 in (a) of FIG. 40, an expanded window 4006 may be displayed on a screen, as shown in (d) of FIG. 40. Additionally, if the user performs a tap operation on expanded window 4004 or 4006, window 4004 in (a) of FIG. 40 may be displayed.

Figure 41:
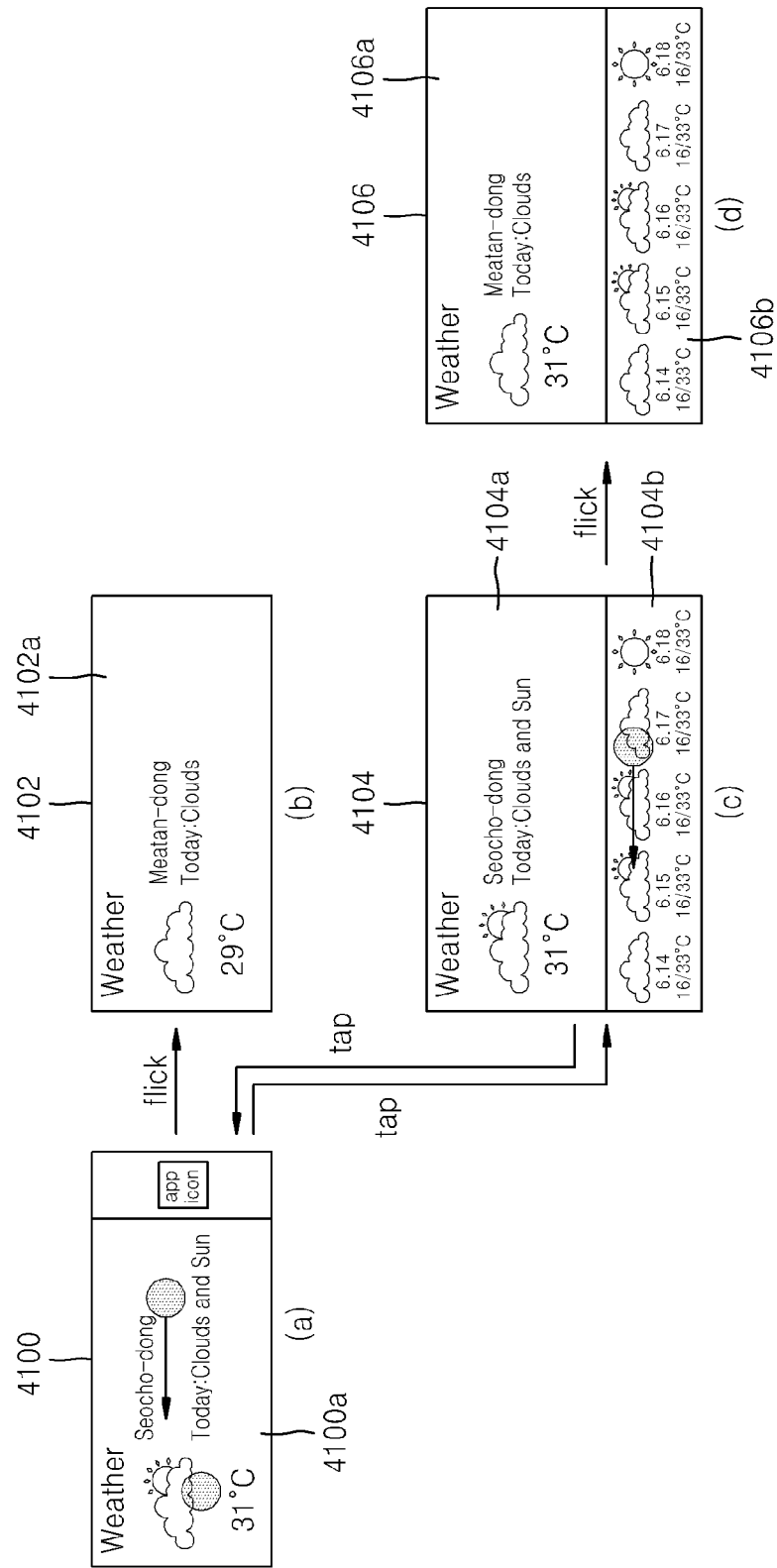
FIG. 41 is a diagram illustrating an example of changing a displayed detail of a window or expanding the window in correspondence with a gesture by a user, when weather information is displayed in the window, according to one or more exemplary embodiments.

FIG. 41 is a diagram illustrating an example of changing a displayed detail of a window or expanding the window in correspondence with a gesture by a user, when weather information is displayed in the window. Referring to (a) of FIG. 41, weather information 4100a of a particular local area is displayed in a window 4100. The window 4100 may include a first area and a second area. The weather information 4100a provided as an execution result of an application is displayed in the first area. An icon that corresponds to the application is displayed in the second area. If the user touches the icon, the application may be displayed on a whole screen. If the user performs a flick operation on the window 4100 in a left direction, weather information of another local area may be displayed. (b) of FIG. 41 shows a result in which the user performs a flick operation on the window 4100 in a left direction. Weather information 4102a of another local area is displayed in a window 4102.

In (a) of FIG. 41, if the user taps the window 4100, the window 4100 may be displayed in an expanded mode. Referring to (c) of FIG. 41, weather information 4104a of a particular local area and weather information 4104b for each date are displayed in a window 4104 that is displayed in the expanded mode. If a flick operation is performed on the window 4104 that is displayed in an expanded mode, shown in (c) of FIG. 41, weather information of another local area may be displayed on a screen. Referring to (d) of FIG. 41, weather information 4106a of another local area and weather information 4106b for each date are displayed in the window 4106.

Figure 42:
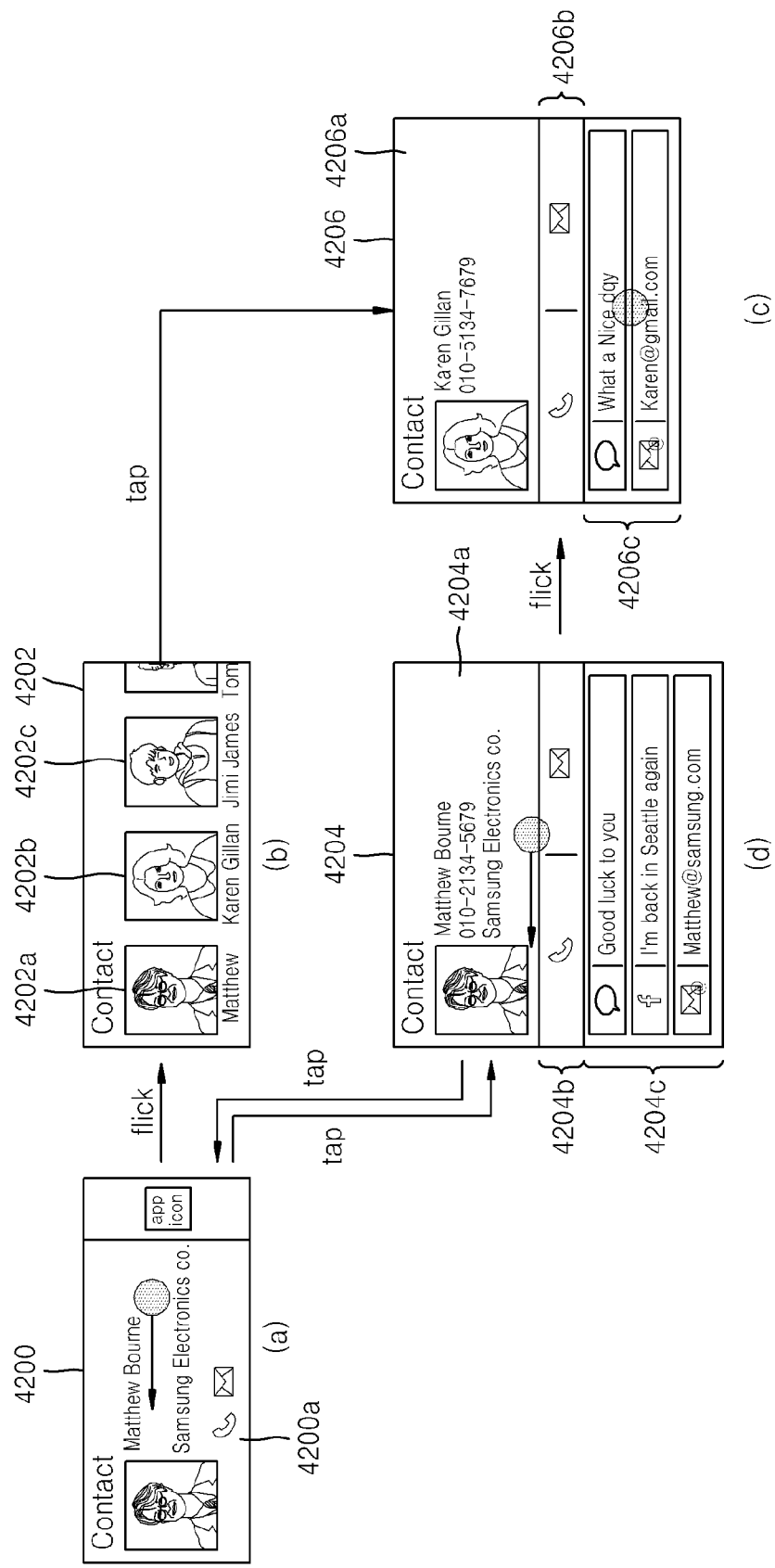
FIG. 42 is a diagram illustrating an example of changing a displayed detail of a window or expanding the window in correspondence with a gesture by a user, when contact information is displayed in the window, according to one or more exemplary embodiments.

FIG. 42 is a diagram illustrating an example of changing a displayed detail of a window or expanding the window in correspondence with a gesture by a user, when contact information is displayed in the window. Referring to (a) of FIG. 42, contact information "Matthew Bourne" is displayed in a window 4200. The contact information displayed in the window 4200 may be contact information that is used in a most recent call. Contact information may include a name, a photograph, a phone or short message service (SMS) button. A button may be an icon. If the phone or SMS button is touched, a call or an SMS may be sent to "Matthew Bourne". If a user performs a flick operation on the window 4200 in a left direction, contact information of another person may be displayed in the window 4200. In (b) of FIG. 42, a plurality of pieces of contact information 4202a, 4202b, and 4202c, which include contact information of other persons, are displayed in a window 4202. As the user performs a flick operation on the window 4202 in a left or right direction, the contact information may be scrolled in a left or right direction. If contact information of one person, from among the plurality of pieces of contact information 4202a, 4202b, and 4202c that are displayed in the window 4202, is tapped, the window is displayed in an expanded mode and a detail of the contact information of the person may be displayed in a window. In (b) of FIG. 42, if a user taps contact information 4202b of "Karen Gillan", detailed information of "Karen Gillan" may be displayed in an expanded window. In addition to a phone/message button displayed in a basic mode, an icon that may be linked to another SMS may be displayed in the expanded window. For example, in (c) of FIG. 42, a phone number, a photograph, a phone, or an SMS button 4206b of "Karen Gillan" and an icon 4206c that may be linked to another SMS are shown. Additionally, in (a) of FIG. 42, if a user taps the window 4200, the window 4200 is displayed in an expanded mode and detailed information regarding currently displayed contact information may be further displayed. For example, in (d) of FIG. 42, additional information 4204a of contact information 4200a, a phone or SMS button 4204b, and an icon 4204c that may be linked to another SMS are displayed in a window 4204 that is displayed in the expanded mode.

Figure 43:
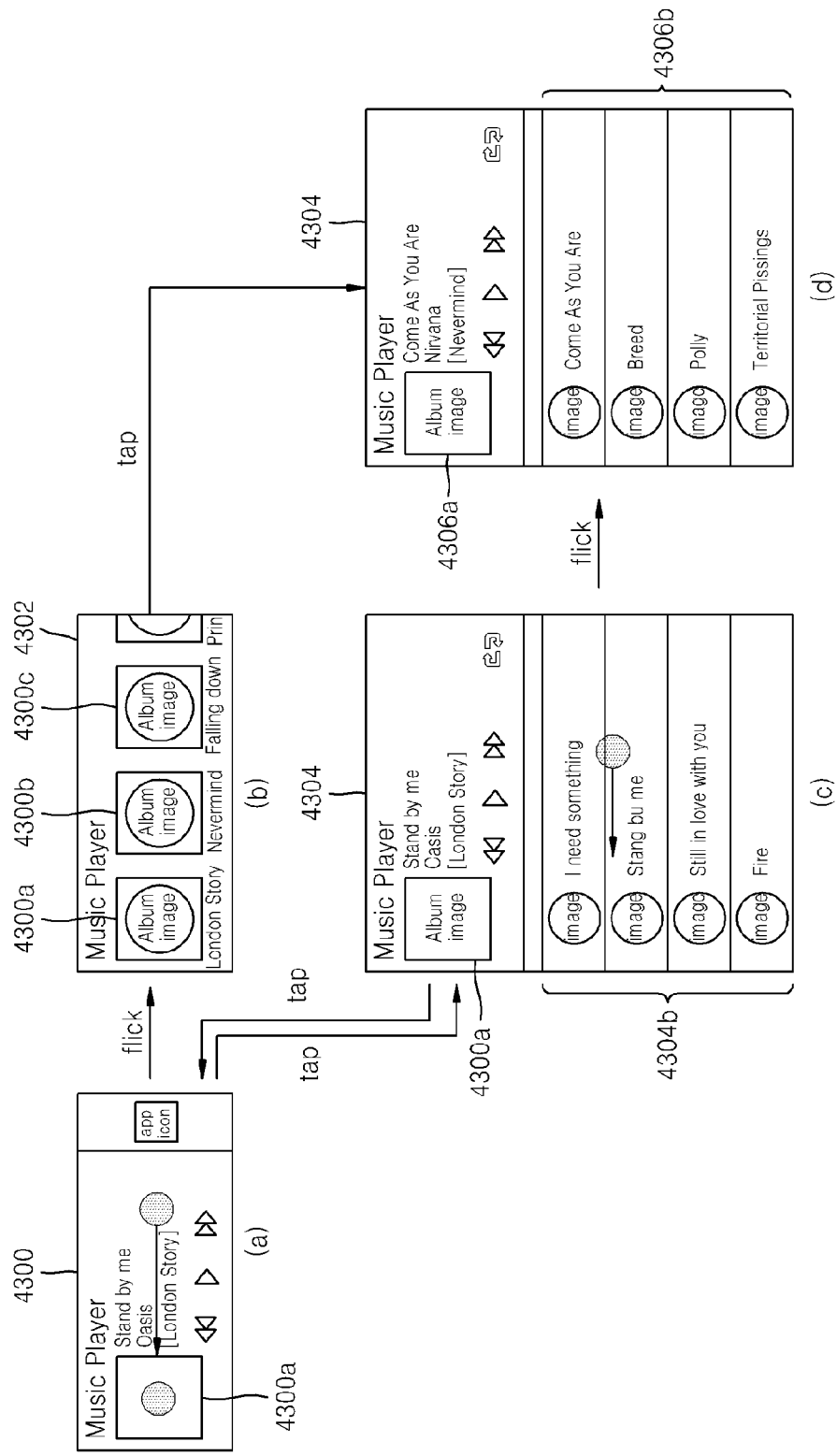
FIG. 43 is a diagram illustrating an example of changing a displayed detail of a window or expanding the window in correspondence with a gesture by a user, when a music player is displayed in the window, according to one or more exemplary embodiments.

FIG. 43 is a diagram illustrating an example of changing a displayed detail of a window 4300 or expanding the window 4300 in correspondence with a gesture by a user, when a music player is displayed in the window.

Referring to (a) of FIG. 43, information about a music track that is currently played, an image 4300a of an album that corresponds to the music track, buttons for controlling playback of the music track, and an icon that corresponds to the music player are displayed in the window 4300. If the user performs a flick operation on the window 4300 in a left or right direction, an image of another album may be displayed in the window 4300. An album may include a plurality of music tracks.

Referring to (b) of FIG. 43, a plurality of album images 4300a, 4300b, and 4300c are displayed in a window 4302. If a user performs a flick operation on the window 4302 when the plurality of album images 4300a, 4300b, and 4300c are displayed in the window 4302, the plurality of album images 4300a, 4300b, and 4300c may be scrolled in a left or right direction.

In (a) of FIG. 43, if the user taps the window 4300, the window 4300 may be displayed in an expanded mode. The window 4300 may only be displayed in an expanded mode if the user taps the window 4300 while music is played.

Referring to (c) of FIG. 43, a window 4304 that is expanded in correspondence with a tap gesture by a user is shown. Information about a music track that is currently played, the image 4300a of an album that corresponds to the music track, buttons for controlling playback of the music track, and a list of music tracks 4304b that are included in the album may be displayed in the expanded window 4304. If the user performs a flick operation on the window 4304 in a left or right direction when the window 4304 is displayed in an expanded mode, another album image and a music track list that is included in the other album may be displayed. For example, if the user performs a flick operation on the expanded window 4304 in a left direction, an image of a next album and a list of music tracks that are included in the next album are displayed in the window 4304.

Referring to (d) of FIG. 43, an image 4306a of another album, a button for controlling playback of a music track, and a list of music tracks 4306b that are included in the album may be displayed in the window 4304 that is expanded to correspond to a flick gesture by the user.

Figure 44:
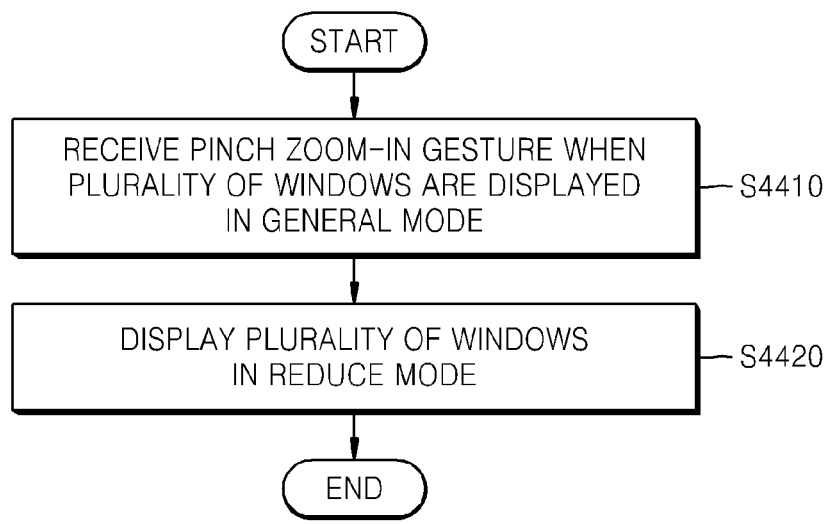
FIG. 44 is a flowchart of a method of displaying a plurality of windows in a reduced mode in correspondence with a pinch zoom-in gesture by a user, when the plurality of windows are displayed in a general mode on a screen, according to one or more exemplary embodiments.

FIG. 44 is a flowchart of a method of displaying a plurality of windows in a reduced mode in correspondence with a pinch zoom-in gesture of a user, when the plurality of windows are displayed in a general mode on a screen. Referring to FIG. 44, in operation S4410, the device receives a pinch zoom-in gesture when the plurality of windows are displayed on a screen in a general mode. A pinch zoom-in gesture is an operation where a user touches a screen with two fingers and moves the two fingers so that the two fingers become close to each other. In operation S4420, the device may display the plurality of windows in a reduced mode, in response to the pinch zoom-in gesture.

Figure 45:
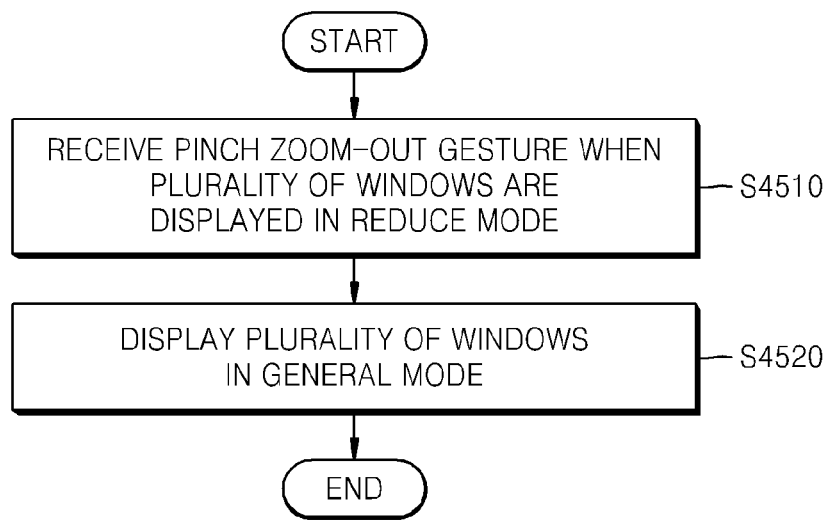
FIG. 45 is a flowchart of a method of displaying a plurality of windows in a reduced mode in correspondence with a pinch zoom-out gesture by a user, when the plurality of windows are displayed in a reduced mode on a screen, according to one or more exemplary embodiments.

FIG. 45 is a flowchart of a method of displaying a plurality of windows in a reduced mode in correspondence with a pinch zoom-out gesture by a user, when the plurality of windows are displayed in a reduced mode on a screen. Referring to FIG. 45, in operation S4510, the device receives a pinch zoom-out gesture when the plurality of windows are displayed on a screen in a reduced mode. A pinch zoom-out gesture is an operation where a user touches a screen with two fingers and moves the two fingers so that the two fingers become far from each other. In operation S4520, the device may display the plurality of windows in a general mode, in response to the pinch zoom-out gesture.

Figure 46:
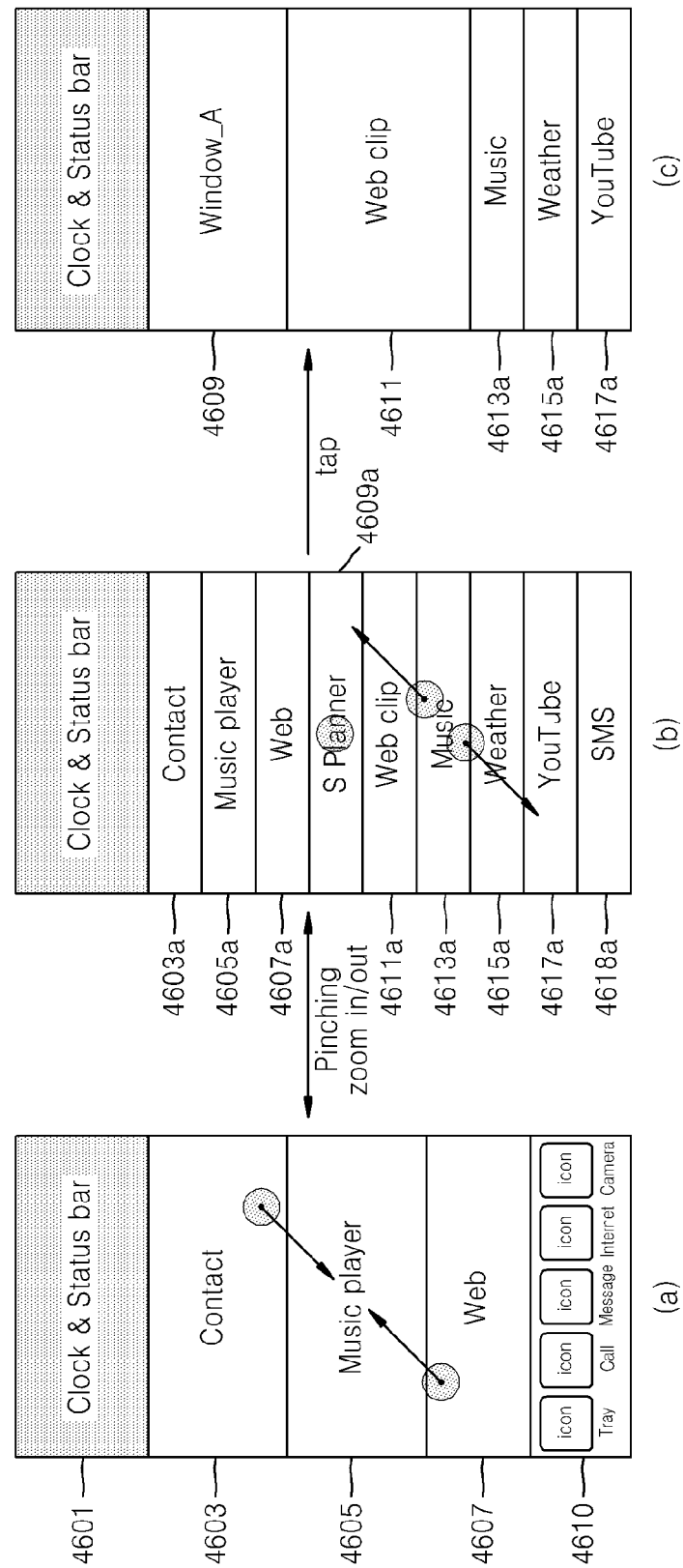
FIG. 46 is a diagram are diagrams illustrating displaying of a window in response to a pinch gesture when the window is displayed in a general mode, according to one or more exemplary embodiments.

FIG. 46 is a diagram illustrating displaying of a window in response to a pinch gesture when the window is displayed in a general mode. Referring to (a) of FIG. 46, a status bar 4601, windows 4603, 4605, and 4607, and an app dock 4610 are shown. Referring to (b) of FIG. 46, windows 4603a, 4605a, 4607a, 4609a, 4611a, 4613a, 4615a, 4617a, and 4618a are shown. Referring to (c) of FIG. 46, windows 4609, 4611, 4613a, 4615a, and 4617a are shown. The windows 4603, 4605, and 4607 are displayed in a general mode. The windows 4603a, 4605a, 4607a, 4609a, 4611a, 4613a, 4615a, 4617a, and 4618a are displayed in a reduced mode. When the windows 4603, 4605, and 4607 are displayed in a general mode, if a user inputs a pinch zoom-in gesture, the controller may control to display the window in a reduced mode in response to the pinch zoom-in gesture. When the plurality of windows 4603, 4605, and 4607 are displayed in a general mode, the controller may receive an input of the pinch zoom-in gesture and, in correspondence with the pinch zoom-in gesture, display the plurality of windows 4603a, 4605a, 4607a, 4609a, 4611a, 4613a, 4615a, 4617a, and 4618a in a reduced mode. If the windows are displayed in a reduced mode, more windows may be displayed on a screen. While the window is displayed in the general mode, an app dock 4610 shown in (a) of FIG. 46 may disappear from the screen. If the window is displayed in the reduced mode, only a name of an application may be displayed in the window. Alternately, if the window is displayed in the reduced mode, only a name of the application and limited information regarding the application may be displayed in the window.

When the window is displayed in the reduced mode, if a user inputs a tap gesture to one of the windows 4603a, 4605a, 4607a, 4609a, 4611a, 4613a, 4615a, 4617a, and 4618a in the reduced mode, a window in the reduced mode, which is placed on a location where the tap gesture is input, is changed to a general mode and displayed uppermost among the plurality of windows. In other words, the window, which is changed to the general mode according to the tap gesture, may be displayed uppermost in a window band. Additionally, as another window is changed to the general mode, the other window may be displayed at an upper part of the window band. For example, if a user inputs a tap gesture to the window 4609a in a state described with reference to (b) of FIG. 46, the controller may receive the tap gesture input, and control to change the window 4609a to the general mode in correspondence with the tap gesture and display the window to be placed uppermost in the window band. Referring to (c) of FIG. 46, the window 4609 is displayed at an uppermost part of the window band. The window 4609 is obtained when the window 4609a shown in (b) of FIG. 46 is displayed in the general mode. The window 4611 may also be displayed in the general mode. The window 4611 is obtained when the window 4611a is displayed in the general mode.

Due to a limited size of a screen, the windows 4609 and 4611 are displayed in the general mode, and the other windows 4613a, 4615a, and 4617a are maintained at a reduced mode state and displayed on the screen.

The controller receives an input of a pinch zoom-out gesture when a plurality of windows are displayed in the reduced mode and, in correspondence with the pinch zoom-out gesture, display the plurality of windows in the general mode. As shown in (b) of FIG. 46, if the user inputs a pinch zoom-out gesture when the windows 4603a, 4605a, 4607a, 4609a, 4611a, 4613a, 4615a, 4617a, and 4618a are displayed in the reduced mode, the controller may display the windows 4603, 4605, and 4607 in the general mode on the screen in response to the pinch zoom-out gesture, as shown in (a) of FIG. 46. The status bar 4601 may be displayed on the screen, regardless of whether the window is in the general mode or in the reduced mode. As the window is displayed in the general mode, the app dock 4610 may be displayed on the screen.

Figure 47:
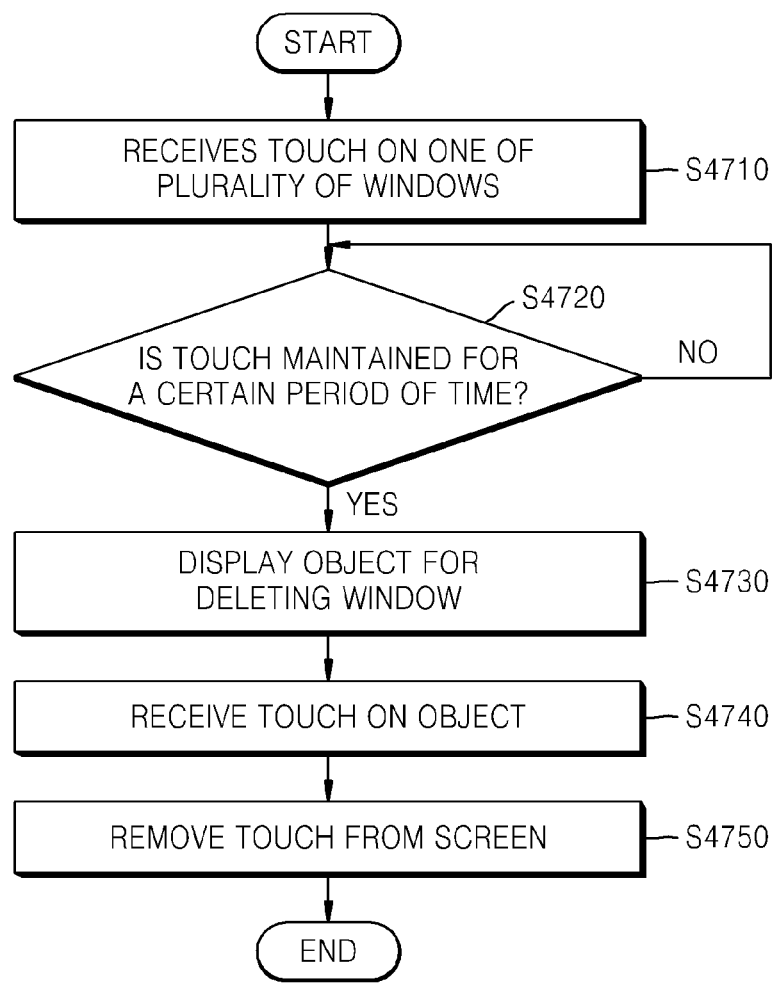
FIG. 47 is a flowchart of a method of deleting a window displayed on a screen, according to one or more exemplary embodiments.

FIG. 47 is a flowchart of a method of deleting a window displayed on a screen, according to one or more exemplary embodiments. Referring to FIG. 47, in operation S4710, the device receives a touch on one of a plurality of windows displayed on the screen. When the touch is received by the window, the device determines whether the touch is maintained for a predetermined period of time. If it is determined that the touch is maintained for a predetermined period of time in operation S4720, the device displays an object for deleting the window on a side of the window in operation S4730. An object may be an image, text, or a symbol. In operation S4740, the device receives a touch on the object displayed on the screen. If the user touches the object displayed on the screen, the device may receive a touch on the object. In operation S4750, if the touch on the object displayed on the screen is received, the device may remove the window from the screen, in correspondence with the touch. An operation in which the user touches the object may be sequentially performed after the touch is received in operation S4730. For example, if the user touches the window with a finger and maintains the touch for a predetermined period of time, an object may be displayed on one side of the window. When the object is displayed on one side of the window, if the user maintains a touch on the screen with the finger and moves the finger to a location where the object is displayed, the window may be removed from the screen. Additionally, the user may separate the finger from the screen and touch the location where the object is displayed, and in correspondence with this, the device may remove the window from the screen.

Figure 48:
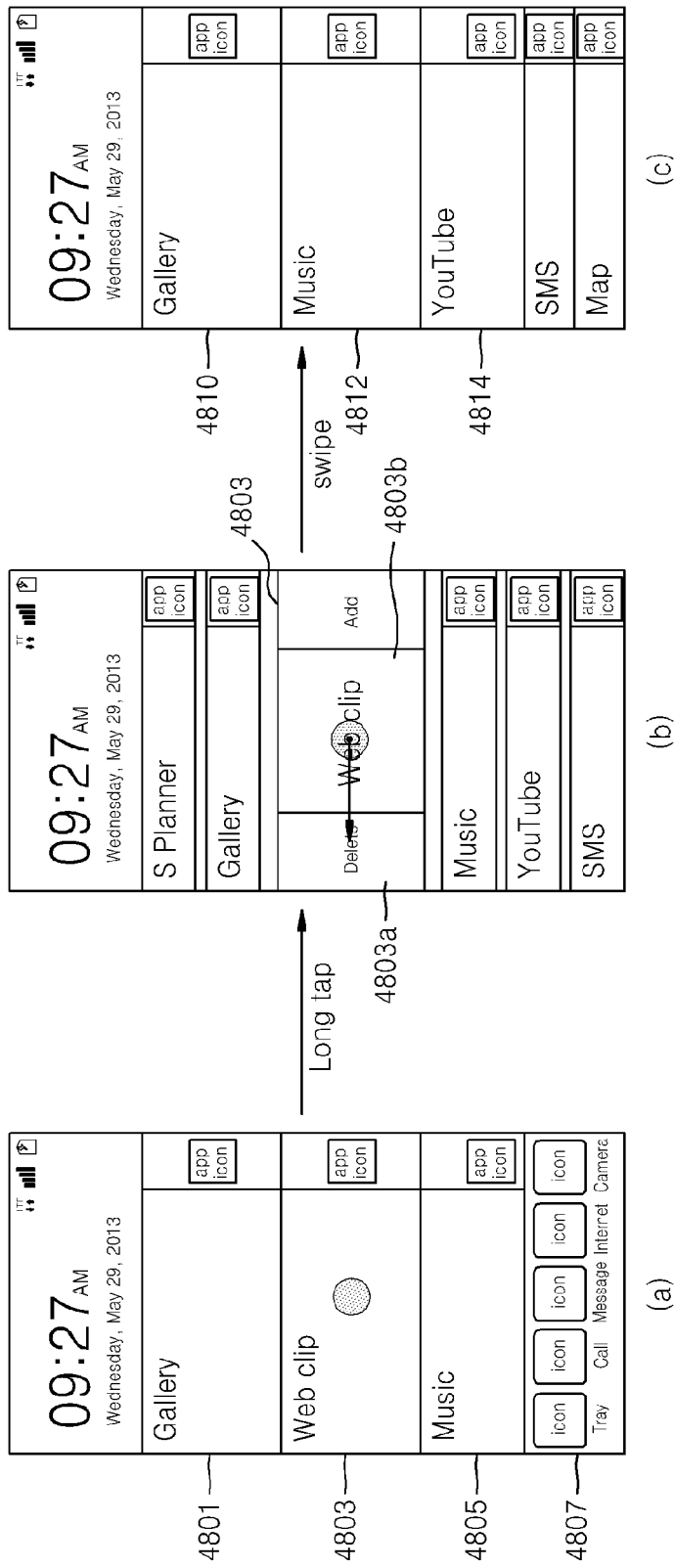
FIG. 48 is a diagram illustrating a process of deleting a window included in a window band, according to one or more exemplary embodiments.

FIG. 48 is a diagram illustrating a process of deleting a window included in a window band. Referring to (a) of FIG. 48, a plurality of windows 4801, 4803, and 4805 and an app dock 4807 are displayed on a screen. The plurality of windows 4801, 4803, and 4805 may constitute a window band. Additionally, if the user touches the window and maintains the touch for a predetermined period of time, an object 4803a for deleting the window 4803 on a left side of the window 4803 may be displayed on one side of the window, as shown in (b) of FIG. 48. The object 4803a may be an image, text, or a symbol. For example, "delete" may be displayed on the object 4803a. If the user touches the object 4803a, the window 4803 disappears from the screen. If the user touches the screen with a finger and drags and drops the finger in a direction of the object 4803a while maintaining the touch, the window 4803 may be deleted. As the window 4803 is deleted, the window 4805 that was placed below the deleted window 4803 may move upwards and be displayed, as shown in (c) of FIG. 48.

Figure 49:
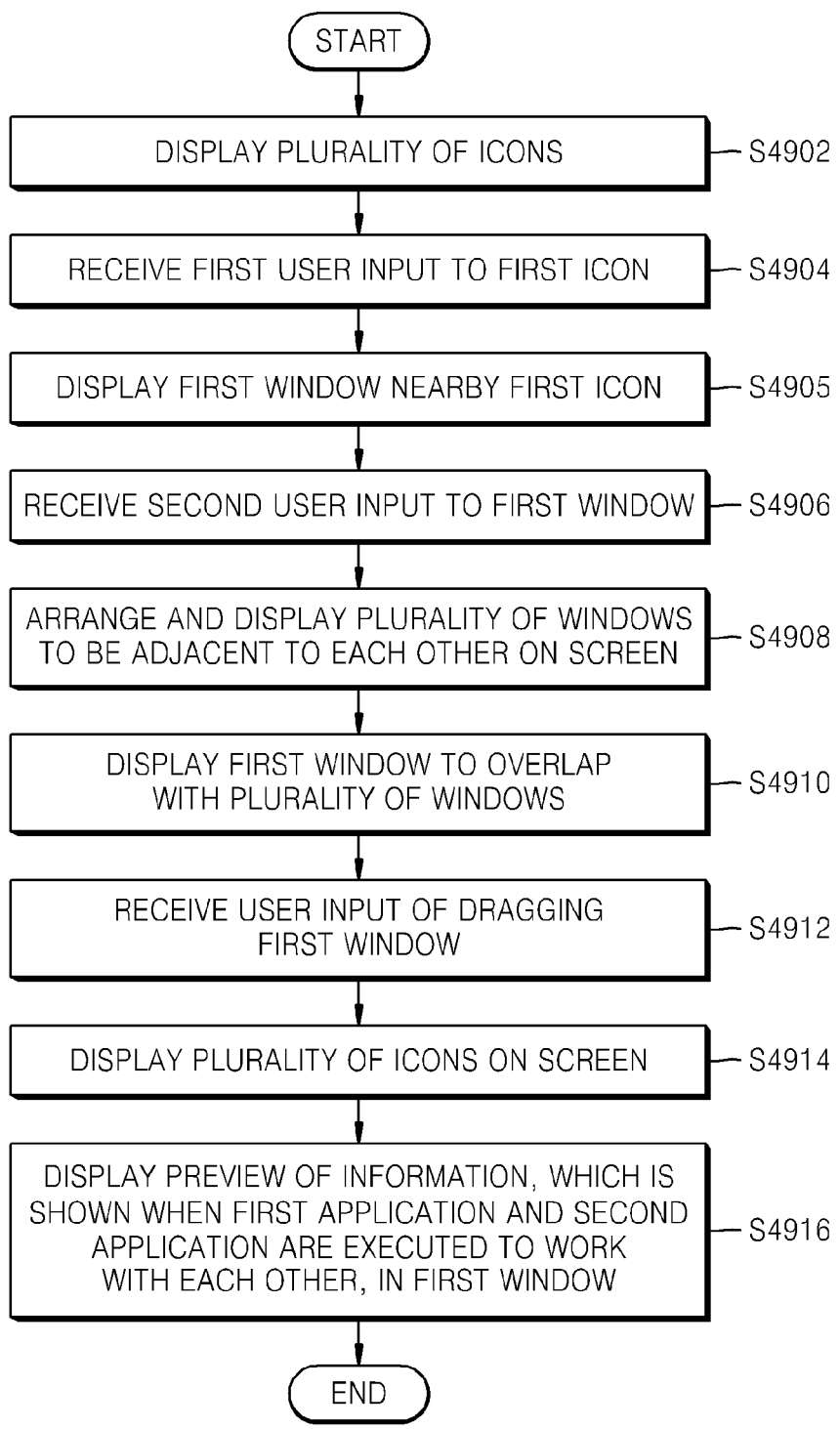
FIG. 49 is a flowchart of a method of executing an application that corresponds to an icon that is selected from among a plurality of icons and an application that corresponds to a certain window that is included in a plurality of windows to work with each other, according to one or more exemplary embodiments.

FIG. 49 is a flowchart of a method of executing an application that corresponds to an icon that is selected from among a plurality of icons and an application that corresponds to a certain window that is included in a plurality of windows to work with each other, according to one or more exemplary embodiments.

FIG. 50 is a diagram illustrating an example of executing an application that corresponds to an icon that is selected from among a plurality of icons and an application that corresponds to a certain window that is included in a plurality of windows to work with each other, according to one or more exemplary embodiments.

Referring to FIG. 49, in operation S4902, the device displays a plurality of icons that corresponds to a plurality of applications. Referring to (a) of FIG. 50, a plurality of icons 5002 are displayed on a screen of a display. Each icon that constitutes the plurality of icons 5002 may correspond to a particular application. If a user touches an icon, an application that corresponds to the touched icon may be executed. An execution result of an application may be displayed on the whole screen of the display or may be displayed on a window that is displayed on the screen of the display. An icon may be a UI.

In operation S4904, the device may receive a first user input for selecting a first icon 5004 from among the plurality of icons 5002 that are displayed on the screen of the display.

In operation S4905, in response to the first user input, the device may display a first window, which shows an execution result of an application that corresponds to the first icon 5004, near the first icon 5004. The first window may correspond to a first icon. Additionally, for example, the first user input may be a flick gesture. If a flick gesture is input to the first icon, the device may display the first window that corresponds to the first icon in correspondence with the flick gesture. The first icon may correspond to a first application. An execution result of the first application may be displayed in the first window. Additionally, an image in which the execution result of the first application is captured may be displayed as a preview in the first window.

The first window may be displayed in a nearby area of the first icon. The first window may be displayed in a nearby area of a location where the first icon is displayed on a screen. The nearby area of the first icon may be one from among an upper side, a lower side, a left side, and a right side of the location where the first icon is displayed. Referring to (b) of FIG. 50, a first window 5006 is shown. The first window 5006 is displayed on an upper side of the first icon 5004.

In operation S4906, the device may receive a second user input to the first window that is displayed on a screen of the display. The device may receive the second user input and perform an operation that corresponds to the received second user input. For example, the second user input may be a long tap. A long tap is an operation in which a user touches the first window 5006 displayed on the screen and maintains the touch for a certain period of time. For example, if the user touches the first window 5006 and maintains the touch for two seconds, the controller may determine the second user input as a long tap.

In operation S4908, the device may arrange and display a plurality of windows to be adjacent to each other on the screen, based on the second user input. If the controller receives the second user input and determines the user input as a long tap, the controller may display the plurality of windows, which are arranged to be adjacent to each other, on the screen.

A display mode of each window that constitutes the plurality of windows may include a first mode and a second mode. In the first mode, first data is displayed in the window, and in the second mode, first data and second data may be displayed in the window. Additionally, a window displayed in the first mode may be displayed with a smaller size than a window displayed in the second mode. The first mode may be a reduced mode. The second mode may be a general mode.

Referring to (c) of FIG. 50, a plurality of windows 5008, 5010, 5012, 5014, and 5016 are displayed on a screen of the display. The plurality of windows 5008, 5010, 5012, 5014, and 5016 may be arranged to be adjacent to each other, and widths of the plurality of windows 5008, 5010, 5012, 5014, and 5016 may be identical. The device may display the window 5012 that is a second window, which is related to the first window 5006, to be visually distinguished from other windows from among the plurality of windows. The windows 5008, 5010, 5014, and 5016 are displayed in the first mode, and the window 5012 is displayed in the second mode. The windows 5008, 5010, 5014, and 5016 are displayed with a smaller size than the window 5012. The first mode may be a reduced mode. The second mode may be a general mode. The device may display the second window 5012 in the second mode, and the other windows 5008, 5010, 5014, and 5016 in the first mode, so as to display the second window 5012 related to the first window 5006 to be visually distinguished from the other windows 5008, 5010, 5014, and 5016. Additionally, the device may display the second window 5012 to be visually distinguished from the other windows 5008, 5010, 5014, and 5016 by changing a color or an attribute of the second window 5012 related to the first window 5006. For example, a color, a shade, or a size of the first window 5006 and the second window 5012 may be displayed different from that of the other windows 5008, 5010, 5014, and 5016. Additionally, for example, a color, a shade, or a thickness of an edge of the first window 5006 and the second window 5012 may be displayed different from that of the other windows 5008, 5010, 5014, and 5016.

In operation S4910, the device may display the first window 5006 to overlap with the plurality of windows 5008, 5010, 5012, 5014, and 5016. The first window 5006 may be displayed with a smaller size than the second window 5012. The first window 5006 may be displayed with a larger size than the other windows 5008, 5010, 5014, and 5016.

If the first window 5006 and the second window 5012 are related to each other, at least one piece of data from among data of the first application executed in the first window 5006 and data of the second application executed in the second window 5012 may be shared by the first application and the second application.

An execution result of the first application may be displayed in the first window 5006. An execution result of the second application may be displayed in the second window 5012. Data used by the first application may be used by the second application. Data obtained from the execution result of the first application may be used by the second application.

Data used by the second application may be used by the first application. Data obtained from the execution result of the second application may be used by the first application.

In operation S4912, the device may receive a user input of dragging the first window 5006 and, in response to the user input, move the first window 5006. When the first window 5006 is moved to a location where the second window 5012 is displayed, a preview of information, which is shown when the first application and the second application are executed to work with each other, may be displayed in the first window 5006.

If a user drags the first window 5006, the first window 5006 may be moved according to a movement of a finger of the user. The user may drag the first window 5006 in a downward direction and move the first window 5006 to a location where the second window 5012 is displayed. In operation S4914, when the first window 5006 is moved to the location where the second window 5012 is displayed, the first window 5006 may be displayed above the second window 5012. In operation S4916, preview of information may be displayed.

Referring to (d) of FIG. 50, the first window 5006 is displayed above the second window 5012. As the first window 5006 is located above the second window 5012, details displayed in the first window 5006 may be changed. First, an execution result of the first application is displayed in the first window 5006. When the first window 5006 is moved to a location where the second window 5012 is displayed, a result, in which the first application and the second application are executed to work with each other, may be displayed as a preview in the first window 5006. For example, when the first application is a schedule management application and the second application is a map application, if the first application and the second application are executed to work with each other, a place of an appointment may be included in the execution result of the map application, and thus, displayed. Additionally, a map in which the place of the appointment is shown may be displayed as a preview in the first window 5006. The other windows 5010, 5014, 5016, 5018, and 5020 are displayed in the first mode.

The device may detect a release of a user input in the first window 5006, and in correspondence with the release of the user input, display the first window 5006 to be adjacent to the second window 5012 and display at least one of the first window 5006 and the second window 5012 to be visually distinguished from the other window. Release of a user input is an operation of finishing a drag input that is made by a user and may be performed by detaching a finger of a user, which has touched a screen of the device, from the screen. If the user drags and moves the first window 5006 to a location where the second window 5012 is displayed, and then, detaches the finger from the screen, the device may detect a release of a user input on the screen. The device may display the first window 5006 above or below the second window 5012. Another window displayed in the first mode may be displayed in the second mode. Referring to (e) of FIG. 50, the first window 5006 is displayed below and adjacent to the second window 5012. Another window 5010 is displayed above and adjacent to the second window 5012. The other window 5010 may be displayed in the first mode, and then, changed to be displayed in the second mode. An app dock 5022, in which a frequently used icon is shown, may be displayed in a lower part of the screen.

The lower part of the second window 5012 is adjacent to the first window 5006, and a graphic object 5013 is displayed in the lower part of the second window 5012. The graphic object 5013 indicates that the first window 5006 and the second window 5012 are associated with each other. Additionally, the graphic object 5013 may be displayed in various shapes and colors. Additionally, the graphic object 5013 may be displayed to be included in the first window 5006. In other words, the graphic object 5013 for indicating that the first window 5006 and the second window 5012 are associated with each other may be displayed in at least one of the first window 5006 and the second window 5012.

If the first window 5006 moves to a location where the second window 5012 is displayed, the device may directly display the first window 5006 to be adjacent to the second window 5012 without having to display a preview in the first window 5006.

The device may receive a user input of moving the first window 5006 to a location where the second window 5012 is displayed, display the first window 5006 to be adjacent to the second window 5012 in response to the user input, and display a result in which the first application and the second application are executed to work with each other in at least one of the first window 5006 and the second window 5012.

FIG. 51 is a diagram illustrating a second window that may work with a first window, according to one or more exemplary embodiments. Referring to FIG (a) of FIG. 51, a first window 5102 is displayed to overlap with a plurality of windows 5104, 5106, 5108, 5110, 5112, 5114, and 5116. The plurality of windows 5104, 5106, 5108, 5110, 5112, 5114, and 5116 are displayed adjacent to each other. The window

5104 that is a second window is displayed in a second mode. The other windows 5106, 5108, 5110, 5112, 5114, and 5116 are displayed in a first mode. The first mode may be a reduced mode. The second mode may be a general mode.

The second window 5104 may work with the first window 5102 and may be displayed in the general mode. The second window 5104 may be displayed in an upper part of a screen, compared to the other windows 5106, 5108, 5110, 5112, 5114, and 5116. The device may move the second window 5104 that may work with the first window 5102 and display the second window 5104 in an upper part of the screen. For example, the second window 5104 was originally placed between the window 5114 and the window 5116. However, as the first window 5104 and the second window 5104 work with each other, the second window 5104 may be moved to and displayed in an upper part of the screen.

Additionally, the device may display the second window 5104, which may work with the first window 5104, to be adjacent to the first window 5104. If the first window 5104 is placed in an upper part of the screen, the second window 5104 that may work with the first window 5102 may be moved to and displayed in an upper part of the screen, so that the second window 5104 may be displaced adjacent to the first window 5102. If the first window 5102 is placed in a middle of the screen, the second window 5104 that may work with the first window 5102 may be moved to and displayed in a middle of the screen. If the first window 5102 is placed in a lower part of the screen, the second window 5104 that may work with the first window 5102 may be moved to and displayed in a lower part of the screen.

Referring to (b) of FIG. 51, a first window 5122 is displayed to overlap with a plurality of windows 5124, 5126, 5128, 5130, 5132, 5134, and 5136. The plurality of windows 5124, 5126, 5128, 5130, 5132, 5134, and 5136 are displayed adjacent to each other. The window 5124 that is a second window is displayed in the second mode. The other windows 5126, 5128, 5130, 5132, 5134, and 5136 are displayed in the first mode. The first mode may be a reduced mode. The second mode may be a general mode.

The second window 5124 may work with the first window 5122 and may be displayed in the general mode. The second window 5124 may be displayed in an upper part of a screen, compared to the other windows 5126, 5128, 5130, 5132, 5134, and 5136. The device may move the second window 5124 that may work with the first window 5122 and display the second window 5124 in an upper part of the screen. Even when the second window 5124 is not displayed on the screen, the device may move and display the second window 5124 in an upper part of the screen.

For example, though the second window 5124 was not originally displayed in the screen, as the second window 5124 works with the first window 5122, the second window 5124 may be moved to and displayed in an upper part of the screen.

Additionally, the device may display the second window 5124, which may work with the first window 5122, to be adjacent to the first window 5124. If the first window 5104 is placed in an upper part of the screen, the second window 5124 that may work with the first window 5122 may be moved to and displayed in an upper part of the screen. If the first window 5122 is placed in a middle of the screen, the second window 5124 that may work with the first window 5122 may be moved to and displayed in a middle of the screen. If the first window 5122 is placed in a lower part of the screen, the second window 5124 that may work with the first window 5122 may be moved to and displayed in a lower part of the screen.

Referring to (c) of FIG. 51, a first window 5142 is displayed to overlap with a plurality of windows 5144, 5146, 5148, 5150, 5152, 5154, 5156, and 5158. The plurality of windows 5144, 5146, 5148, 5150, 5152, 5154, 5156, and 5158 are displayed adjacent to each other. A second window that may work with the first window 5142 is not displayed on the screen.

An object 5159 for showing the number of windows that may work with the first window 5142 may be displayed in a lower part of the screen. For example, the object 5159 may be an image in a shape of an arrow. The object 5159 may provide information about a location of the second window that may work with the first window 5142 with reference to a current screen and information about the number of second windows. For example, with reference to the current screen, if two second windows that may work with the first window 5142 are present in a lower part of the screen, the object 5159 may be displayed to be directed downwards, and "2" may be displayed in the object 5159. Additionally, for example, with reference to the current screen, if three second windows that may work with the first window 5142 are present in an upper part of the screen, the object 5159 may be displayed to be directed upwards, and, for example, "3" may be displayed in the object 5159.

When "2" is displayed in the object 5159 that is directed downwards, if a user scrolls a plurality of windows in a downward direction, two second windows that may work with the first window 5142 may appear.

Additionally, if a plurality of second windows that may work with the first window 5142 are present, the second windows may be displayed in an order of priority. Additionally, if a plurality of second windows that may work with the first window 5142 are present, the second windows may be displayed in a nearby area of the first window in an order of a priority. In this case, a priority in which the second windows work with the first window may be determined based on a degree of association between the first window and the second windows. For example, a priority may be determined according to the number of times the first window 5142 and the second windows have worked with each other, and thus, employed by a user, and a degree of redundancy of data displayed in the first window 5142 and data displayed in the second windows.

Referring to (d) of FIG. 51, a first window 5162 is displayed to overlap with a plurality of windows 5164, 5166, 5168, 5170, 5172, and 5174. The windows 5164, 5166, and 5168 are displayed in the second mode. The windows 5170, 5172, and 5174 are displayed in the first mode. The second mode may be a general mode. The first mode may be a reduced mode. The windows 5162, 5264, and 5168 that are second windows that may work with the first window 5162 may be displayed in a general mode. If a plurality of the second windows 5162, 5264, and 5168 are present, an order of displaying the second windows 5162, 5264, and 5168 may be determined according to a priority of working with the first window 5162. A priority may be preset for each application. For example, the window 5164 from among the second windows 5164, 5266, and 5168 that may work with the first window 5162 has a highest priority and may be displayed in an uppermost part of the screen. The window 5166 has a second highest priority and may be displayed below the window 5164. The window 5168 has a third highest priority and may be displayed below the window 5166.

Figure 52:
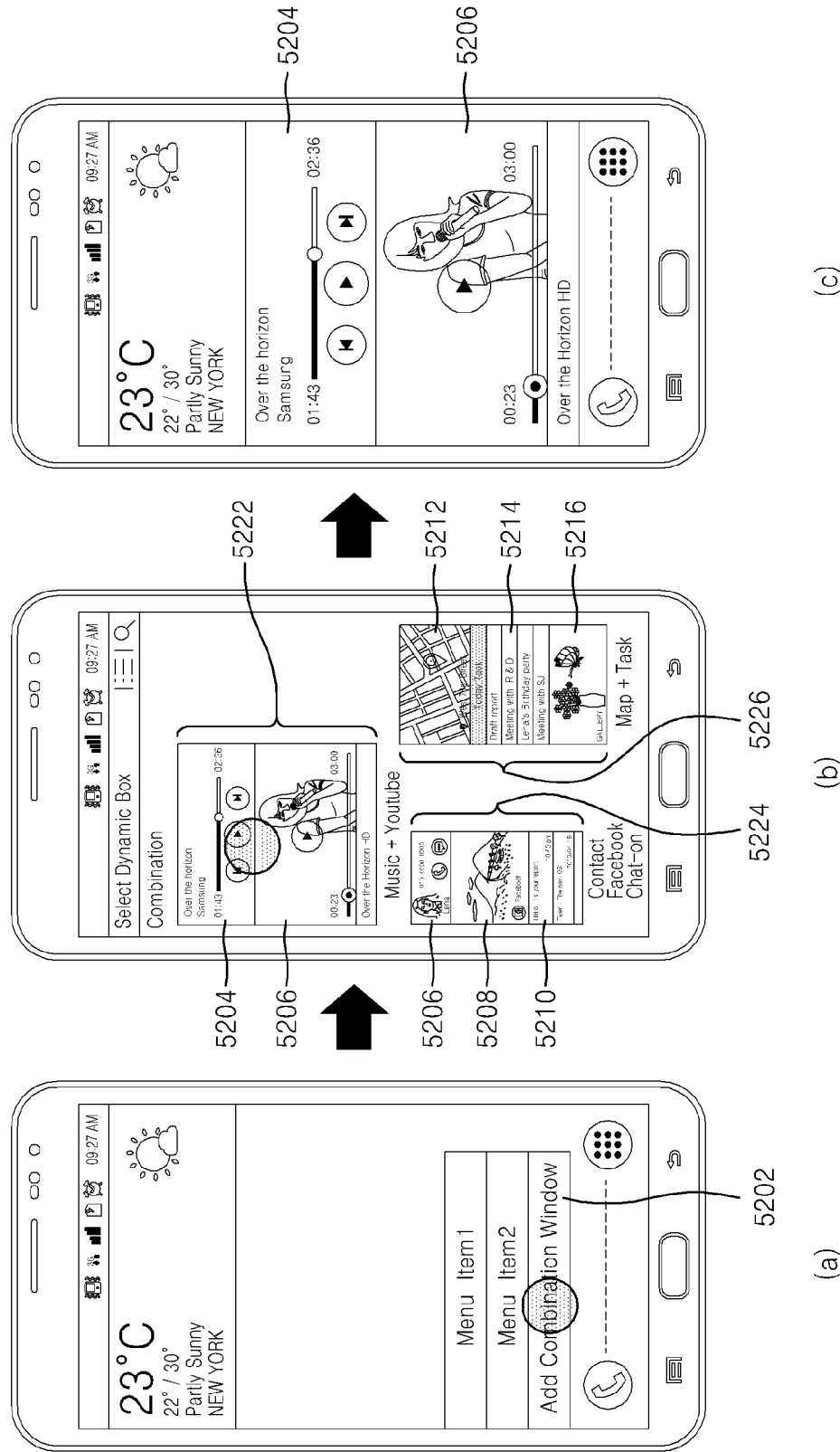
FIG. 52 is a diagram illustrating an example in which a plurality of windows that may work with each other are provided in a pre-combined form, according to one or more exemplary embodiments.

FIG. 52 is a diagram illustrating an example in which a plurality of windows that may work with each other are provided in a pre-combined form.

The device may form a combination of a plurality of windows that may work with each other for a preset number of times and used, and display a preview image in which a plurality of windows are combined on a screen. The device may generate a combination of a plurality of windows in advance by analyzing a history of an application for which a plurality of windows were executed to work with each other and provide a preview image to the screen.

Referring to (a) of FIG. 52, a UI 5202 for combining windows is displayed. If a user selects a plurality of windows via the UI 5202, the device may display a preview image, in which the plurality of windows are combined in advance, on the screen.

Referring to (b) of FIG. 52, preview images 5222, 5224, and 5226, in which a plurality of windows are combined, are displayed. Two windows 5204 and 5206 are combined in the preview image 5222, and the windows 5204 and 5206 may work with each other. Three windows 5206, 5208, and 5210 are combined in the preview image 5224, and the windows 5206, 5208, and 5210 may work with each other. Three windows 5212, 5214, and 5216 are combined in the preview image 5226, and the windows 5212, 5214, and 5216 may work with each other.

Text for providing information about a window combination may be displayed below each of the preview images 5222, 5224, and 5226. For example, "Music+Youtube" is displayed below the preview image 5222.

When the plurality of windows are combined in advance and apps executed in each window are executed to work with each other, information about the apps that may work with each other may be written to each app. Additionally, the device may store a history that a plurality of apps worked with each other and were executed in a separate file. For example, if an app A and an app B are executed to work with each other, the device may write identification values of the app A and the app B, and information regarding how the app A and the app B work with each other.

If a user selects one of the preview images 5222, 5224, and 5226, a plurality of windows that correspond to the selected preview image may work with each other, and a result that a plurality of apps were executed to work with each other may be displayed in each window. For example, if a user selects the preview image 5222, the windows 5204 and 5206 may work with each other and a result that two apps were executed to work with each other may be displayed in the window 5204 and 5206, as shown in (c) of FIG. 52.

Referring to (c) of FIG. 52, the window 5204 and the window 5206 work with each other and displayed. An app execution result, with reference to an app executed in the window 5204, may be displayed in the window 5206. For example, if music "A" is played in the window 5204, a music video for the music "A" may be displayed in the window 5206 that is executed to work with the window 5204.

Figure 55:
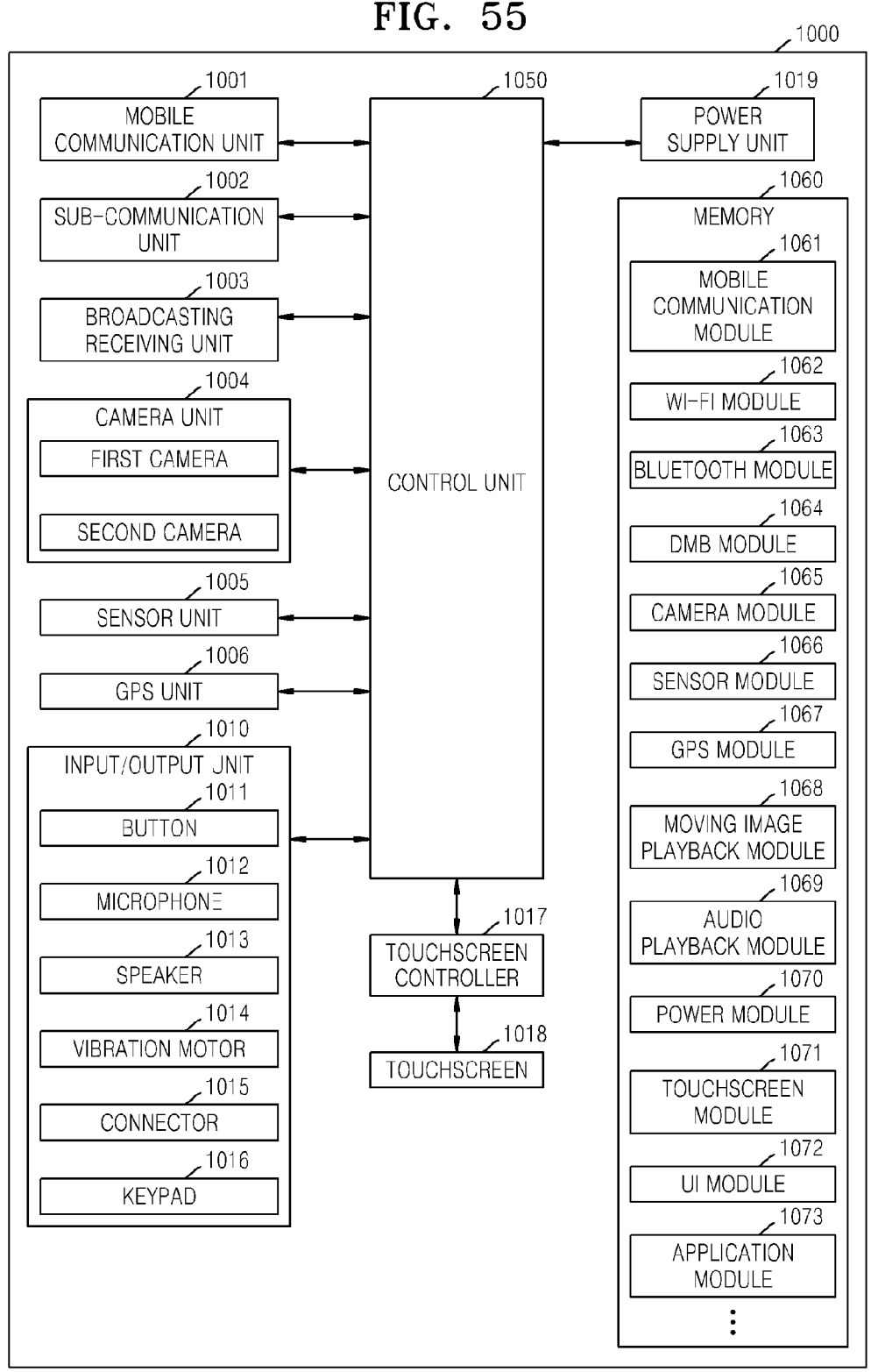
FIG. 55 is a block diagram of the device according to one or more exemplary embodiments.

FIG. 55 is a diagram illustrating a result in which a plurality of apps are executed to work with each other. If the plurality of apps are executed to work with each other, the device may read data from one of the plurality of apps that are executed to work with each other and provide the data to another app. Additionally, the device may filter a result displayed by the other app, based on the data provided to the other app.

Figure 53:
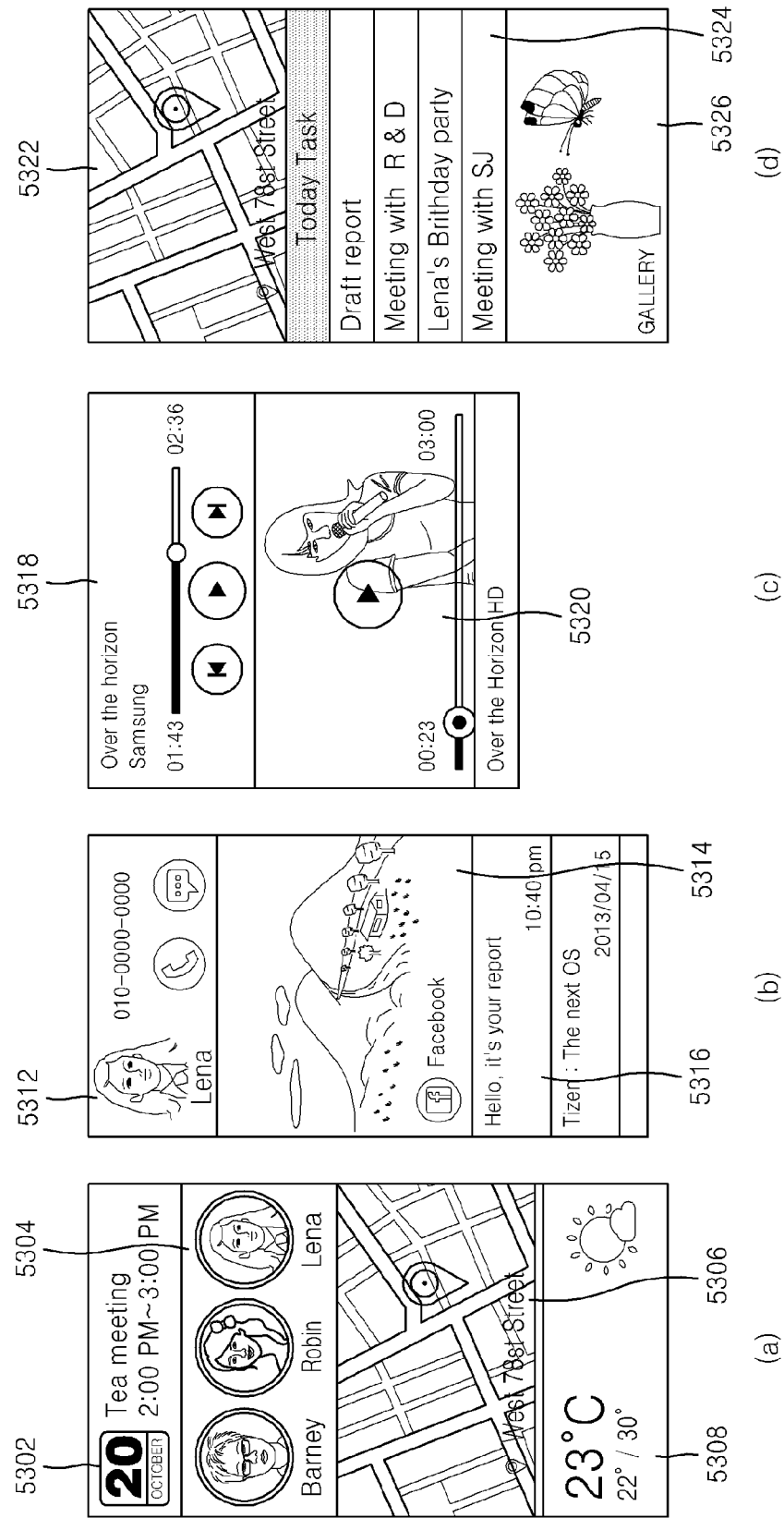
FIG. 53 is a diagram illustrating a result in which a plurality of apps are executed to work with each other, according to one or more exemplary embodiments.

Referring to (a) of FIG. 53, a plurality of windows 5302, 5304, 5306, and 5308 are displayed on a screen. The plurality of windows 5302, 5304, 5306, and 5308 work with each other. A 'calendar app' is executed in the window 5302, an 'address app' is executed in the window 5304, a 'map app' is executed in the window 5306, and a 'weather app' is executed in the window 5308. When the plurality of windows 5302, 5304, 5306, and 5308 work with each other, a result in which each app is executed to work with each other may be displayed in each window. For example, while the 'calendar app' is being executed in the window 5302, today's schedule may be displayed. While the 'address app' is being executed in the window 5302, data, (for example, today's schedule information), may be read from the 'calendar app' that is being executed in the window 5302, and a name and contact information of a person to meet today may be displayed. While the 'map app' is being executed in the window 5306, data (for example, today's schedule information) may be read from the 'calendar app', and a meeting place may be displayed on a map. While the 'weather app' is being executed in the window 5308, a 'date' is read from the window 5302 and weather information of the date may be provided in the window 5308.

Referring to (b) of FIG. 53, a plurality of windows 5312, 5314, and 5316 are displayed on a screen. The plurality of windows 5312, 5314, and 5316 work with each other. An 'address book app' is executed in the window 5302, an 'SMS app' is executed in the window 5314, and an 'e-mail app' is executed in the window 5316. When the plurality of windows 5312, 5314, and 5316 work with each other, a result in which each app is executed to work with each other may be displayed in each window. For example, the "address book app" is being executed in the window 5312. While the 'SMS app' is being executed in the window 5314, data, for example, user information day, may be read from the 'address app' that is being executed in the window 5312, and an SMS message for a person that corresponds to the data may be displayed. While the 'e-mail app' is being executed in the window 5316, data (for example, user information day) may be read from the 'address book app' that is being executed in the window 5312, and an e-mail message for a person that corresponds to the data may be displayed.

Referring to (c) of FIG. 53, a plurality of windows 5318 and 5320 are displayed on a screen. The plurality of windows 5318 and 5320 work with each other. A 'music app' is executed in the window 5318, and a 'video app' is executed in the window 5320. When the plurality of windows 5318 and 5320 work with each other, a result in which each app is executed to work with each other may be displayed in each window. For example, the "music app" is being executed in the window 5318. While the 'video app' is being executed in the window 5320, data (for example, an identification value of music) may be read from the 'music app' that is being executed in the window 5318, and a music video related to music that is being played may be displayed.

Referring to (d) of FIG. 53, a plurality of windows 5322, 5324, and 5326 are displayed on a screen. The plurality of windows 5322, 5324, and 5326 are worked. A 'map app' is executed in the window 5322, a 'task app' is executed in the window 5324, and a 'gallery app' is executed in the window 5326. When the plurality of windows 5322, 5324, and 5326 are executed, a result in which each app is executed to work with each other may be displayed in each window. For example, the "map app" is being executed in the window 5322. While the 'task app' is being executed in the window 5324, data (for example, location information of a particular location) may be read from the 'map app' that is being executed in the window 5322, and a list of to-dos in a location that corresponds to the location information may be displayed. While the 'gallery app' is being executed in the window 5326, data (for example, location information of a particular location) may be read from the 'map app' that is being executed in the window 5312, and a photograph that was taken at a location that corresponds to the location information may be displayed.

Figure 54:
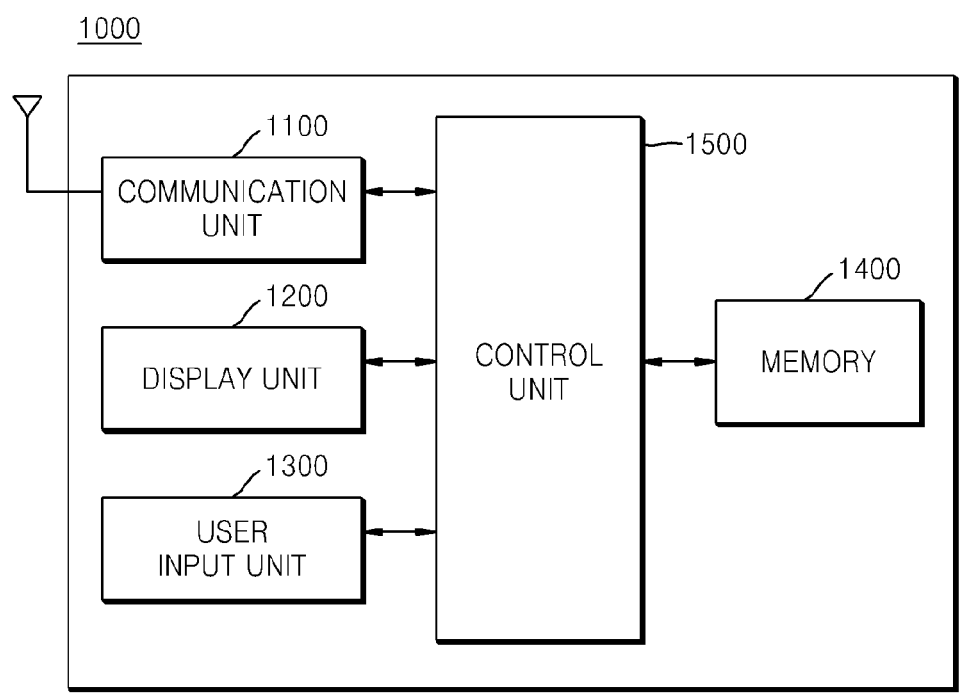
FIG. 54 is a block diagram of the device according to one or more exemplary embodiments.

FIG. 54 is a block diagram of the device 1000 according to one or more exemplary embodiments.

Referring to FIG. 54, according to one or more exemplary embodiments, the device 1000 includes a display 1200, a user input unit 1300, a memory 1400, a communicator 1100, and a controller 1500.

The display 1200 displays a window band that includes windows on a screen of the device 1000. The window band may include, for example, a lock band, a home band, and an application band. The display 1200 is controlled by the controller 1500 that will be described later, and thus, may display a home band on a home screen, a lock band on a lock screen, and an application band on an application screen.

The display 1200 is controlled by the controller 1500 that will be described later, and thus, may display an execution result of an application that is executed by the device 1000 in a window in the window band in real time. The display 1200 may include, for example, a touchscreen, but is not limited thereto.

The user input unit 1300 receives a user input to the device 1000. The user input unit 1300 may receive a user input to the window band and windows. The user input unit 1300 may include, for example, a touchscreen, but is not limited thereto.

The memory 1400 stores information that is used to display the window band that includes windows, which show an execution of an application, on the screen of the device 1000. Additionally, the memory 1400 may store a window and a window band that are generated by the device 1000.

The communicator 1100 establishes a communication between an external apparatus (not illustrated) and an external server (not illustrated), and transmits and receives data between the external apparatus (not illustrated) and the external server (not illustrated). In the description with reference to FIG. 54, the device 1000 includes the communicator 1100. However, this is only an example, and the device 1000 may not include the communicator 1100.

The controller 1500 controls all operations of the device 1000 and controls the user input unit 1300, the memory 1400, and the communicator 1100, so that the device 1000 may generate and display a window band that includes a window.

In detail, the controller 1500 determines an application that is executed in the device 1000. The device 1000 may identify an application that is executed in the device 1000 and check a function that is executed from among functions of the application.

The controller 1500 generates a window band that includes a plurality of windows, which show an execution result of an application that is being executed. The controller 1500 may generate a window band by generating a plurality of windows that show an execution result of an application that is being executed and arranging the plurality of windows to be adjacent to each other.

The controller 1500 may also generate a window that shows only a preset part of an execution result of an application that is being executed. The controller 1500 may display only a part of a whole area of an execution screen of an application on the window. For example, if an application is a web browser, the controller 1500 may generate a window that shows only an address input window of the web browser.

The controller 1500 may select some applications from among applications that are being executed and generate windows that respectively show an execution result of the selected applications.

The controller 1500 may arrange a plurality of the generated windows according to preset criteria. For example, the controller 1500 may locate a window of an application that is frequently used by a user on an upper part of the window band. Additionally, for example, the controller 1500 may locate a window of an application that was recently used by a user on an upper part of the window band, but exemplary embodiments are not limited thereto.

The controller 1500 displays the generated window band on a screen of the device 1000. The window band may include, for example, a lock band, a home band, and an application band. The controller 1500 may display a lock band on a lock screen and display a home band on a home screen. The controller 1500 may display an application band on an application screen.

The controller 1500 may set situation information that matches a window. Situation information may include, for example, the time, the weather, a temperature, a day of the week, a type of an application that is executed by the device 1000, and a schedule of a user. Additionally, if the controller 1500 determines that a current situation of the device 1000 corresponds to a preset situation, the controller 1500 may display or remove a window that corresponds to the current situation in or from the window band. For example, if a current time is a time that is set by a user, the controller 1500 may display a window in the window band.

The controller 1500 may display a window in the window band by using an application tray. The controller 1500 may display the application on the screen of the device 1000. If a user input of selecting an application in the application tray and moving the application to the window band is received, the controller 1500 may execute some preset functions from among functions of the selected application. In this case, the application may include a plurality of function modules, and the controller 1500 may execute some functions of the application by calling some of the plurality of function modules. However, exemplary embodiments are not limited thereto. Additionally, the controller 1500 may generate a window that shows an execution result of the selected application and display the generated window in the window band.

The controller 1500 may generate a window in the window band, by selecting a certain area of the execution screen of the application. The controller 1500 may select a certain area of the execution screen of the application and match the selected area with the application. Additionally, the controller 1500 may generate a window that shows an execution result of the selected application and display the generated window in the window band.

The controller 1500 may expand a window, and as the window in the window band is expanded, an execution result of the application may be displayed in the expanded window in detail. For example, if the window is a window that shows an execution result of a weather application, before the window is expanded, only the current weather may be displayed in the window. After the window is expanded, the week's weather, including the current weather, may be displayed. Additionally, if the window is a window that shows an execution result of a phonebook application, before the window is expanded, a name and a phone number of another user may be displayed in the window. After the window is expanded, a photograph of the other user may be additionally displayed in the window.

The controller 1500 may adjust a size of the expanded window, according to an execution result of the application. As the application is operated, an execution result of the application may be changed. Accordingly, the controller 1500 may determine a type and the amount of data that indicates the execution result of the application, and adjust a size of the window that displays the execution result of the application.

The controller 1500 may execute a plurality of applications to work with each other by using the window band. If the user selects a first application, the controller 1500 may display a window of a second application, which may be executed to work with the first application, to be distinguished from other applications from among the plurality of applications. Additionally, if the first application selected by the user is moved to the window of the second application in the window band, the controller 1500 may execute the first application and the second application to work with each other. Additionally, the controller 1500 may display the execution result of the second application that is executed to work with the first application in the window of the second application.

If a certain event is generated, the controller 1500 generates a window that indicates an execution result of an application related to the generated event, and inserts the generated window into the window band. Additionally, the controller 1500 may register the window in the window band for a quick panel.

FIG. 55 is a block diagram of the device 1000 according to one or more exemplary embodiments. The device 1000 may be a mobile terminal.

A mobile communicator 1001 performs a call setting, data communication, or the like with a base station via a cellular network such as third generation (3G) or fourth generation (4G). A sub-communicator 1002 performs a function for short-range communication such as Bluetooth or near field communication (NFC). A broadcasting receiver 1003 receives a digital multimedia broadcasting (DMB) signal.

A camera unit 1004 includes a lens (not shown) and optical devices (not shown) for capturing a picture or a moving image. The camera unit 1004 may include a first camera and a second camera.

A sensor unit 1005 may include a gravity sensor for detecting motion of the device 1000, an illumination sensor for detecting the brightness of light, a proximity sensor for detecting the proximity of a person, or a motion sensor for detecting motion of a person.

A global positioning system (GPS) receiving unit 1006 receives a GPS signal from an artificial satellite. Various services may be provided to a user, by using the GPS signal.

An input/output unit 1010 provides an interface with an external device or a person. The input/output unit 1010 includes a button 1011, a microphone 1012, a speaker 1013, a vibration motor 1014, a connector 1015, and a keypad 1016.

A touchscreen 1018 receives a touch input by a user. A touchscreen controller 1017 transmits a touch input, which is received via the touchscreen 1018, to a controller 1050. A power supplying unit 1019 is connected to a battery or an external power source so as to supply necessary power to the device 1000.

The controller 1050 may generate and display a window band that includes a window that indicates an execution result of an application by executing programs stored in a memory 1060, according to one or more exemplary embodiments.

The programs stored in the memory 1060 may be classified into a plurality of modules according to functions of the programs, such as a mobile communication module 1061, a Wi-Fi module 1062, a Bluetooth module 1063, a DMB module 1062, a camera module 1065, a sensor module 1066, a GPS module 1067, a moving image playback module 1068, an audio playback module 1069, a power module 1070, a touchscreen module 1071, a UI module 1072, and an application module 1073.

A function of each module may be intuitively inferred from a name of the module by those of ordinary skill in the art. Thus, only the application module 1073 is described. The application module 1073 determines an application that is executed in the device 1000. The application module 1073 may check an application that is executed in the device 1000 and check a function that is executed from among functions of the application.

The application module 1073 generates a window band that includes a plurality of windows, which show an execution result of an application that is being executed, by using the UI module 1072. The application module 1073 may generate a window band by generating a plurality of windows that show an execution result of an application that is being executed and arranging the plurality of windows to be adjacent to each other.

The application module 1073 may also generate a window that shows only a preset part of an execution result of an application that is being executed. The device 1000 may display only a part of a whole area of an execution screen of an application on the window. For example, if an application is a web browser, the application module 1073 may generate a window that shows only an address input window of the web browser.

The application module 1073 may select some applications from among applications that are being executed and generate windows that respectively show an execution result of the selected applications.

Additionally, the application module 1073 may arrange a plurality of the generated windows. The plurality of generated windows may be arranged according to preset criteria. For example, the application module 1073 may locate a window of an application that is frequently used by a user on an upper part of the window band. Additionally, for example, the application module 1073 may locate a window of an application that was recently used by a user on an upper part of the window band, but is not limited thereto.

The application module 1073 displays the generated window band on a screen of the device 1000. The window band may include, for example, a lock band, a home band, and an application band. The application module 1073 may display a lock band on a lock screen and display a home band on a home screen. The application module 1073 may display an application band on an application screen.

The application module 1073 may set situation information that matches a window. Situation information may include, for example, the time, the weather, a temperature, a day of the week, a type of an application that is executed by the device 1000, and a schedule of a user. Additionally, if the application module 1073 determines that a current situation of the device 1000 corresponds to a preset situation, the application module 1073 may display or remove a window that corresponds to the current situation into or from the window band. For example, if a current time is a time that is preset by a user, the device 1000 may display a window in the window band.

The application module 1073 may display a window in the window band by using an application tray. The application module 1073 may display the application tray on the screen of the device 1000. If a user input of selecting an application in the application tray and moving the application to the window band is received, the application module 1073 may execute the selected application. The application module 1073 may execute some preset functions from among functions of the selected application. In this case, the application may include a plurality of function modules, and the application module 1073 may execute some functions of the application by calling some of the plurality of function modules. However, exemplary embodiments are not limited thereto. Additionally, the application module 1073 may generate a window that shows an execution result of the selected application and display the generated window in the window band.

The application module 1073 may generate a window in the window band, by selecting a certain area of the execution screen of the application. The application module 1073 may select a certain area of the execution screen of the application and match the selected area with the application. Additionally, the application module 1073 may generate a window that shows an execution result of the selected application and display the generated window in the window band.

The application module 1073 may expand a window, and as the window in the window band is expanded, an execution result of the application may be displayed in the expanded window in detail. The application module 1073 may adjust a size of the expanded window, according to an execution result of the application. As the application is operated, an execution result of the application may be changed. Accordingly, the application module 1073 may determine a type and the amount of data that indicates the execution result of the application and adjust a size of the window that displays the execution result of the application.

The application module 1073 may execute a plurality of applications to work with each other by using the window band. If the user selects a first application, the application module 1073 may display a window of a second application that may be executed to work with the first application, so that the window of the second application is distinguished from other windows. Additionally, if the first application selected by the user is moved to the window of the second application in the window band, the application module 1073 may execute the first application and the second application to work with each other. Additionally, the controller 1500 may display the execution result of the second application, which is executed to work with the first application, in the window of the second application.

If a certain event is generated, the application module 1073 may generate a window that indicates an execution result of an application related to the generated event and insert the generated window into the window band. Additionally, the application module 1073 may register the window in the window band for a quick panel.

In addition, other exemplary embodiments can also be implemented through computer-readable code/instructions in/on a medium, e.g., a non-transitory computer-readable medium, to control at least one processing element to implement any above-described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

Module and unit, when used herein, refers to either hardware components, software components, or a combination of hardware and software components.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. For example, each component described in singular form may be executed in a distributed form. Likewise, components described in a distributed form may be executed in a combined form.

While one or more exemplary embodiments have been described with reference to the figures, it will be understood by those of ordinary skill in the art that various changes in form and details may be made therein without departing from the spirit and scope of embodiments of the present invention as defined by the following claims.

What is claimed is:

1. A method of displaying an execution result of an application, the method comprising:
   displaying a plurality of icons, which correspond to a plurality of applications, on a screen;
   receiving a first user input corresponding to a first icon from among the plurality of icons;
   displaying a first window, which corresponds to the first icon and shows an execution result of a corresponding first application, in a nearby area of the first icon in response to the first user input;
   receiving a second user input corresponding to the first window; and
   displaying a plurality of windows that are connectively arranged adjacent to each other on the screen, as the second user input is received,
   wherein the plurality of windows respectively show execution results of a plurality of applications that are currently being executed in the device,
   wherein a second window among the plurality of windows shows data corresponding to a second application, and
   wherein the method further comprises displaying, in response to the first window being moved to a location where the second window is displayed when the first application and the second application are executed to work with each other, a preview of information in the first window.

2. The method of claim 1, wherein a display mode of each window that constitutes the plurality of windows comprises a first mode and a second mode, first data is displayed in the window in the first mode, the first data and second data are displayed in the window in the second mode, and the window displayed in the first mode is displayed with a smaller size than the window displayed in the second mode.

3. The method of claim 2, further comprising displaying the second window related to the first window to be visually distinguished from the other windows from among the plurality of windows.

4. The method of claim 3, wherein the displaying of the second window to be visually distinguished from the plurality of windows comprises displaying the second window in the second mode, and displaying a window from among the plurality of windows, other than the second window, in the first mode.

5. The method of claim 3, wherein the first window is displayed with a smaller size than the second window.

6. The method of claim 3, wherein at least one of data of the first application executed in the first window and data of the second application executed in the second window is shared by the first application and the second application.

7. The method of claim 6, further comprising:
receiving a user input of dragging the first window; and
moving the first window in response to the user input.

8. The method of claim 7, further comprising:
detecting release of a user input in the first window;
arranging the first window to be adjacent to the second window, in correspondence with the release of the user input; and
displaying at least one of the first window and the second window to be visually distinguished from the other window from among the plurality of windows.

9. The method of claim 7, further comprising:
detecting release of a user input in the first window;
arranging the first window to be adjacent to the second window, in correspondence with the release of the user input; and
displaying an object, which indicates that the first window and the second window are associated with each other, on at least one among the first window and the second window.

10. A method of displaying an execution result of an application, the method comprising:
displaying a plurality of icons, which correspond to a plurality of applications, on a screen;
receiving a first user input corresponding to a first icon from among the plurality of icons;
displaying a first window, which corresponds to the first icon and shows an execution result of a corresponding first application, in a nearby area of the first icon in response to the first user input;
receiving a second user input corresponding to the first window; and
displaying a plurality of windows that are connectively arranged adjacent to each other on the screen, as the second user input is received,
wherein a second window among the plurality of windows shows data corresponding to a second application, and
wherein the method further comprises:
receiving a user input of moving the first window to a location where the second window is displayed;
arranging the first window to be adjacent to the second window in response to the user input; and
displaying a result, in which the first application and the second application are executed to work with each other, in at least one among the first window and the second window.

11. A device comprising:
a display; and
a processor configured to:
control the display to display a plurality of icons corresponding to a plurality of applications,
receive a first user input to a first icon from among the plurality of icons,
control the display to display a first window corresponding to the first icon and to display an execution result of a first application, in a nearby area of the first icon in response to the first user input,
receive a second user input to the first window, and
control the display to display a plurality of windows that are connectively arranged adjacent to each other in the display based on the second user input,
wherein the plurality of windows respectively show execution results of a plurality of applications that are currently being executed in the device, and
wherein a second window among the plurality of windows shows data corresponding to a second application, and
wherein the processor is further configured to control, in response to the first window being moved to a location where the second window is displayed when the first application and the second application are executed to work with each other, the display to display a preview of information.

12. The device of claim 11, wherein a display mode of each window that constitutes the plurality of windows comprises a first mode and a second mode, first data is displayed in the window in the first mode, the first data and second data are displayed in the window in the second mode, and the window displayed in the first mode is displayed with a smaller size than the window displayed in the second mode.

13. The device of claim 12, wherein the device displays at e second window related to the first window to be visually distinguished from other windows of the plurality of windows.

14. The device of claim 13, wherein the displaying of the second window to be visually distinguished from the plurality of windows comprises displaying the second window in the second mode, and displaying a window from among the plurality of windows, other than the second window, in the first mode.

15. The device of claim 13, wherein the first window is displayed with a smaller size than the second window.

16. The device of claim 13, wherein at least one among data of the first application executed in the first window and data of the second application executed in the second window is shared by the first application and the second application.

17. The device of claim 13, wherein the processor is further configured to receive a user input of dragging the first window, and to move the first window in response to the user input.

18. The device of claim 17, wherein the processor is further configured to detect release of a user input in the first window, arrange the first window to be adjacent to the second window, in correspondence with the release of the user input, and to control the display to display at least one among the first window and the second window to be visually distinguished from at least one other window from among the plurality of windows.

19. The device of claim 16, wherein the processor is further configured to receive a user input of moving the first window to a location where the second window is displayed, to arrange the first window to be adjacent to the second window in response to the user input, and to control the display to display a result, in which the first application and the second application are executed to work with each other, in at least one among the first window and the second window.

20. A non-transitory computer-readable storage medium having stored thereon a computer program, which when executed by a computer, performs the method of claim 1.

21. A device comprising:
a display; and
a processor configured to:
    control the display to display, in response to a first user input, a plurality of windows connectively arranged to be adjacent to each other showing execution results of a plurality of applications currently being executed in the device, the plurality of windows including a first window that shows an execution result of a corresponding first application and a second window that shows data corresponding to a second application,
    control the plurality of windows to be scrolled in response to a second user input, and
    control the display to display a preview of information, which is shown when the first application and the second application are executed to work with each other, in the first window, when the first window is moved to a location where the second window is displayed,
wherein the plurality of windows have at least two display modes.

* * * * *